(12) United States Patent
Takase

(10) Patent No.: US 6,381,501 B1
(45) Date of Patent: Apr. 30, 2002

(54) DATA LOGGING APPARATUS

(75) Inventor: Toshiyuki Takase, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/593,110

(22) Filed: Feb. 1, 1996

Related U.S. Application Data

(63) Continuation of application No. 08/217,279, filed on Mar. 24, 1994.

(30) Foreign Application Priority Data

Mar. 26, 1993 (JP) ............................................. 5-068413

(51) Int. Cl.$^7$ ............................................. G05B 19/18
(52) U.S. Cl. ................................. 700/2; 700/7; 709/208
(58) Field of Search ................................ 364/131, 132, 364/133, 134, 135, 136, 137, 138, 148

(56) References Cited

U.S. PATENT DOCUMENTS

| | | | |
|---|---|---|---|
| 4,326,263 A | * | 4/1982 | Given et al. |
| 4,425,630 A | * | 1/1984 | Yomogida et al. ........... 364/146 |
| 4,628,434 A | * | 12/1986 | Tashiro et al. ............... 364/140 |
| 4,992,926 A | | 2/1991 | Janke et al. |
| 5,122,948 A | * | 6/1992 | Zapolin ....................... 364/131 |
| 5,295,059 A | * | 3/1994 | Brooks et al. ........... 364/131 X |
| 5,355,482 A | * | 10/1994 | Ohhashi et al. ......... 364/131 X |

FOREIGN PATENT DOCUMENTS

| | | |
|---|---|---|
| DE | A-4201361 | 1/1992 |
| EP | A-0427502 | 5/1991 |
| EP | A-0539880 | 5/1993 |
| JP | 5818738 | 2/1983 |
| JP | 1241997 | 9/1989 |

\* cited by examiner

*Primary Examiner*—William Grant
*Assistant Examiner*—Sheela Rao
(74) *Attorney, Agent, or Firm*—Sughrue Mion, PLLC

(57) ABSTRACT

The data logging apparatus according to the present invention has one or more units of programmable logic controller connected to each other through communication and a controller for FA which can read data stored in said programmable logic controller or a communication line and write data therein, and in the data logging apparatus a programmable logic controller connected to the controller for FA is used as an administrative programmable logic controller, and the administrative programmable logic controller develops data stored therein or in other programmable logic controller on the memory and sends the data to the controller for FA.

11 Claims, 58 Drawing Sheets

| SYMBOLS | CONTENTS |
|---|---|
| —\| ↑ \|— | CONDITION IS EFFECTED WHEN BIT SPECIFIED IS SWITCHED FROM OFF TO ON. |
| —\| ↓ \|— | CONDITION IS EFFECTED WHEN BIT SPECIFIED IS SWITCHED FROM ON TO OFF. |
| —\| \|— | CONDITION IS EFFECTED WHEN BIT SPECIFIED IS ON. |
| —\|/\|— | CONDITION IS EFFECTED WHEN BIT SPECIFIED IS OFF. |

| SYMBOL | CONTENT |
|---|---|
| —\| TS \|— | CONDITION IS EFFECTED ONCE FOR A SPECIFIED PERIOD (UNIT OF SECOND). |

FIG.19

| SYMBOLS | CONTENTS |
|---|---|
| —[ = A B ]— | CONDITION IS EFFECTED WHEN A=B (16 bits) |
| —[ > A B ]— | CONDITION IS EFFECTED WHEN A>B (16 bits) |
| —[ < A B ]— | CONDITION IS EFFECTED WHEN A<B (16 bits) |
| —[ >= A B ]— | CONDITION IS EFFECTED WHEN A≥B i (16 bits) |
| —[ <= A B ]— | CONDITION IS EFFECTED WHEN A≤B (16 bits) |
| —[ <> A B ]— | CONDITION IS EFFECTED WHEN A≠B (16 bits) |
| —[ D= A B ]— | CONDITION IS EFFECTED WHEN A=B (32 bits) |
| —[ D> A B ]— | CONDITION IS EFFECTED WHEN A>B (32 bits) |
| —[ D< A B ]— | CONDITION IS EFFECTED WHEN A<B (32 bits) |
| —[ D>= A B ]— | CONDITION IS EFFECTED WHEN A≥B (32 bits) |
| —[ D<= A B ]— | CONDITION IS EFFECTED WHEN A≤B (32 bits) |
| —[ D<> A B ]— | CONDITION IS EFFECTED WHEN A≠B (32 bits) |

FIG.20

| SYMBOLS | CONTENTS |
|---|---|
| —[= TIME  1700 ]— | CONDITION IS EFFECTED AT 17:00 |
| —[= WEEK  1 ]— | CONDITION IS EFFECTED AT MONDAY (0:SUNDAY 1:MONDAY ..... 6:SATURDAY) |
| —[= DAY  1 ]— | CONDITION IS EFFECTED AT THE FIRST DAY |
| —[= MONTH  1 ]— | CONDITION IS EFFECTED AT JANUARY |
| —[= YEAR  1992 ]— | CONDITION IS EFFECTED AT 1992 |

FIG.21

| SYMBOLS | CONTENTS | CONDITION OF EXECUTION |
|---|---|---|
| —[ SET  D ]— | SET OF DEVICE | ⎍ |
| —[ RET  D ]— | RESET OF DEVICE | ⎍ |

FIG.22

| SYMBOLS | CONTENTS | CONDITION OF EXECUTION |
|---|---|---|
| —[ MOV  S  D ]— | SUBSTITUTION OF 16 BITS | ⎍ |
| —[ DMOV  S  D ]— | SUBSTITUTION OF 32 BITS | ⎍ |

FIG.23

| SYMBOLS | CONTENTS | CONDITION OF EXECUTION |
|---|---|---|
| —[ UCNT  D ]— | UP-COUNT OF TIMES WHEN CONDITION IS EFFECTED (16 BITS) | ⎍ |
| —[ DUCNT  D ]— | UP-COUNT OF TIMES WHEN CONDITION IS EFFECTED (32 BITS) | ⎍ |
| —[ DCNT  D ]— | DOWN-COUNT OF TIMES WHEN CONDITION IS EFFECTED (16 BITS) | ⎍ |
| —[ DDCNT  D ]— | DOWN-COUNT OF TIMES WHEN CONDITION IS EFFECTED (32 BITS) | ⎍ |

FIG. 24

| SYMBOLS | CONTENTS | CONDITION OF EXECUTION |
|---|---|---|
| ⊣[ CUM  D ]⊢ | ACCUMULATION OF TIME WHEN CONDITION IS EFFECTED BY UNIT OF MINUTE (16 BITS) | ⌐⌐ |
| ⊣[ DCUM  D ]⊢ | ACCUMULATION OF TIME WHEN CONDITION IS EFFECTED BY UNIT OF MINUTE (32 BITS) | ⌐⌐ |

FIG. 25

| SYMBOLS | CONTENTS | CONDITION OF EXECUTION |
|---|---|---|
| ⊣[ INIT  I ]⊢ | CLEARING DEVICE (IB, IW) FOR LOGGER INSIDE PROCESSING TO 0 | ⌐⌐ |
| ⊣[ INIT  L ]⊢ | CLEARING DEVICE (LW) FOR LOGGER TO 0 | ⌐⌐ |
| ⊣[ LRST  NAME ]⊢ | CLEARING LOG NAME DATA (SHARED MEMORY) SPECIFIED TO 0 | ⌐⌐ |

FIG. 26

| SYMBOLS | CONTENTS | CONDITION OF EXECUTION |
|---|---|---|
| ⊣[ SHUT  DOWN ]⊢ | SAVING GB, GW, LW IN A FAC SIDE AND TERMINATING OPERATION OF DATA LOGGER | ⌐⌐ |

FIG.27

| SYMBOLS | CONTENTS | CONDITION OF EXECUTION |
|---|---|---|
| -[RESTART]- | SETTING GB, GW, LW SAVED IN FAC SIDE TO PLC AND RESTARTING OPERATION OF DATA LOGGER | ⌐ |

FIG.28

| SYMBOLS | CONTENTS | CONDITION OF EXECUTION |
|---|---|---|
| -[WLOG]- | LOGGING OF WORD DEVICE (SHARED MEMORY) | ⌐ |
| -[BLOG]- | LOGGING OF BIT DEVICE (SHARED MEMORY) | ⌐ |
| -[ALARM]- | GENERATING OF ALARM (SHARED MEMORY) | ⌐ |
| -[WRITE]- | WRITING OF DEVICE (SHARED MEMORY) | ⌐ |
| -[READ]- | READING OF DEVICE (SHARED MEMORY) | ⌐ |
| -[WRITERAN]- | RANDOM WRITING OF DEVICE (SHARED MEMORY) | ⌐ |
| -[READRAN]- | RANDOM READING OF DEVICE (SHARED MEMORY) | ⌐ |
| -[SAVE]- | FAIL SAVE OF ABOVE COMMANDS (FAIL) | ⌐ |

FIG.29

| SYMBOLS | CONTENTS | CONDITION OF EXECUTION |
|---|---|---|
| -[ UPLOAD ]- | DEVICE DATA IS UP-LOADED FROM PLC TO FAC | ⎍ |
| -[ DNLOAD ]- | DEVICE DATA IS DOWN-LOADED FROM PLC TO FAC | ⎍ |
| -[ UPPROG ]- | SEQUENCE PROGRAMS IS UP-LOADED FROM PLC | ⎍ |
| -[ DNPROG ]- | SEQUENCE PROGRAM IS DOWN-LOADED TO PLC | ⎍ |
| -[ UPPARAM ]- | PARAMETER IS UP-LOADED FROM PLC | ⎍ |
| -[ DNPARAM ]- | PARAMETER IS DOWN-LOADED TO PLC | ⎍ |
| -[ UPCOMD ]- | COMMENTS IS UP-LOADED FROM PLC | ⎍ |
| -[ DNCOM ]- | COMMENTS IS DOWN-LOADED TO PLC | ⎍ |
| -[ UPBUFMEM ]- | BUFFER MEMORY OF SPECIFIC UNITS IS UP-LOADED | ⎍ |
| -[ DNBUFMEM ]- | BUFFER MEMORY OF SPECIFIC UNITS IS DOWN-LOADED | ⎍ |

FIG.30

| SYMBOLS | CONTENTS | CONDITION OF EXECUTION |
|---|---|---|
| ―[REMOTE]― | REMOTERUN/STOP/PAUSE/RESET | ⌐⌙ |
| ―[SETTIME]― | SETTING OF PLC CLOCK DATA (SHARED MEMORY) | ⌐⌙ |
| ―[READTIME]― | SETTING OF PLC CLOCK DATA (SHARED MEMORY) | ⌐⌙ |

FIG.31

| SYMBOLS | CONTENTS | CONDITION OF EXECUTION |
|---|---|---|
| ―[ACTION]― | STARTING SPECIFIC PROCESS IN TASK SPECIFIED | ⌐⌙ |

FIG.50

| No | DATA | TIME | CURRENT VALUE |
|---|---|---|---|
| 1 | | | |
| 2 | | | |
| 3 | | | |
| ⋮ | | | |
| MAX | | MIN | AVERAGE |

| |
|---|
| DATA FOR FAC No 1 |
| DATA FOR FAC No 2 |
| ⋮ |

FIG.64
PRIOR ART
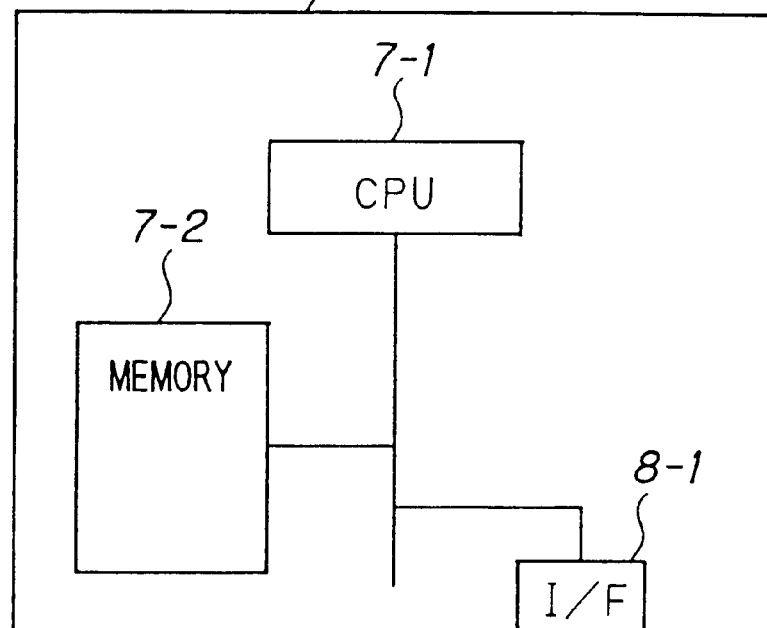
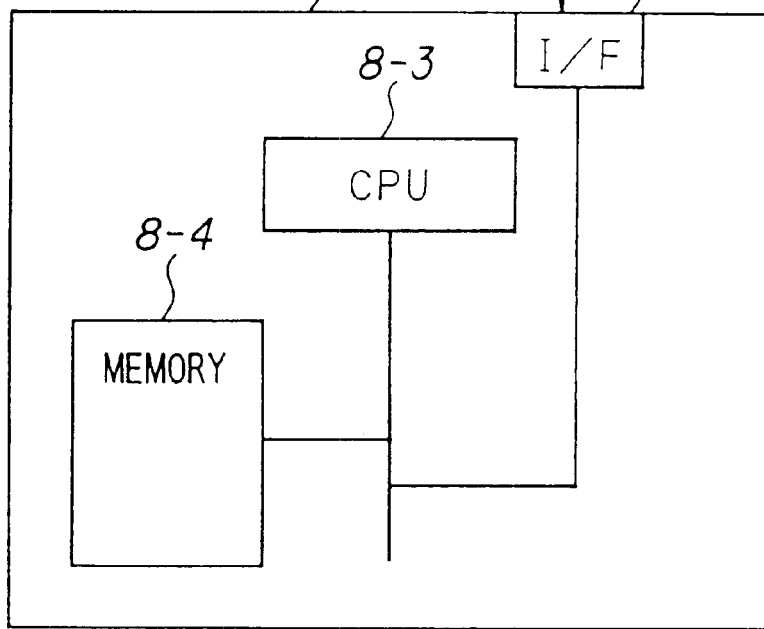

FIG. 73
PRIOR ART
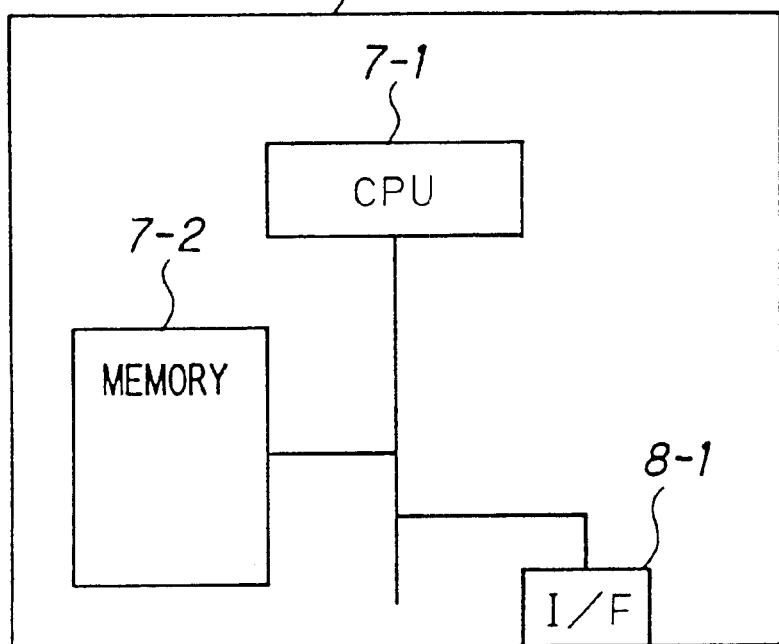
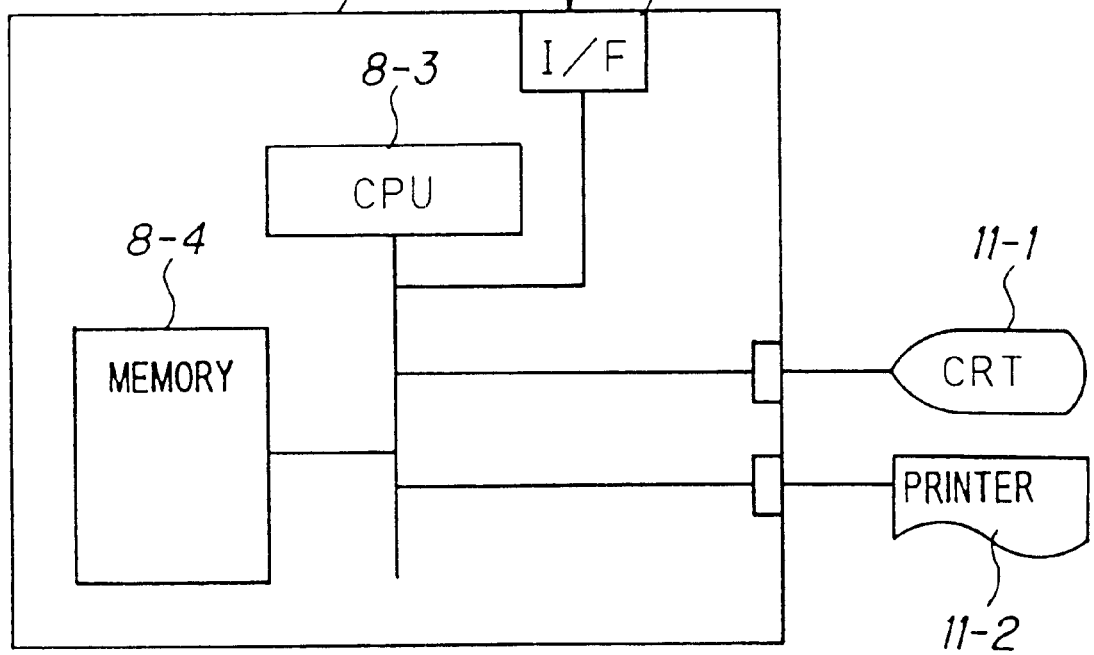

DATA LOGGING APPARATUS

This is a Continuation of Application Ser. No. 08/217,279 filed Mar. 24, 1994.

FIELD OF THE INVENTION

This invention relates to a data logging apparatus which logs data including those stored in a programmable logic controller or those on a communication line.

BACKGROUND OF THE INVENTION

FIG. 58 is a block diagram illustrating the general configuration of a conventional type of data logging apparatus, and in this figure, designated at the reference numeral 1-24 is a programmable logic controller (called PLC hereinafter), at 1-1 a memory incorporated in the PLC, at 1-15 a controller for FA (called FAC hereinafter), at 1-30 a data collecting/storing means for reading data stored in the memory 1-1 incorporated in the PLC 1-24, at 1-6 an auxiliary memory, and at 1-7 a memory.

Next, operations of the data logging apparatus according to the present invention will be described. First, a logging processing sequence in FAC 1-15 with reference to a flow chart shown in FIG. 59 will be described. The FAC 1-15 collects data from the memory 1-1 in each PLC 1-24 with the data collecting/accumulating means 1-30 (S 1-110). Then the collected data is stored in the auxiliary memory 1-6 or the memory 1-7 by the data collecting/accumulating means 1-30 (S 1-111).

FIG. 60 is a block diagram illustrating the general configuration of a conventional type of PLC, and in this figure, designated at the reference numeral 7-1 is a CPU which executes a user program, at 7-2 a memory in which programs including user programs and those for data logging are stored, at 7-3 an I/O device which turns ON an LED or inputs the state of a switch.

FIG. 61 is a block diagram illustrating contents of a PLC memory, and in this figure, designated at the reference numeral 7-8 is a program in which a program for inputting state of a switch with the I/O device 7-3 and a user program for providing LED displays or for other purposes and a data logging program for logging the state of a switch at a certain interval are combined, and at 7-9 is a device area for user programs as well as for data logging.

FIG. 62 is a functional diagram illustrating functions of a conventional type of data logging apparatus, while FIG. 63 is a flow chart illustrating operations of a conventional type of data logging apparatus. At first, the input state of a switch or other device is read from the I/O device 7-3 (S 7-4). Then, the input state is written in the device area 7-9 (S 7-5). A data logging process is executed, and the logged data is written in the device area 7-9 (S 7-6). Then the data is read from the device area, and output is executed by the I/O device (S 7-7).

FIG. 64 is a block diagram illustrating the general configuration of a conventional type of data logging apparatus, and in this figure, designated at the reference numeral 8-1 is an I/F for executing communications with the FAC, said FAC reading data stored in the device area in the PLC, accumulating the data therein, and displaying the stored data on a CRT screen, at 8-2 is an I/F for executing communications with the PLC, at 8-3 is a CPU which executes a user program for the FAC, and at 8-4 is a memory in which device data read out from the PLC or results of computing by a user program are stored.

FIG. 65 is an explanatory view showing contents of a memory in a conventional type of FAC, and in this figure, designated at 8-11 is device data read from the PLC, at 8-12 is a user program which executes processing with the device data 8-11, and at 8-13 user program data processed by the user program 8-12. The user program changes the current value (to the device data), and computes a maximum value or others from the device value. The reference numeral 8-14 indicates log data.

FIG. 66 is a block diagram illustrating the general configuration of a conventional type of data logging apparatus, while FIG. 67 is a flow chart illustrating processing operations of the data logging apparatus shown in FIG. 66. A user program reads out device data from the PLC (S 8-17). Then device data conversion is executed (for instance, * 50 (multiplication)) (S 8-18), and the converted device data is written in the user program data 8-13(S 8-19). Then a maximum value, a minimum value, an average, and a total are computed according to the device value, the values are written in the user program 8-12 (S 8-20), the device value is written in the log data 8-14, and a logging number is advanced by 1 (S 8-21).

FIG. 68 is a block diagram illustrating the general configuration of a conventional type of data logging apparatus, and in this figure, the reference numeral 9-2 indicates a clock for measuring time for reading a device value from the PLC. FIG. 70 is an explanatory drawing illustrating contents of a memory in a conventional type of FAC. In this figure, the reference numeral 9-6 indicates a user program for reading a device from the PLC and setting up a date and time, while the reference numeral 9-7 indicates log data for a current value, the date and time to be written in.

FIG. 69 is a functional drawing illustrating functions of a conventional type of data logging apparatus, while FIG. 71 is a flow chart illustrating processing operations of a conventional type of data logging apparatus. In this figure, a user program reads out a date and time from the clock and writes the values in the log data (S 9-10).

FIG. 72 is a flow chart illustrating processing operations of a conventional type of data logging apparatus. The user program checks whether there is any logging condition for execution of logging or not ( S 10-5). If logging is required, processes S 8-17 to S 8-21 are executed. Then, processing is executed using logged data, or other processing is executed (S 10-6).

FIG. 73 is a block diagram illustrating the general configuration of a conventional type of data logging apparatus, and in this figure, the reference numeral 11-1 indicates a CRT on which a result of logging is displayed, while the reference numeral 11-2 indicates a printer which prints the result of logging. FIG. 74 is an explanatory drawing showing contents of a memory in a conventional type of FAC, and in this figure, the reference numeral 11-6 indicates a user program which gives an instruction for printing to the printer 11-2. FIG. 75 is a functional drawing illustrating functions of a conventional type of data logging apparatus. FIG. 76 is a flow chart illustrating processing operations of a conventional type of data logging apparatus. The user program makes a determination as to whether displaying or printing is required or not (S 11-7), and if it is determined that such an operation is required, the operation for displaying or printing is executed (S 11-8).

FIG. 79 is a block diagram illustrating the general configuration of a conventional type of data logging apparatus, and FAC 1 and FAC 2 read a device value and execute a data logging process respectively.

FIG. 77 is a functional drawing illustrating functions of a conventional type of data logging apparatus, while FIG. 78 is a flow chart illustrating processing operations of a conventional type of data logging apparatus. The user program 13-5 for FAC 1 transmits a request for receiving a device value to the PLC (S 13-5), waits for reply from the PLC indicating reception of the device value (S 13-6), and then transmits a signal indicating that the reply was received to the PLC (S 13-7). Also the user program for the FAC 2 executes the same processing when communicating with the PLC. In the process to send and receive a signal to and from the PLC, checking that a request for receiving from the PLC is executed (S 13-8), and if the request for receiving has been issued, a reply indicating receipt is sent to the FAC (S 13-9), then, the end of receiving is awaited (S 13-10).

Technical documents relating to this invention include Japanese Patent laid-Open Publication No.18738/1983 disclosing the "data collection system" and Japanese Patent Laid-Open Publication No.241997/1989 disclosing the "data collecting apparatus".

There have been the following problems in the conventional art as described above.

Firstly, data collection must be executed for all PLCs connected to the FAC, so the number of devices required for data collection increases with an increase in the number of PLCs to be connected, and if the data collection is reduced for to raise processing, a precision in the processing, work load of the FAC becomes larger, and the precision of the data collection becomes disadvantageously lower.

Secondly, the when it is necessary to change a user program, the data logging program for the user program must also be changed, and as two functions are executed by one program, maintenance is disadvantageously difficult.

Thirdly, because all processes are executed by a user program on the user side, the work load to the user is very high, and when modifying the user program, it is necessary to the contents of the user program to carry out modifications correctly, which lowers work efficiency.

Fourthly, a clock is set up in user program in the FAC side, so it is difficult to correctly set timing for device changes on PLC side, and also time setting is executed by the user program, which makes the work load to the user program disadvantageously larger.

Fifthly, if it is desired to log as much data as possible within a short period of time (for instance with an interval of one second), other processing must be finished within a short period of time (within one second), and for this reason the user program for the other processes is disadvantageously complicated.

Sixthly, to display data or tables by a user program, a very complicated program is required, and maintenance such as modification or debugging is very troublesome, which lowers work efficiency.

Seventhly, a log time is required for giving the program a printing instruction, and during this time data logging can not be so, sometimes required data is not logged, and therefore data logging can not be executed accurately. Also the FAC program can not display and print data during data logging, so the workability thereof is very low.

Eighthly, the same processing is required in all user programs for each FAC, and in transaction with the PLC, requests from two units of FAC must be processed, which makes the work load of the PLC disadvantageously, larger and imposes some limits to expandability of the FAC.

SUMMARY OF THE INVENTION

It is an object of the present invention to provide a data logging apparatus which can raise the precision in data collection, make maintenance of the apparatus easier, and furthermore can improve the work efficiency, reduce the work load to the user program, improve the workability, reduce the work load to the PLC, and improve expandability of the FAC.

A data logging apparatus according to the present invention comprise a programmable logic controller which is packaged as a control unit in a facility or machine, one or more units of said programmable controllers being connected to each other through communications links, and a control for FAC which is connected to the programmable logic controller through communications and can read and/or write data stored in the programmable logic controller and on a communication line, wherein the programmable logic controller connected to the controller for FAC is used as an administrative programmable logic controller and the administrative programmable logic controller accumulates data stored therein or in other programmable logic controllers in a memory and provides the data to the controller for FA.

A program data preparing sequence for preparing data for a data logging program operating in the administrative programmable logic controller as well as for a data logging program running on the controller for FA is stored in the controller for FA, and the controller for FA successively processes data collected by the administrative programmable logic controller with the program described above according to data prepared by the program data preparing means.

Also, the data logging apparatus according to the present invention includes a transfer means which downloads the data logging program running on the administrative programmable logic controller from the controller for FA to the administrative programmable logic controller or uploads the aforesaid data logging program from the administrative programmable logic controller to the controller for FA.

Also, a logging setting means for describing data in a trigger condition section and a processing section is included in the controller for FA, and the logging setting means is set up in a ladder format.

Also, a logging setting means for describing data for a trigger condition section and a processing section is included in the controller for FA, and the logging setting means is set up in a tabular format.

Also the data logging apparatus according to the present invention includes an analyzing means for reading a main program (a program excluding the data logging program) of the administrative programmable logic controller and analyzing a device being used when preparing a data logging program running on the administrative programmable logic controller with program data preparing means.

Also, the data logging apparatus according to the present invention includes a program executing means for providing a program area dedicated to device logging as well as a device area in the programmable logic controller, running the data logging program in the area described above, and using the device area dedicated to data logging area.

Also the data logging apparatus according to the present invention includes a computing means for setting a magnification/offset for scale conversion in the table section setting means and executing scale conversion for the collected data.

Also, the data logging apparatus according to the present invention includes an adding means for adding data concerning date and time to stored data provided therein and a timing means for setting a clock in the programmable logic controller in accordance with that in the controller for FA.

Also, the data logging apparatus according to the present invention includes a block accumulating means for accumulating data to be stored as a plurality of successive blocks and a communicating means for indicating whether data to be accumulated is present or not.

Also, the data logging apparatus according to the present invention includes a displaying/printing format setting means for setting a format for displaying accumulated data for controller for FA or printing the data with the printing means, and a displaying/printing means for displaying or printing accumulated data for the controller for FA according to the displaying or printing format set up by the displaying/printing format setting means.

Also, the data logging apparatus according to the present invention incorporates a multi-task function in the controller for FA to provide a collecting means as well as a computing means in a given task, and also stores accumulated data for the controller for FA in a shared memory to provide the displaying/printing means in a different task.

Also, the data logging apparatus according to the present invention includes a communicating means for sending or receiving data to and from partner equipment to which accumulated data for the controller for FA is provided through communication.

The data logging apparatus according to the present invention uses a PLC connected to the FAC as an administrative PLC, and the administrative PLC accumulates data stored therein or in other PLCs in a memory and sends the data to the FAC. In other words, the administrative PLC collects data from all PLCs.

Also the FAC successively processes data collected by the data logging program according to the data section. Namely, the administrative PLC arranges the collected data into a specified format, which is processed in the lump by a FAC side.

The data logging program running on the administrative on the administrative PLC is downloaded from the FAC to the administrative PLC or uploaded from the FAC administering PLC to the FAC. In other words the FAC controls uploading and downloading of a program for the administrative PLC.

Also, a logging setting means for describing data for a trigger condition section and a processing section is included in the FAC side, and the logging setting means is set up in a ladder format.

Also, a logging setting means for describing data for a trigger condition section and a processing section is included in the FAC side, and the logging setting means is set up in a tabular format.

Also, when preparing a data logging program running on the administrative PLC with the program data preparing means, a device being used is analyzed by reading a program for the administrative PLC and the data logging program is added to eliminate the necessity of using the device in use. Thus, a device not being used by the current program is used in the data logging program.

Also a program area dedicated to data logging and a device area are provided in a PLC and each program is executed in the above areas alternately by the program executing means.

Also the computing means executes conversion of data values according to data values for accumulated data and scale change values of data for FAC corresponding to data numbers of the accumulated data, and writes the converted data in the current values of the accumulated data for FAC.

Also the computing means computes the maximum values or others from the current values and writes the resultant values in the accumulated data for FAC.

The time setting means sends a request for time setting to a PLC and receives a signal indicating completion of time setting from the PLC. The adding means receives a request for time setting from the FAC and sets a date and time.

Also, the block accumulating means accumulates accumulated data as a plurality of blocks. If there is any data to be accumulated, the communicating means communicates the presence of data to be accumulated to the FAC.

The displaying/printing format setting means sets up a format for displaying accumulated data on a CRT or printing the data with a printer, and stores the format as a display/print format data in a memory of the FAC. The displaying/printing means reads the display/print format data, reads data from the accumulated data for the FAC and displays the data.

Also the displaying/printing means executes up to a process of accumulating the data in the accumulated data memory for FAC in a given task with the multi-task function (to process a plurality of tasks in a time-division system so that the plurality of tasks seem to run simultaneously), and CRT display or printer output requiring a longer processing time is executed in a different task.

Also data transaction is executed through data transaction with other FACs on a communication line between FACs, in addition to a communication between the FAC and the PLC.

As described above, with the data logging apparatus according to the present invention, it is possible to execute high speed data logging for collecting data with an administrative PLC which is a control unit, and to reduce a work load to an FAC which is a main control unit by means of distributing the work load.

Also, as it is not necessary to make a program for an administrative PLC and a program for an FAC each for data logging, reduction of a number of processes is realized.

Also, in the data logging apparatus according to the present invention, a specific device is not required for up-loading or down-loading a program for an administrative PLC.

Also, as conditions for logging are set in a ladder format or a tabular format, a user can easily set the logging condition.

Also, it is possible to make a program having several functions in one PLC.

Also, it is possible to set up different program areas or to change only a data logging program, so that a flexible data logging apparatus can be realized. Also it is possible to change only a data logging program, so that, when transferring from the FAC side, the quantity of program data to be transferred is reduced and high speed program change can be executed.

Also, it is possible to easily change a method of processing data by setting magnification/offset for scale conversion.

Also, once time setting between the FAC and the PLC is performed, time control is not required, so that the work load to the FAC side is reduced, which make it possible to execute other processes, and furthermore, as time required for data accumulation is measured in the PLC side, accurate time is stored as the accumulated data. For instance, when displaying a trend graph or others, it is possible to display sampling accurately.

Also, a plurality of accumulated data is stored in the PLC side, so that it is possible to execute a high speed logging process.

Also, it is possible to easily change a display/print format with the display/print format setting means, which improves the efficiency of maintenance work.

Also, when it is required to execute display or printing, the operation can immediately be executed, and furthermore accumulated data for FAC is stored in a shared memory, so that the data can be referred to by a user program for other tasks, which enables flexible programming.

Also, it is not necessary in the FAC to execute data collection and computing with the data collecting means and the computing means respectively from the PLC side, and also it is possible to distribute functions, so that the extendibility of the FAC can be improved. Also it is possible in the FAC to execute other processing (such as analysis of work) depending on accumulated data for FAC.

Other objects and features of this invention will become understood from the following description with reference to the accompanying drawings.

BRIEF DESCRIPTION OF THE DRAWINGS

FIG. 19 shows a command available in the trigger condition section according to the invention;

FIG. 20 shows a command available in the trigger condition section according to the invention;

FIG. 21 shows a command available in a processing section according to the invention;

FIG. 22 shows a command available in the processing section according to the invention;

FIG. 23 shows a command available in the processing section according to the invention;

FIG. 24 shows a command available in the processing section according to the invention;

FIG. 25 shows a command available in the processing section according to the invention;

FIG. 26 shows a command available in the processing section according to the invention;

FIG. 27 shows a command available in the processing section according to the invention;

FIG. 28 shows a command available in the processing section according to the invention.

FIG. 29 shows a command available in the processing section according to the invention;

FIG. 30 shows a command available in the processing section according to the invention;

FIG. 31 shows a command available in the processing section according to the invention;

FIG. 50 is an explanatory view illustrating contents of display/print format data according to the invention;

FIG. 64 is a block diagram illustrating general configuration of a conventional type of data logging apparatus;

FIG. 73 is a block diagram illustrating general configuration of a conventional type of data logging apparatus;

DETAILED DESCRIPTION OF THE EMBODIMENTS

Figure 1:
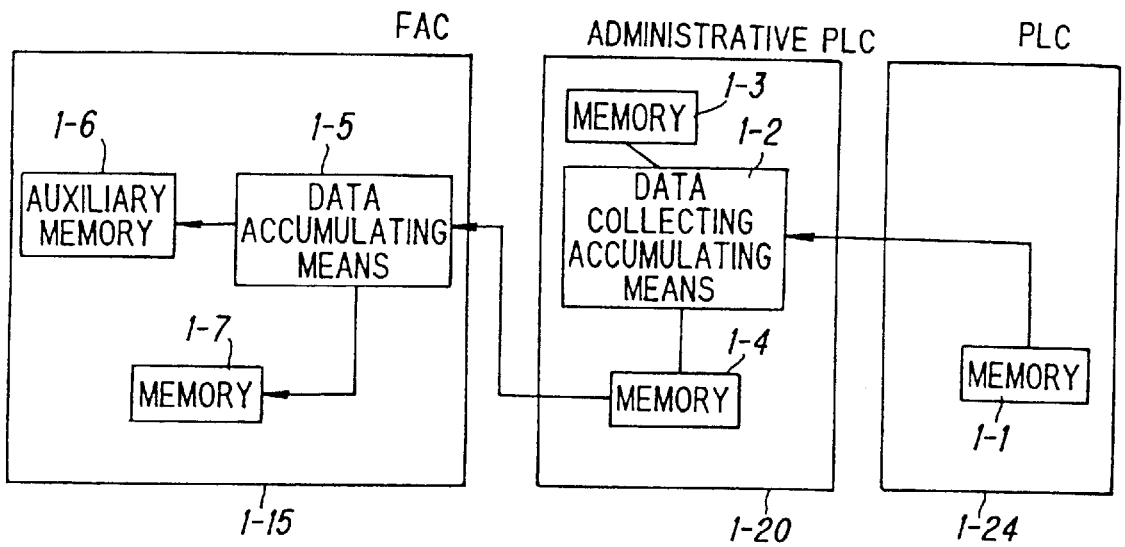
FIG. 1 is a functional diagram illustrating configuration of a data logging apparatus according to the invention.

Description is made hereinafter for embodiments of a data logging apparatus according to the present invention with reference to the related drawings. FIG. 1 is a functional diagram illustrating configuration of a data logging apparatus, and in this figure, designated at the reference numeral 1-15 is an FAC, at 1-5 a data accumulating means, at 1-6 an auxiliary memory, and at 1-7 a memory. Also designated at the reference numeral 1-20 is an administrative PLC, at 1-2 a data accumulating means, at 1-3 and 1-4 a memory respectively. Also the reference numeral 1-24 indicates a PLC other than the administrative PLC 1-20, while the reference numeral 1-1 indicates a memory.

Figure 2:
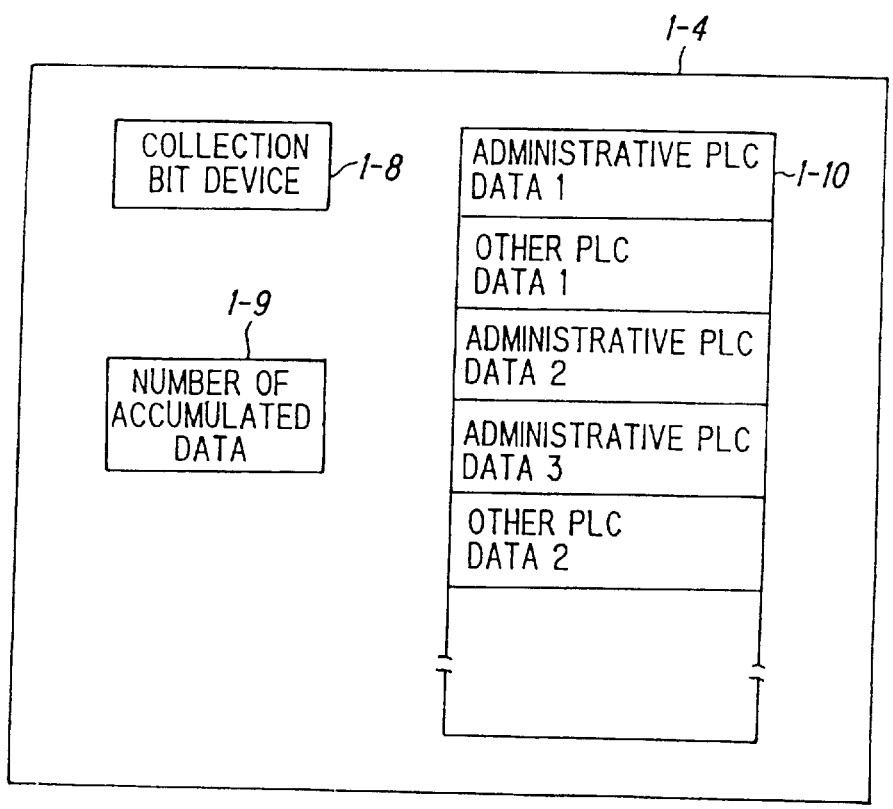
FIG. 2 is an explanatory view illustrating configuration of an administrative PLC memory according to the invention.

FIG. 2 is an explanatory view illustrating contents of a memory on which the administrative PLC 1-20 is developed, and in this figure, designated at the reference numeral 1-8 is a collection bit device, at 1-9 a number of accumulated data, and at 1-10 a memory for data and other information.

Figure 3:
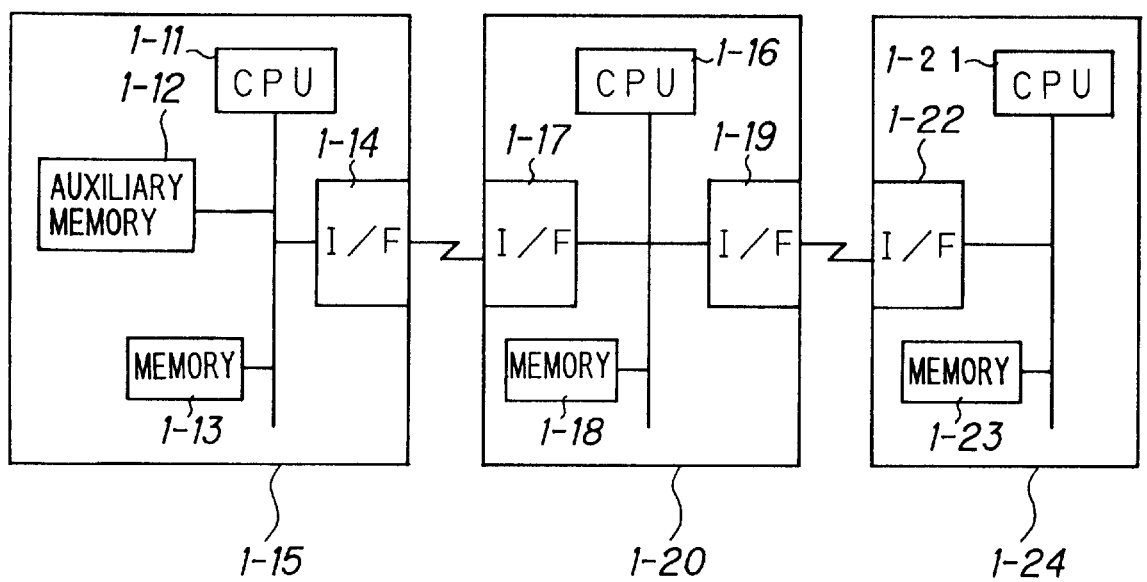
FIG. 3 is a block diagram illustrating general configuration of the data logging apparatus according to the invention.

FIG. 3 is a block diagram illustrating general configuration of a data logging apparatus, and in this figure, designated at the reference numeral 1-11 is a CPU for the FAC 1-15, at 1-12 an auxiliary memory for the FAC 1-15, at 1-13 a memory for the FAC 1-15, and at 1-14 a communication interface for the FAC 1-15. Also at the reference numeral 1-16 is a CPU for the administrative PLC 1-20, at 1-17 and 1-17a communication interfaces for the administrative PLC 1-20 respectively, and at 1-18 a memory for the administrative PLC 1-20. At the reference numeral 1-21 is designated a CPU for the PLC 1-24, at 1-22 an interface for the PLC 1-24, and at 1-23 a memory for the PLC 1-24.

Figure 4:
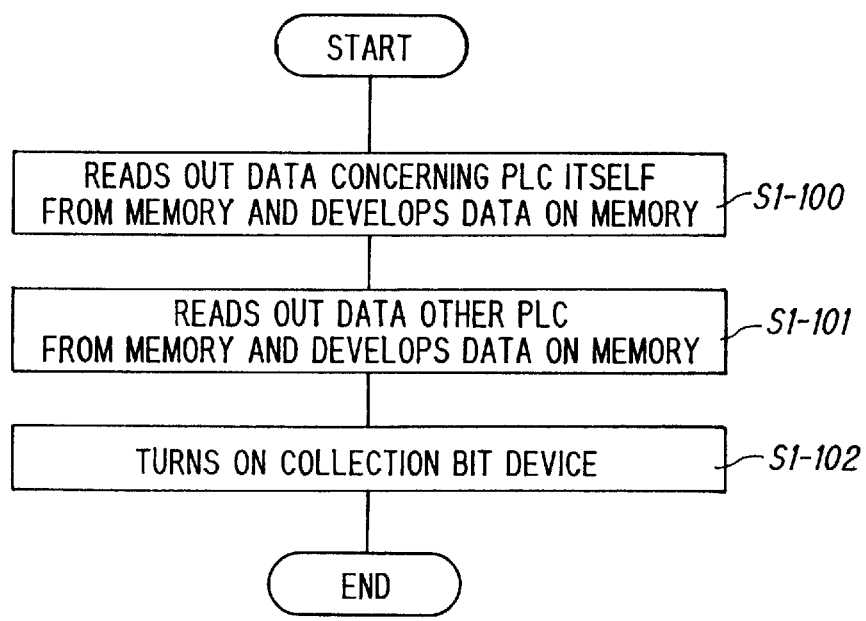
FIG. 4 is a flow chart illustrating operations of the administrative PLC according to the invention.
Figure 5:
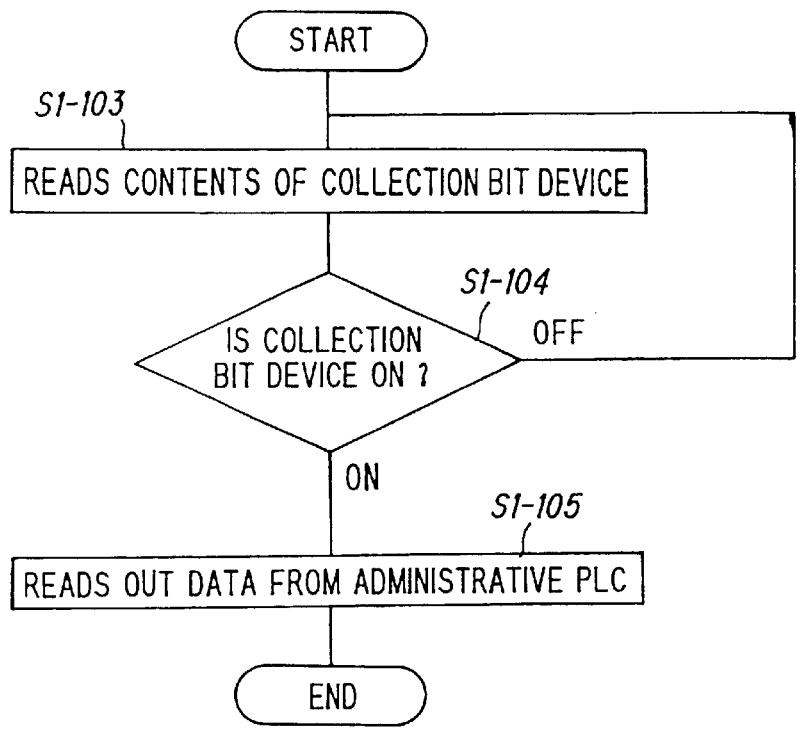
FIG. 5 is a flow chart illustrating operations of an FAC according to the invention.

Next, operations of the data logging apparatus according to the present invention will be described. FIG. 4 and FIG. 5 are flow charts each illustrating operations of the data logging apparatus described above. The administrative PLC 1-20 reads out data concerning the PLC 1-20 itself from the memory 1-3 using a data collecting/accumulating means, and develops the data in the memory 1-4 (S 1-100). It should be noted that, although the memory 1-3 is separated from the memory 1-4 in FIG. 1, the two memories may be integrated into one unit. The read data is accumulated in the memory 1-10 for data and other information, and the number of accumulated data 109 is incremented by 1. Similarly, the administrative PLC 1-20 reads out data on other PLCs using the data collecting/accumulating means 1-2 from the memory 1-1 and develops the data in the memory 1-4 (S 1-101). The data read out as described above is accumulated in the memory 1-10 for for data and other information, and the number of accumulated data is incremented by 1. Then the data collecting/accumulating means 1-2 turns ON the collection bit device 1-8 to indicate that there is collected data (S 1-102).

Furthermore, in FIG. 5, the FAC 1-15 reads contents of the collection bit device 1-8 of the administrative PLC 1-20 using the data accumulating means 1-5 (S 1-103). Namely the FAC 1-15 makes a determination as to whether the collection bit device 1-8 is ON or not (S 1-104), and if the bit is OFF, namely if there is not any collected data at all, the system control returns to the above S 1-103, and on the contrary if there is any collected data, the FAC 1-15 reads out a number of accumulated data 1-9 and reads output data according to the number from the memory 1-10 for data and other information (S 1-105). Then, when the FAC 1-15 has read out data according to any of numbers of accumulated data 1 to 9, the administrative PLC 1-20 sets state of the collection bit device 1-8 to OFF, clears the number of accumulated data to 0, and furthermore clears the contents of the memory 1-10 of data and other information.

Figure 6:
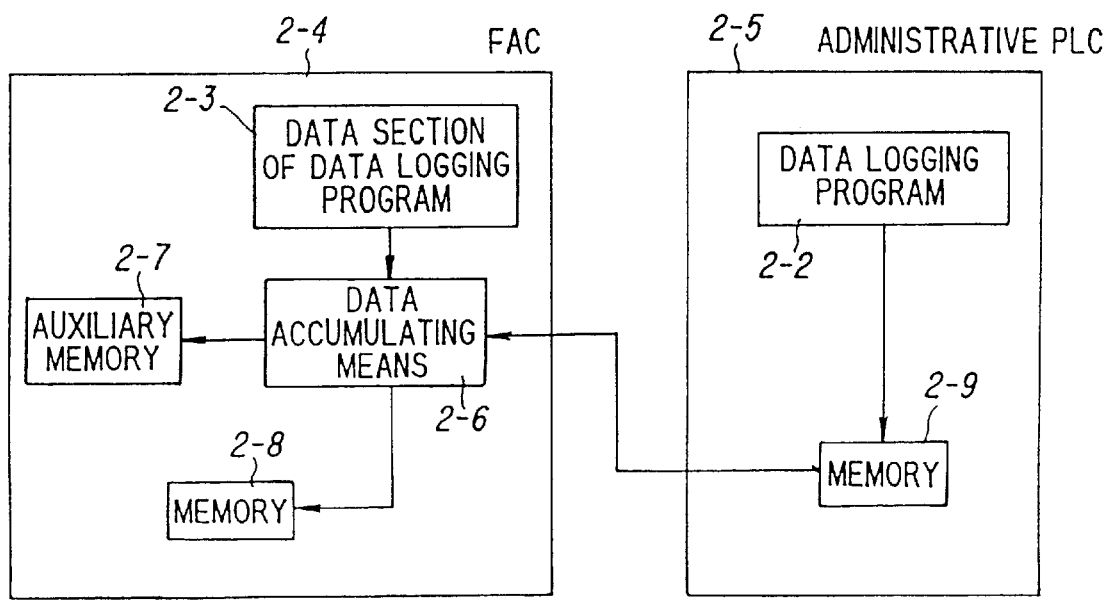
FIG. 6 is a functional diagram illustrating configuration of a data logging apparatus according to the invention.
Figure 7:
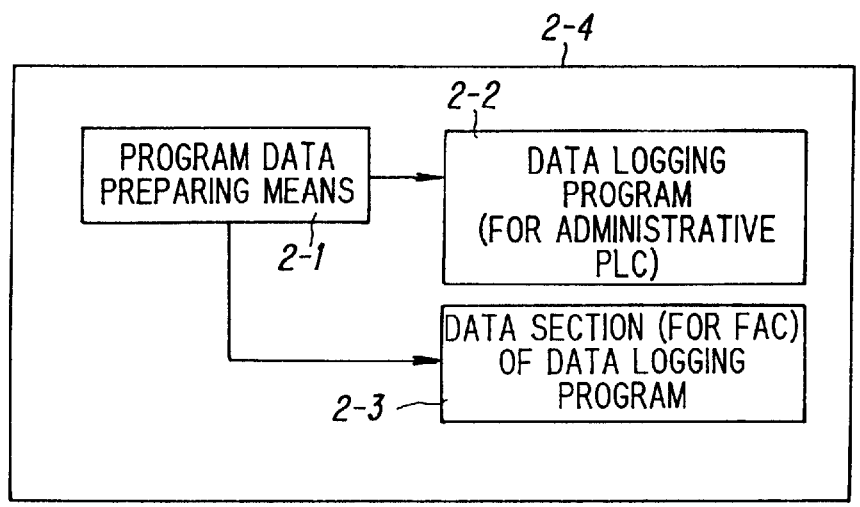
FIG. 7 is a block diagram illustrating configuration of an FAC according to the invention.
Figure 8:
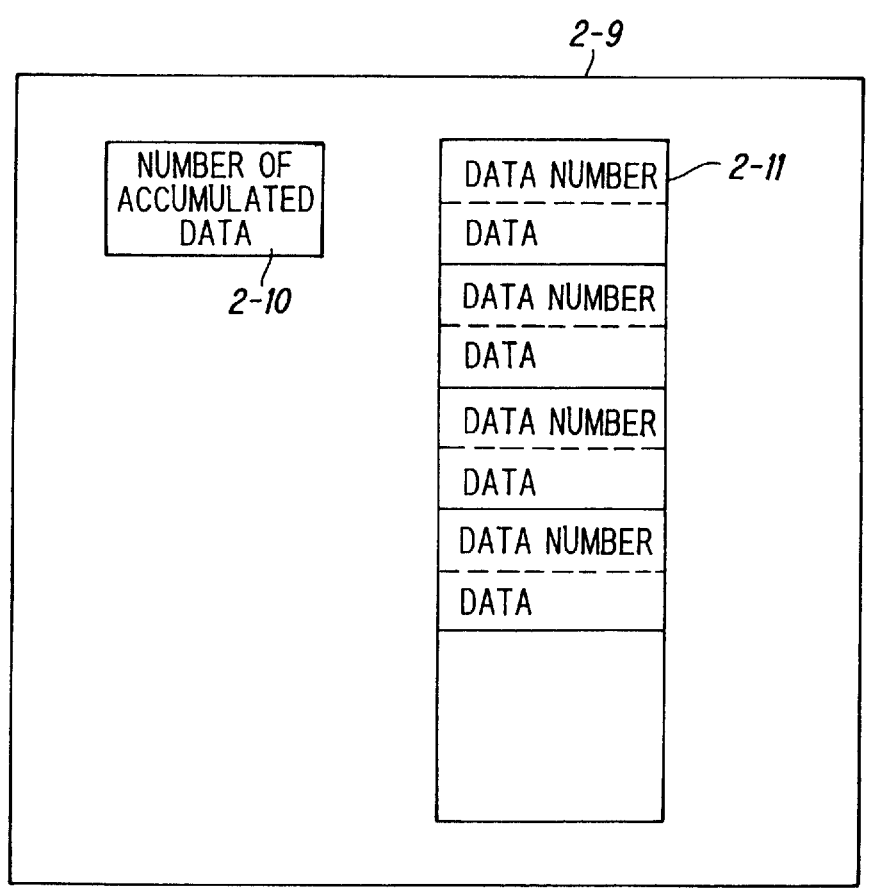
FIG. 8 is an explanatory view illustrating contents of the administrative PLC according to the invention.

Next, the second embodiment of the invention will be described. FIG. 6 is a functional view illustrating a data logging apparatus according to the present invention, and in this figure, designated at the reference numeral 2-4 is an FAC, at 2-3 a data section of the data logging program, at 2-6 a data accumulating means, at 2-7 an auxiliary memory, and at 2-8 a memory. Also designated at 2-5 is an administrative PLC, at 2-2 a data logging program, and at 2-9 a memory. Also FIG. 7 is a block diagram illustrating configuration of a FAC 2-4 to make up a program for an administrative program and a data section for FAC, and in this figure, designated at 2-1 is a program data preparing means, at 2-2 a data logging program (for an administrative PLC), at 2-3 a data section (for FAC) of a data logging program. Furthermore, FIG. 8 is an explanatory view illustrating contents of a memory 2-9 on which the administrative PLC develops, at 2-10 a number of accumulated data, and at 2-11 a memory for data and other information.

Figure 9:
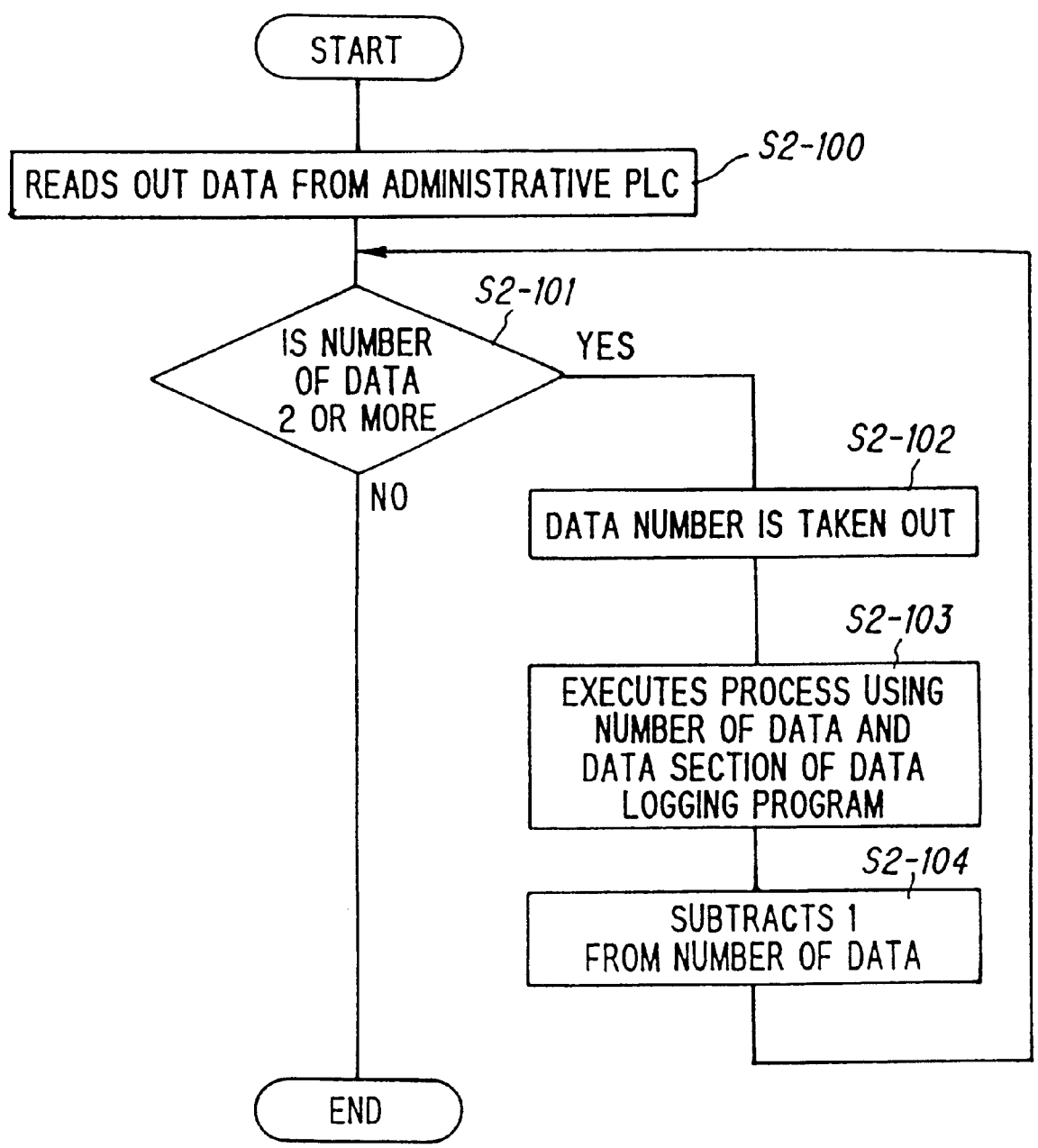
FIG. 9 is a flow chart illustrating operations of the data logging apparatus according to the invention.

Next, operations of the data logging apparatus according to the second embodiment of the present invention will be described. FIG. 9 is a flow chart illustrating operations of the data logging apparatus. At first, the FAC 2-4 reads out, in a lump, data collected by a data logging program 2-2 and developed on the memory 2-9 (S 2-100). The FAC 2-4 obtains any of the numbers of accumulated data 2-10, and makes a determination as to whether the number of data is 2 or more (S 2-101). If, if the number of data is 1 or less, a series of processes is terminated. On the contrary, when it is determined that the number of accumulated data is 2 or more, a data number at the head of the memory 2-11 for data and other information is taken out (S 2-102). The FAC 2-4 selects and executes a process with the data accumulating means 2-6 using the number of data and a data section 2-3 of the data logging program (S 2-103). Processes to be executed include a process to store read data in the auxiliary memory 2-7 or in the memory 2-8. Data in the memory 2-11 for data and other information consists of a data number and data, and comprises a plurality of blocks, so S 2-102 and S 2-103 are executed according to a number of blocks obtained by subtracting 1 from the number of data (S 2-106).

Figure 10:
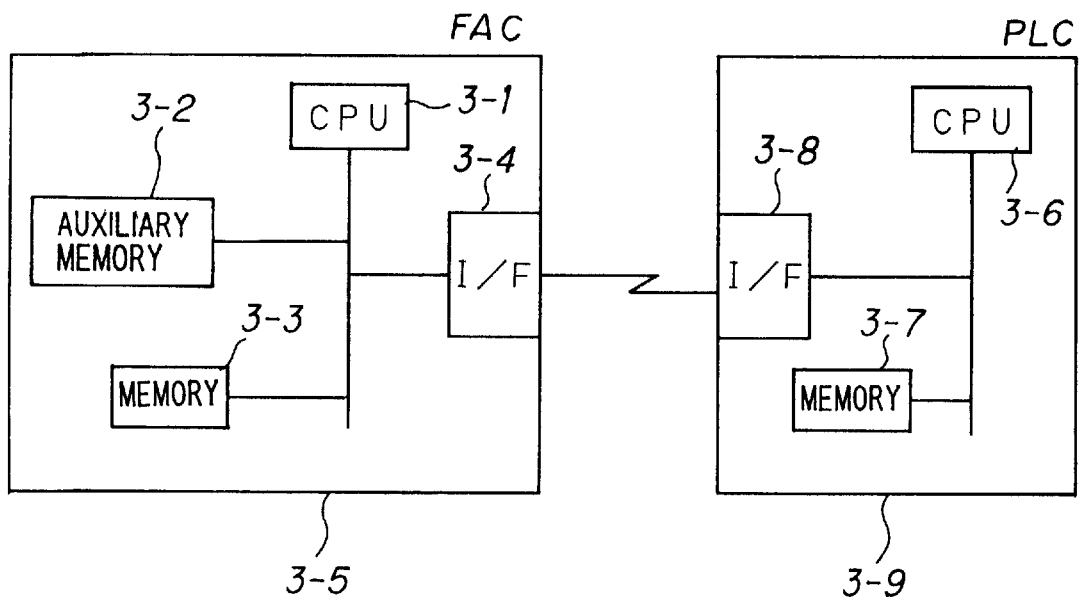
FIG. 10 is a block diagram illustrating general configuration of a data logging apparatus according to the invention.

Next, a third embodiment of the present invention will be described. FIG. 10 is a block diagram illustrating general configuration of a data logging apparatus according to the present invention, and in this figure, designated at 3-5 is an FAC, at 3-1 a CPU, at 3-2 an auxiliary memory, at 3-3 a interface, and at 3-4 a communication memory. Also designated at the reference numeral 3-9 is an administrative PLC, at 3-6 a CPU, at 3-7 a memory, and at 3-8 a communication interface.

Figure 11:
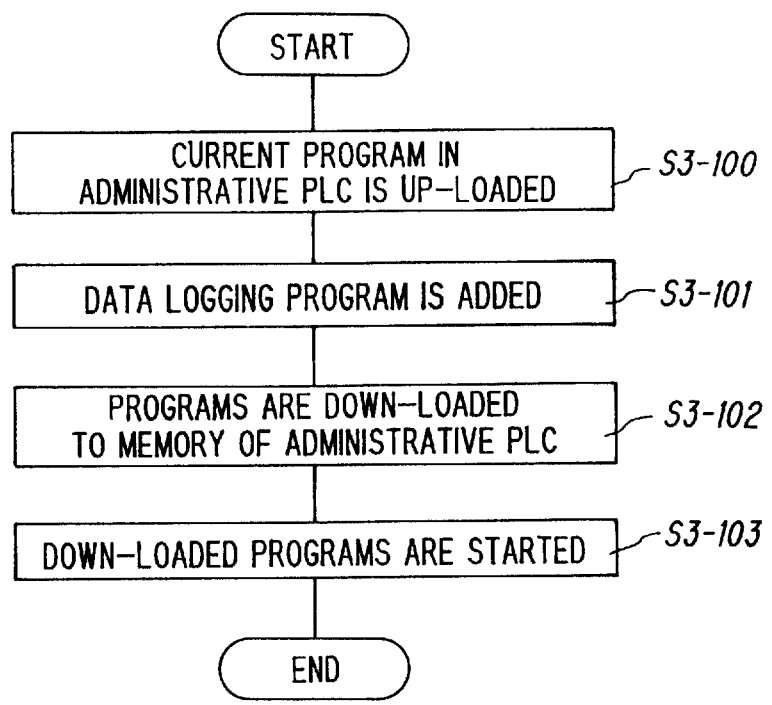
FIG. 11 is a flow chart illustrating operations of the data logging apparatus according to the invention.

Next, operations of the data logging apparatus according to the third embodiment of the present invention will be described. FIG. 11 is a flow chart illustrating operations of the data logging apparatus. At first, the current program in the administrative PLC 3-9 is up-loaded from the memory 3-7 to the memory 3-3 in the FAC 3-5 or the auxiliary memory 3-2 (S 3-100). Then, a program is added by a data logging program adding means (not shown herein) (S 3-101), and is stored in the memory 3-3 of the FAC 3-5 or in the auxiliary memory 3-2. Then the stored programs are down-loaded to the memory 3-7 of the administrative PLC 3-9 (S 3-102). Finally, the down-loaded programs are started from the FAC 3-5 (S 3-103), and data logging is started.

Figure 12:
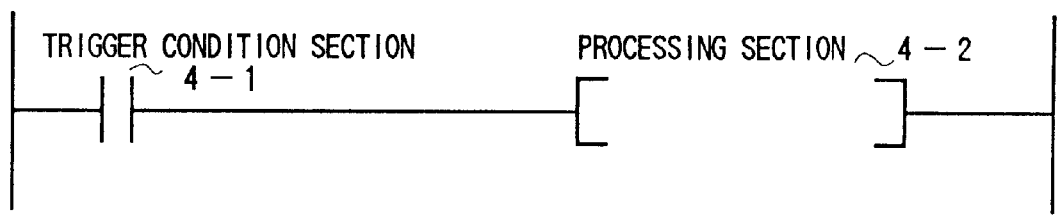
FIG. 12 is an explanatory view illustrating an example of setting up in a data logging apparatus according to the invention.

Next, a fourth embodiment of the present invention will be described. FIG. 12 shows an example of execution of logging setting in a ladder format. In FIG. 12, the reference numeral 4-1 indicates a trigger condition section, while the reference numeral 4-2 indicates a processing section.

Figures 16, 17, 18:
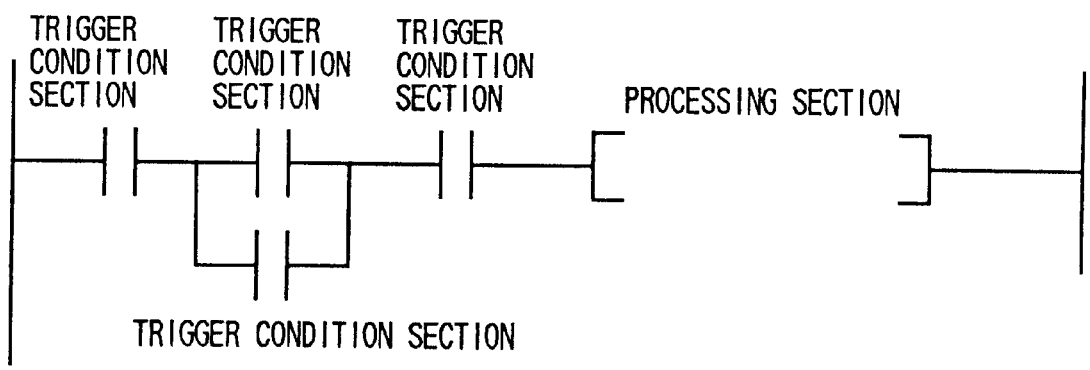
FIG. 16 is an explanatory view illustrating an example of setting in the data logging apparatus according to the invention.
FIG. 17 shows a command available in a trigger condition section according to the invention.
FIG. 18 shows a command available in the trigger condition section according to the invention.

FIG. 17 to FIG. 20 show examples of commands used in the trigger condition section 4-1, and FIG. 17 shows a group of bit trigger commands, FIG. 18 shows an interval trigger command, FIG. 19 shows a group of data comparison commands, and FIG. 20 shows a group of date/time data comparison commands respectively.

FIG. 21 to FIG. 31 show examples of commands used in the processing section 4-2, and FIG. 21 shows a group of bit processing commands, FIG. 22 shows a group of data substitution commands, FIG. 23 shows a group of count processing commands, FIG. 24 shows a group of time accumulation processing command, FIG. 25 shows a group of data clear commands, FIG. 26 shows a group of data save commands, FIG. 27 shows a restart command, FIG. 28 shows a group of log processing commands, FIG. 29 shows a group of up/down load processing commands, FIG. 30 shows a group of PLC control commands, and FIG. 31 shows a group of user program control commands.

Next, a method of setting conditions for a data logging apparatus will be described. Conditions for a data logging apparatus are set up by expressing a trigger condition section 4-1 to describe conditions for execution of logging and a processing section 4-2 to described contents of execution of logging in a ladder format. Herein, the trigger condition section 4-1 decides execution of the processing section 4-2 described hereinafter, and executes a command in the processing section 4-2 when conditions in the trigger condition section 4-1 are satisfied. FIG. 12 is an example where one trigger condition section 4-1 is connected in series to one processing section 4-2. A description is given below of commands available in the trigger condition section 4-1 as well as for commands available in the processing section 4-2.

FIG. 17 shows a group of bit trigger commands each used for describing conditions in bit change in a specified device, for which the condition is effected when a device specified by an PLC or an FAC is switched from OFF to ON, from ON to OFF, ON, or OFF. FIG. 18 shows an interval trigger command, for which the condition is effected once for a specified period of time. FIG. 19 shows a group of data comparison commands, for which the condition is effected according to the values A and B described in the command, and either 16 bits or 32 bits can be specified for A and B, and combination of signs of inequality. FIG. 20 shows a group of time data comparison commands, for which the condition is effected when the specified year, month, day of a week, and time are the same as current time data.

FIG. 21 shows a group of bit processing commands each executing bit change of a specified device, and each command sets or resets a device specified by a PLC or an FAC, and execution of each command is carried out while the connected trigger condition section 4-1 satisfies the conditions. FIG. 22 shows a group of data substitution processing commands each substituting S for D, and either 16 bits or 32 bits can be selected for S and D. FIG. 23 shows a group of count processing commands each executing up-count or down-count of times when the condition is effected, and either 16 bits or 32 bits can be selected for D.

FIG. 24 shows a group of time accumulation processing commands each executing accumulation of time when the condition is effected by a unit of minute, and either 16 bits or 32 bits can be selected for D. FIG. 25 shows a group of data clear commands each clearing devices used in a data logger in a PLC or in FAC or a shared memory to 0, and execution of each command is started when the collected trigger condition 4-1 satisfies the conditions. FIG. 26 shows a data saves command, and this command saves a device used in a data logger in a PLC in an FAC and terminates operation of the data logger. FIG. 27 shows a restart command, and sets data saved according to the data save command from the FAC to the PLC and restarts operation of the data logger.

FIG. 28 shows a group of log processing commands as described below.

(1) WLOG Command

This command is for a word device in a PLC, computes date,time,transitional values, maximum value, minimum value, average value, and accumulated value, and develops the values in a shared memory of the PLC.

(2) BLOG Command

This command is for a bit device in a PLC, computes date, time, transitional values, times of switching from OFF to ON, times of switching from ON to OFF, times of ON/OFF switching, accumulated ON time, and accumulated OFF time, and develops the values in a shared memory in an FAC.

(3) ALARM Command

This command develops date, time of generation, time of termination, message, and alarm level on a shared memory in an FAC.

(4) WRITE Command

This command writes a date set in a shared memory in an FAC as continuous data in a specified device in a specified device.

(5) WRITERAN Command

This command writes a data set in shared memory in an FAC as random data in a specified device in a specified PLC.

(6) READ Command

This command sets continuous data in the specified device in the specified PLC in the shared memory in the FAC.

(7) READRAN Command

This command sets random data in the specified device in the specified PLC in the shared memory of the FAC.

(8) SAVE Command

This command writes data developed in a shared memory in an FAC by WLOG command, BLOG command, ALARM command, READ command, READRAN command in a specified file.

FIG. 29 shows a group of up/down load commands each executing down-load or up-load of contents of a buffer memory such as device data, sequence programs, parameter, comments, and specific units from a FAC to a specified PLC. FIG. 30 shows a group of PLC control commands as described below.

(1) REMOTE Command

This commands executes RUN/STOP/PAUSE/RESET for a specified PLC.

(2) SETTIME Command

This commands reads time of a specified PLC into an FAC.

(3) READTIME Command

This command sets a time of a specified PLC from an FAC.

FIG. 31 shows a user program command, and starts a specified process in a task specified by the FAC.

Figure 13:
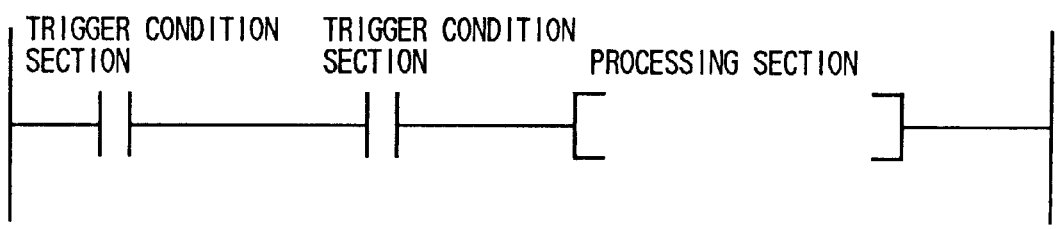
FIG. 13 is an explanatory view illustrating an example of setting in the data logging apparatus according to the invention.

FIG. 13 shows an example where a plurality of trigger condition sections 4-1 are connected in series to each other and the combination is connected to the processing section 4-2. The commands available in both the trigger condition section 4-1 and the processing section 4-2 are the same as those shown in FIG. 12. In this embodiment, the processing section 4-2 is executed when all of the plurality of trigger condition sections 4-1 satisfy the conditions.

Figure 14:
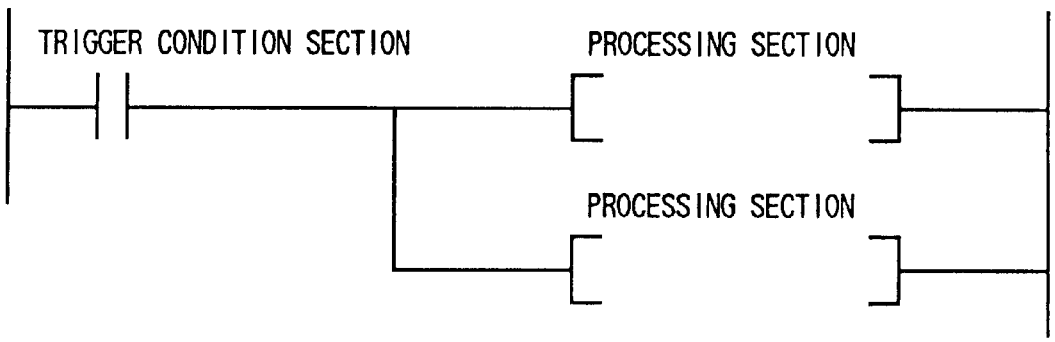
FIG. 14 is an explanatory view illustrating an example of setting in the data logging apparatus according to the invention.

FIG. 14 shows an example where a trigger condition section 4-1 is connected in parallel to a plurality of processing sections 4-2. Commands available in both the trigger condition section 4-1 and the processing section 4-2 are the same as those shown in FIG. 12, and in this embodiment, a plurality of processing sections 4-2 are executed in parallel when one trigger condition section 4-1 satisfies the condition.

Figure 15:
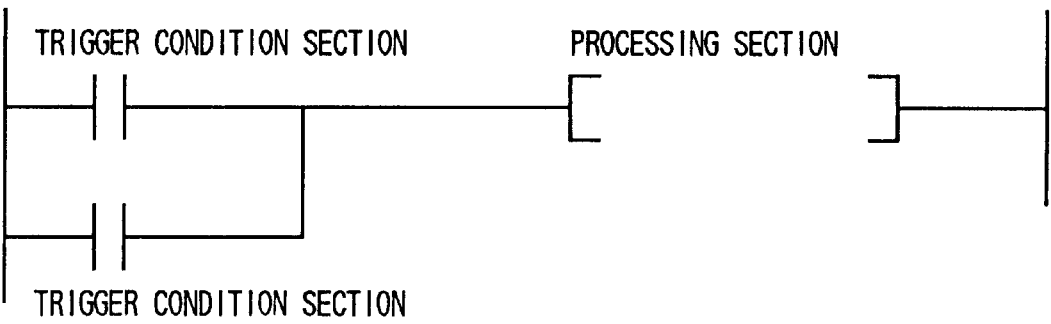
FIG. 15 is an explanatory view illustrating an example of setting in the data logging apparatus according to the invention.

FIG. 15 shows an example where a plurality of trigger condition sections 4-1 are connected in parallel to each other and the processing section 4-2 is connected to the combination. Commands available in both the trigger condition section 4-1 and the processing section 4-2 are the same as those shown in FIG. 12, and in this embodiment, the processing section 4-2 is executed when any of the plurality of trigger condition sections 4-1 satisfies the condition.

FIG. 16 shows an example where a processing section 4-2 is connected to a combination of parallel connected trigger condition sections 4-1 as well as that of serially connected trigger condition sections 4-1. Commands available in both the trigger condition section 4-1 and the processing section 4-2 are the same as those shown in FIG. 12, and in this embodiment the processing section 4-2 is executed when the plurality of trigger condition sections 4-1 satisfy the condition.

Figure 32:
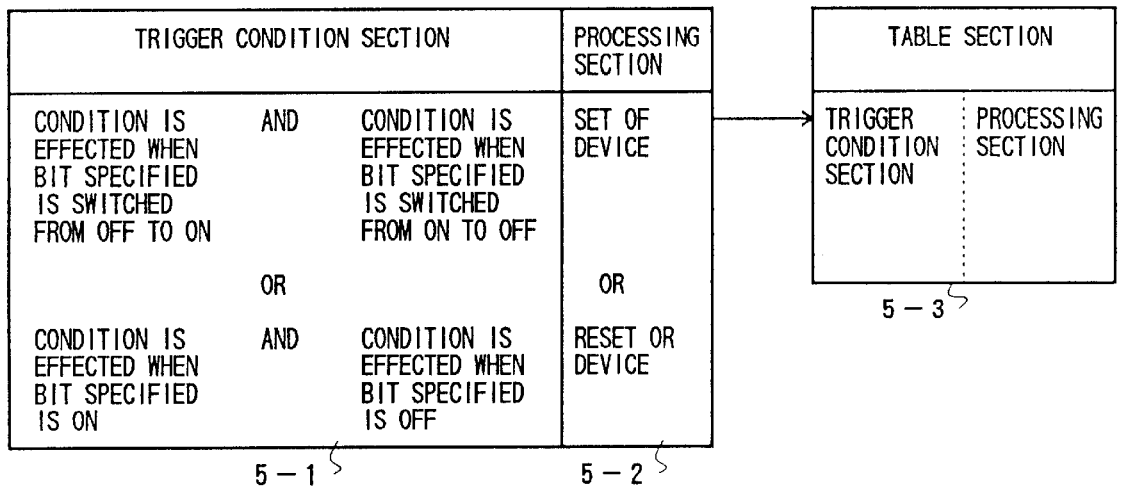
FIG. 32 is an explanatory view illustrating an example of setting in a trigger condition section/processing section according to the invention.
Figure 33:
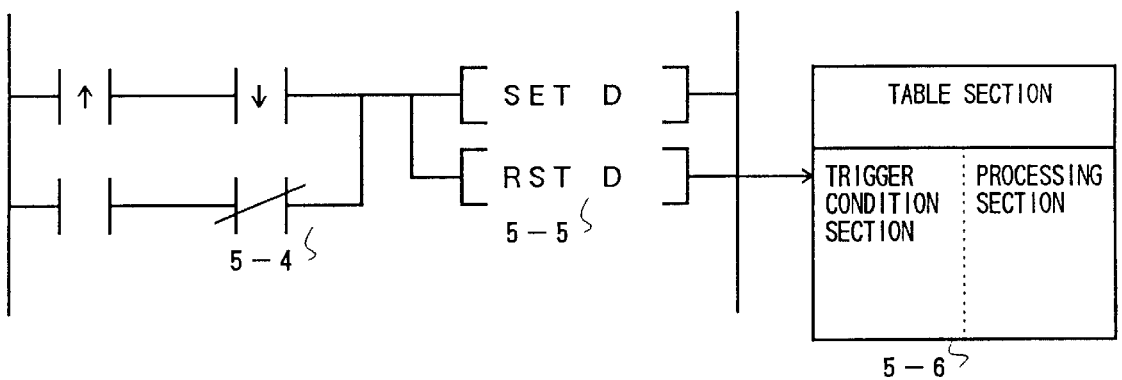
FIG. 33 is an explanatory view illustrating an example of setting in a trigger condition section/processing section according to the invention.

Next, a fifth embodiment of the present invention will be described. FIG. 32 is an explanatory view illustrating an example where logging setting is carried out in a tabular format, and in this figure, designated at the reference numeral 5-1 is a trigger condition section, at 5-2 a processing section, and at 5-3 a table section made according to the logging setting. FIG. 33 shows a logging setting shown with a tabular table shown in FIG. 32 in a ladder format, and FIG. 32 shows the same contents as those shown in FIG. 33. In this figure, designated at the reference numeral 5-4 is a trigger condition section, at 5-5 a processing section, and at 5-6 a table section prepared according to the logging setting.

Next, a method of setting conditions will be described. In this embodiment, conditions for a data logging apparatus are set up by expressing a trigger condition section 5-1 to described conditions for logging and a processing section 5-2 to describe contents of logging to be executed in a tabular format. The commands available in the trigger condition section 5-1 and those available in the processing section 5-2 are the same as those shown in fourth embodiment. In the trigger sections 5-1 commands can be connected to each other both in parallel (AND) and in series (OR) like in the trigger condition section 5-4, and in the processing section 5-2 commands can be connected in series (OR) like in the processing 5-5 shown in FIG. 33. Also irrespective of whether the logging format is a tabular format or a ladder format, the table section 5-3 and 5-6 prepared according to the logging setting have the same format, the same contents are provided.

In this embodiment, examples of executing logging setting in a tabular format and a ladder format were described, but if a data logging apparatus has a means for compiling table sections (5-3, 5-6), it is possible also to realize logging setting on an editor or tabular computing software available in the market.

Figure 34:
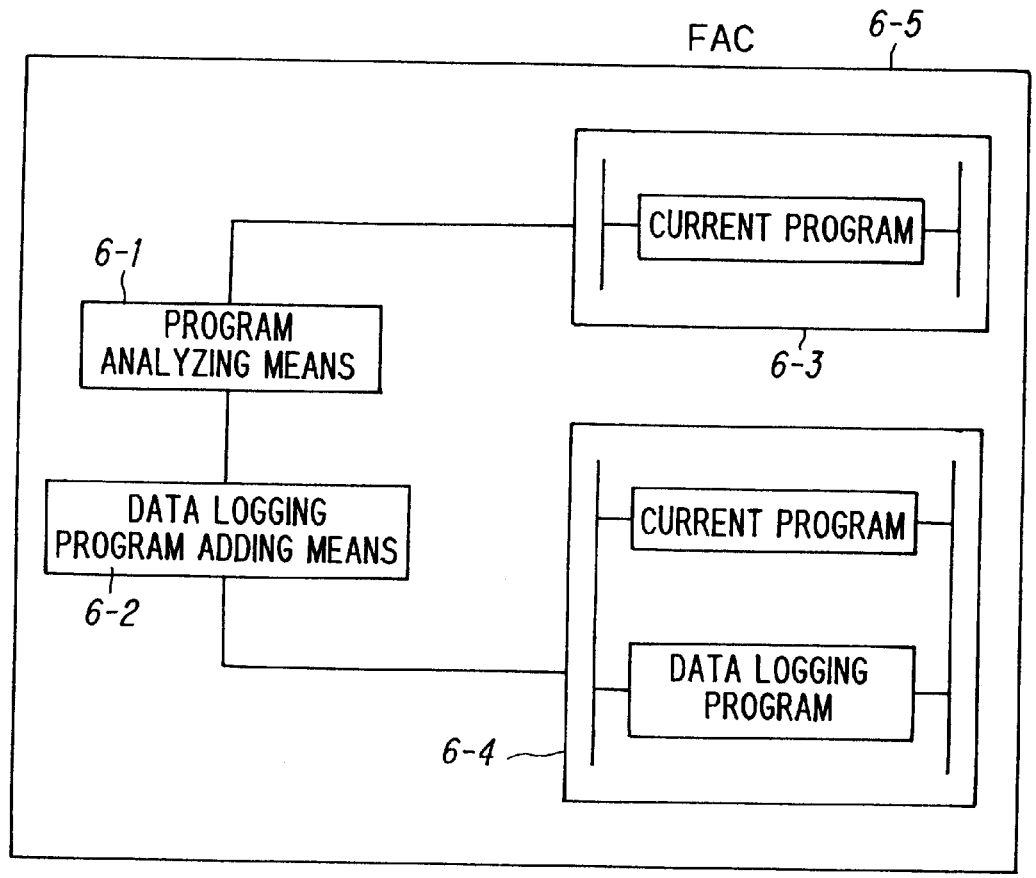
FIG. 34 is a block diagram illustrating configuration of an FAC according to the invention.

Next, a sixth embodiment of the present invention will be described. FIG. 34 is a block diagram illustrating configuration of an FAC of a data logging apparatus according to the present invention, and in this figure, designated at the reference numeral 6-1 is a program analyzing means for analyzing a device used by an administrative PLC, at 6-2 is a data logging program adding means for adding a data logging program to the current program, at is a program of the administrative PLC before addition of the data logging program, at is a program for the administrative PLC with a data logging program added thereto, and at is an FAC.

Figure 35:
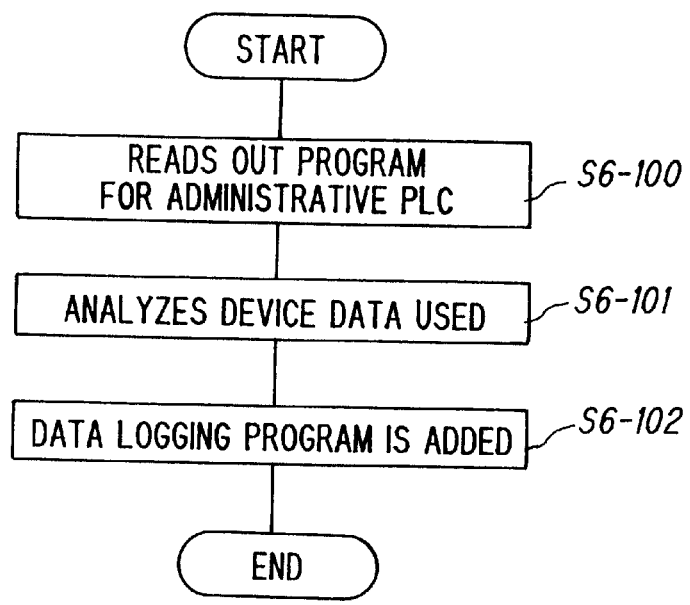
FIG. 35 is a flow chart illustrating operations of a data logging apparatus according to the invention.

Next, operations of a data logging apparatus according to sixth embodiment of the present invention will be described. FIG. 35 is a flow chart illustrating operations of the data logging apparatus according to this embodiment. At first, the data logging program reads out a program for the administrative PLC before addition of the data logging program and develops the program on a memory in an FAC (S 6-100). Then, the program analyzing means 6-1 analyzes device data used by the program 6-3 for the administrative PLC before addition of the data logging program (S 6-101). Furthermore, a data logging program prepared without using a device being used by the program 6-3 for the administrative PLC before addition of the data logging program is added to the program 6-3 for the administrative PLC before addition of the data logging program with the data logging program adding means 6-2 (S 6-102).

Figure 36:
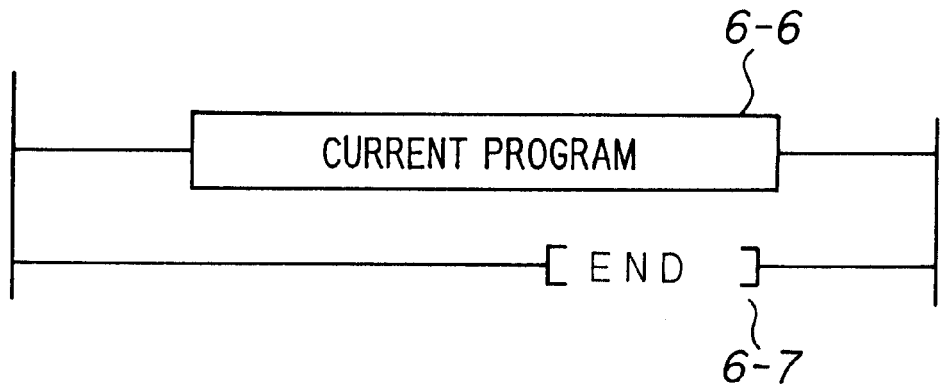
FIG. 36 is an explanatory view illustrating details of a program according to the invention.
Figure 37:
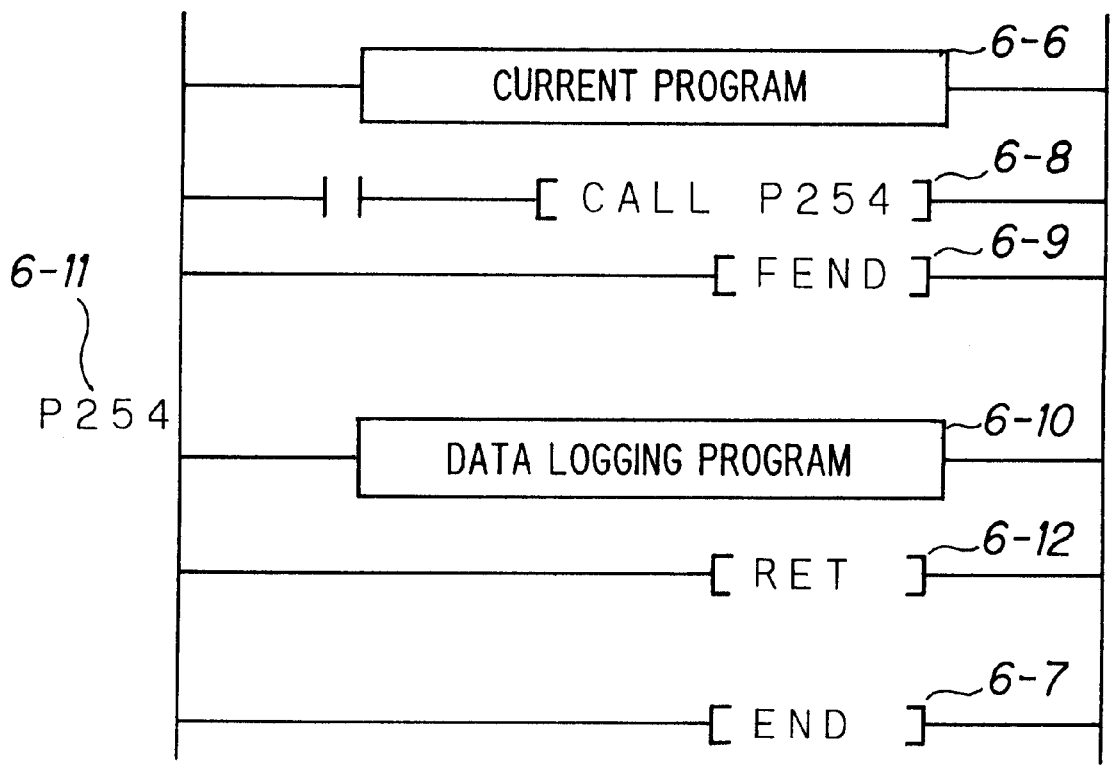
FIG. 37 is an explanatory view illustrating details of a program according to the invention.

FIG. 36 shows contents of the program 6-3 for the administrative PLC before addition of a data logging program in detail, while FIG. 37 shows contents of the program 6-4 for the administrative PLC after addition of the data logging program. FIG. 36 shows the END command 6-7 specifying the final line of the current program 6-6 as well as of a program in a ladder circuit. FIG. 37 shows an example of a program for an administrative PLC prepared by the data logging program adding means 6-2, and CALL P254 (6-8) which is a command for calling a data logging program after the current program 6-6 and FEND 6-9 which is a command for terminating the main program are added thereto. The data logging program 6-10 is regarded as subroutine when viewed from the side of main program, and this command comprises P254 (6-11) indicating a pointer in the head, RET 6-12 which is a command terminating a subroutine finally, and END command indicating a final line of a ladder program. Description of this embodiment assumes that a data logging program is a subroutine, but it is possible to add the data logging program to a main routine, and also the description assumes that the header pointer of the data logging program is P254 (6-11), but a different number of allowable.

Figure 38:
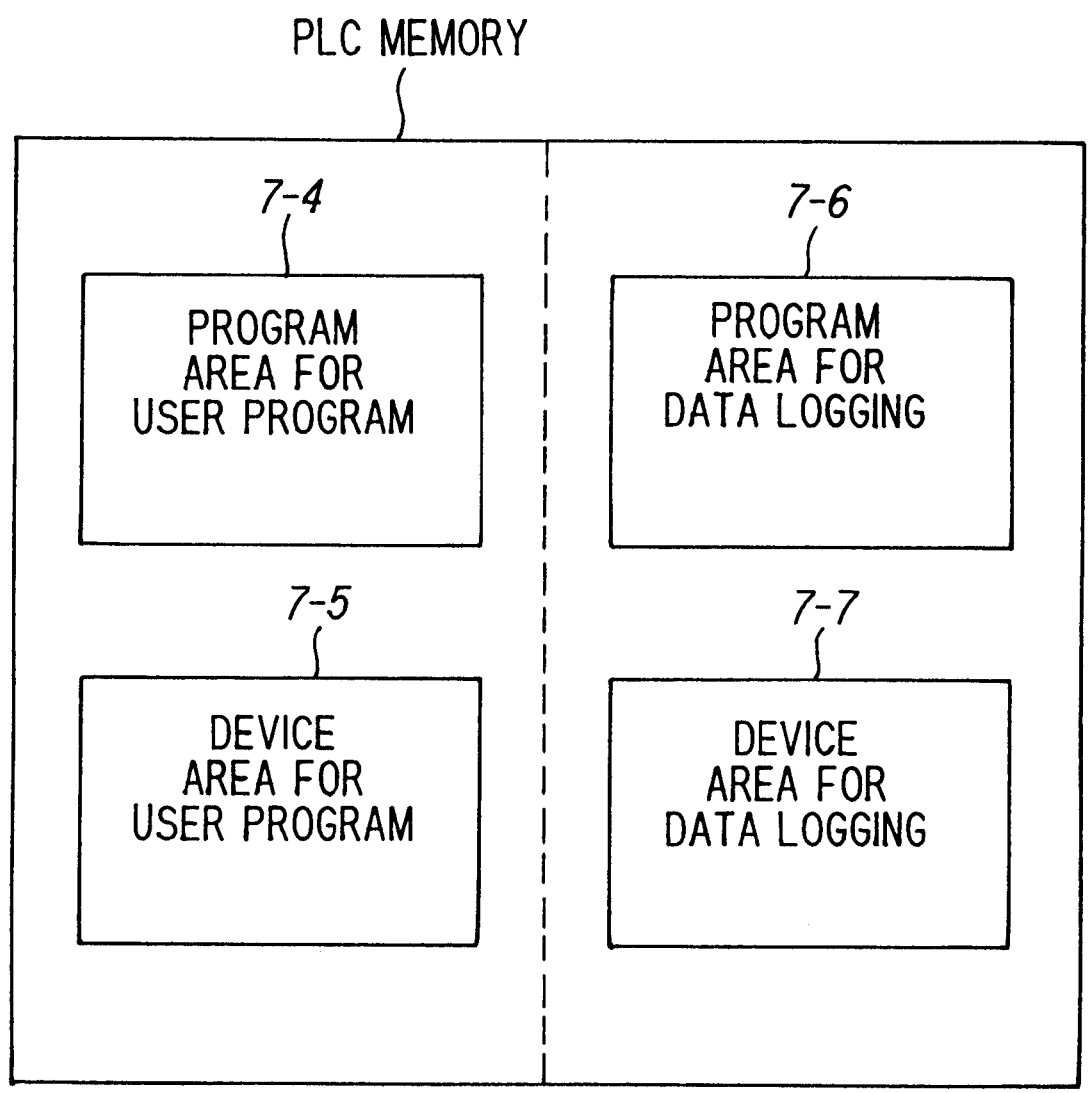
FIG. 38 is a block diagram illustrating contents of a PLC memory according to the invention.
Figure 60:
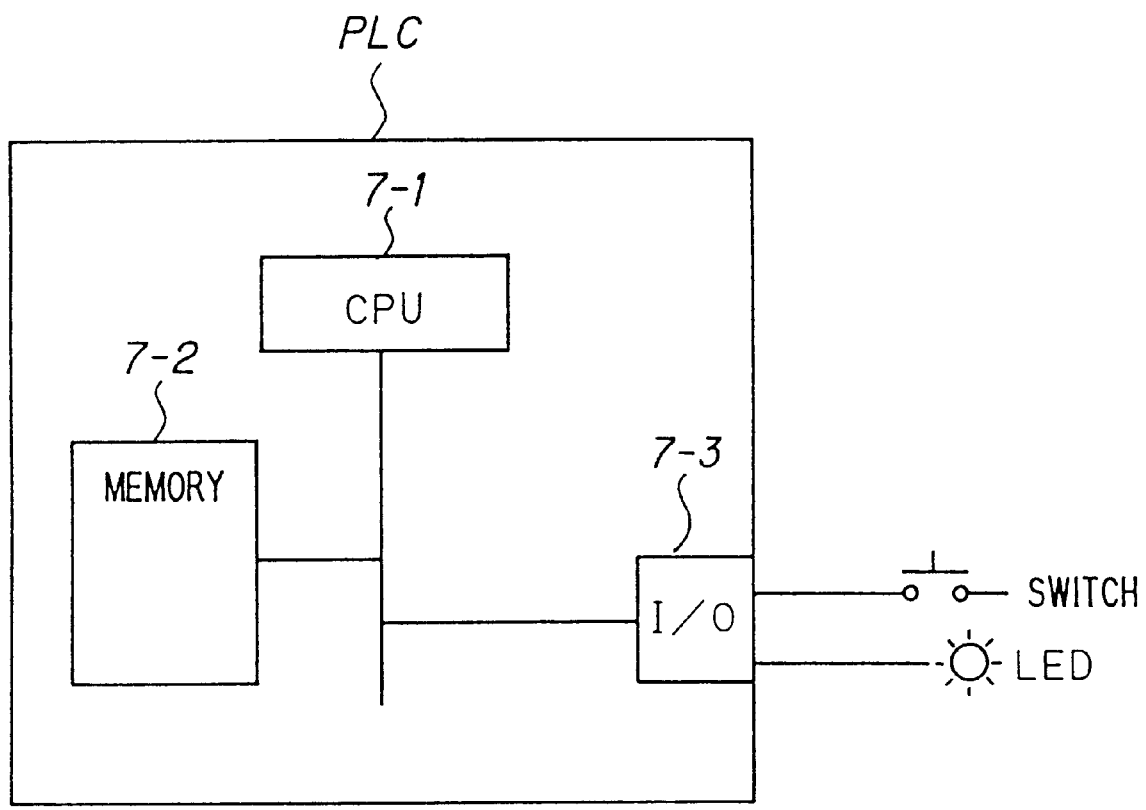
FIG. 60 is a block diagram illustrating configuration of a conventional type of PLC.
Figure 61:
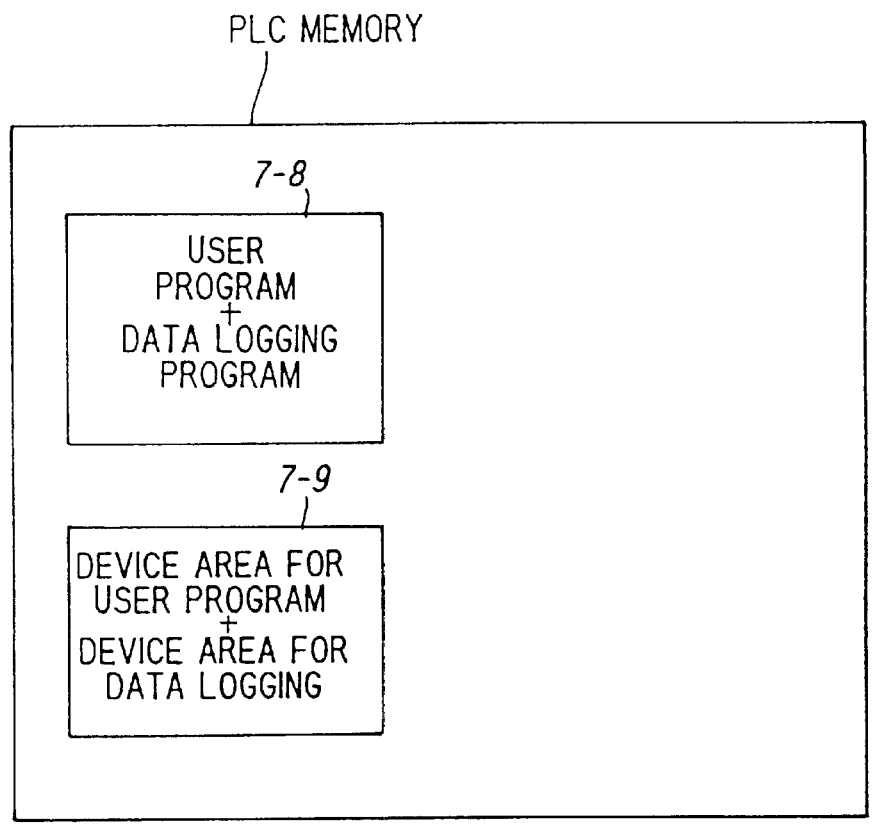
FIG. 61 is an explanatory view illustrating contents of a conventional type of PLC memory.
Figure 62:
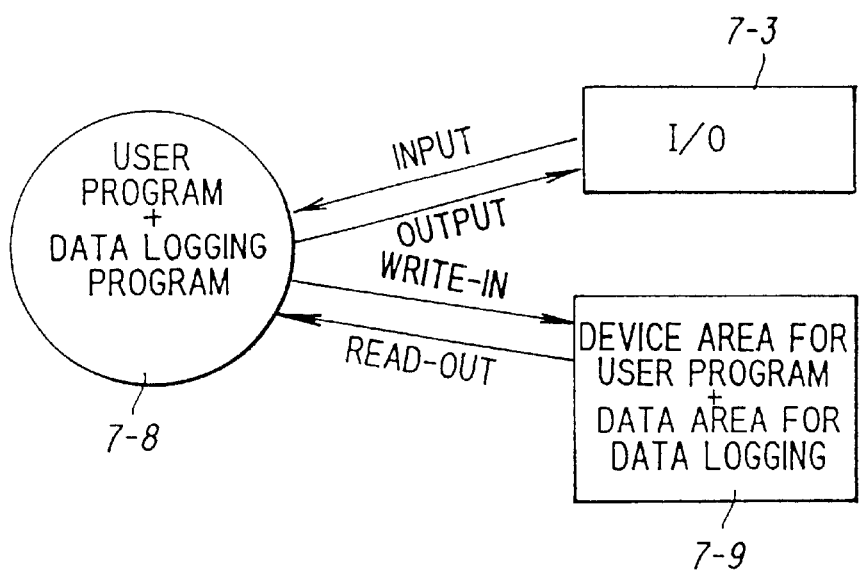
FIG. 62 is a functional diagram illustrating functions of a conventional type of data logging apparatus.
Figure 63:
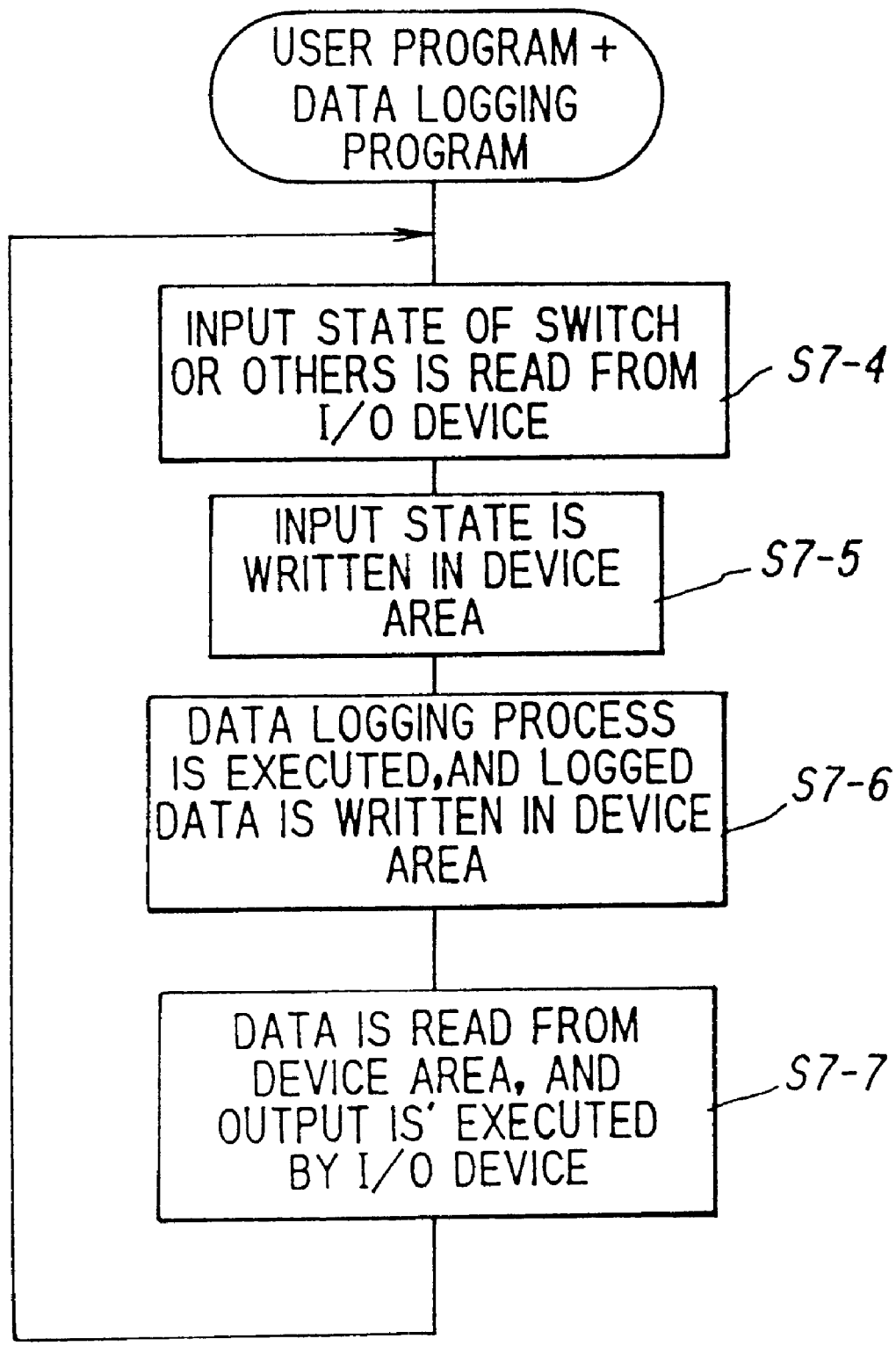
FIG. 63 is a flow chart illustrating operations of a conventional type of data logging apparatus.
Figure 65:
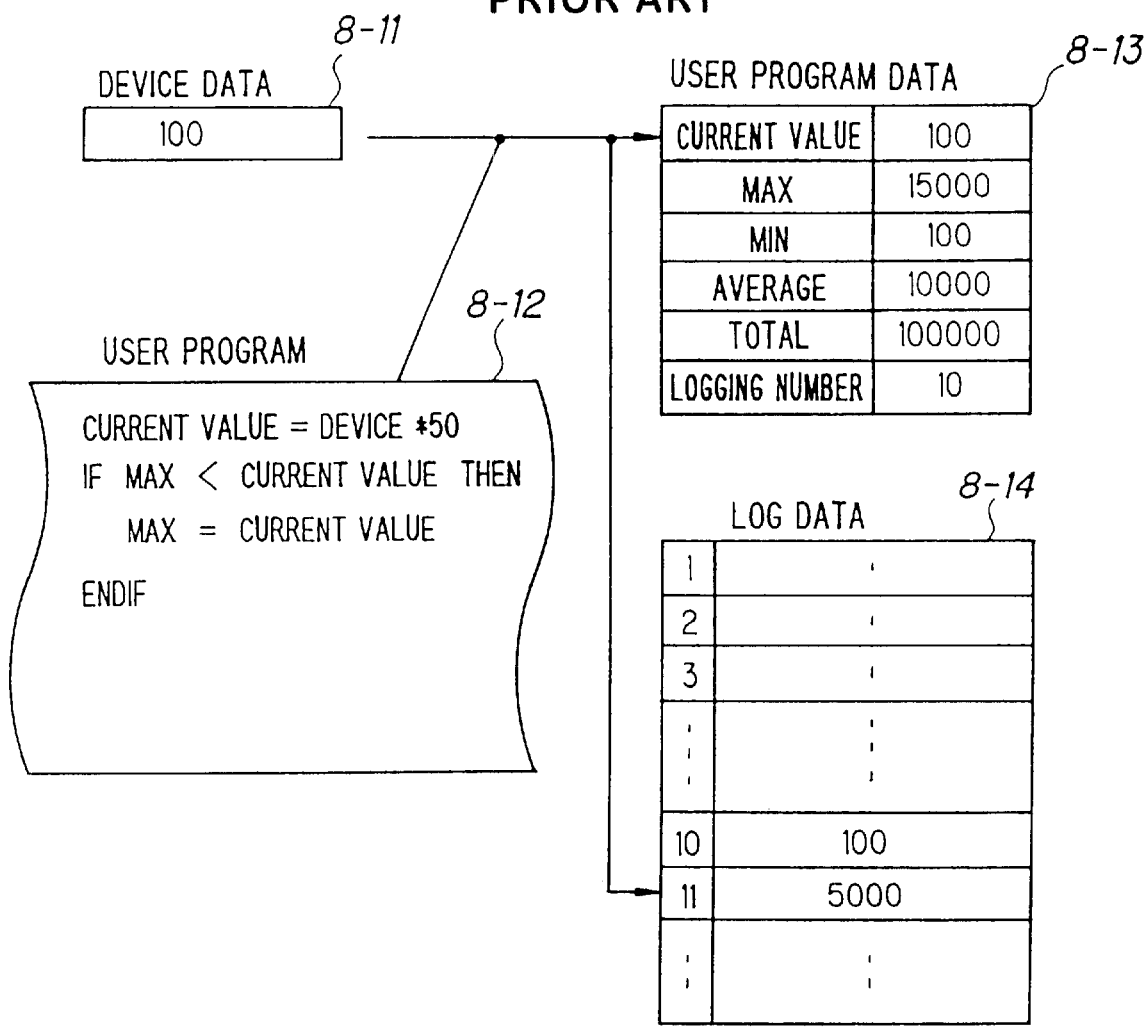
FIG. 65 is an explanatory view illustrating contents of a memory in a conventional type of FAC.
Figure 66:
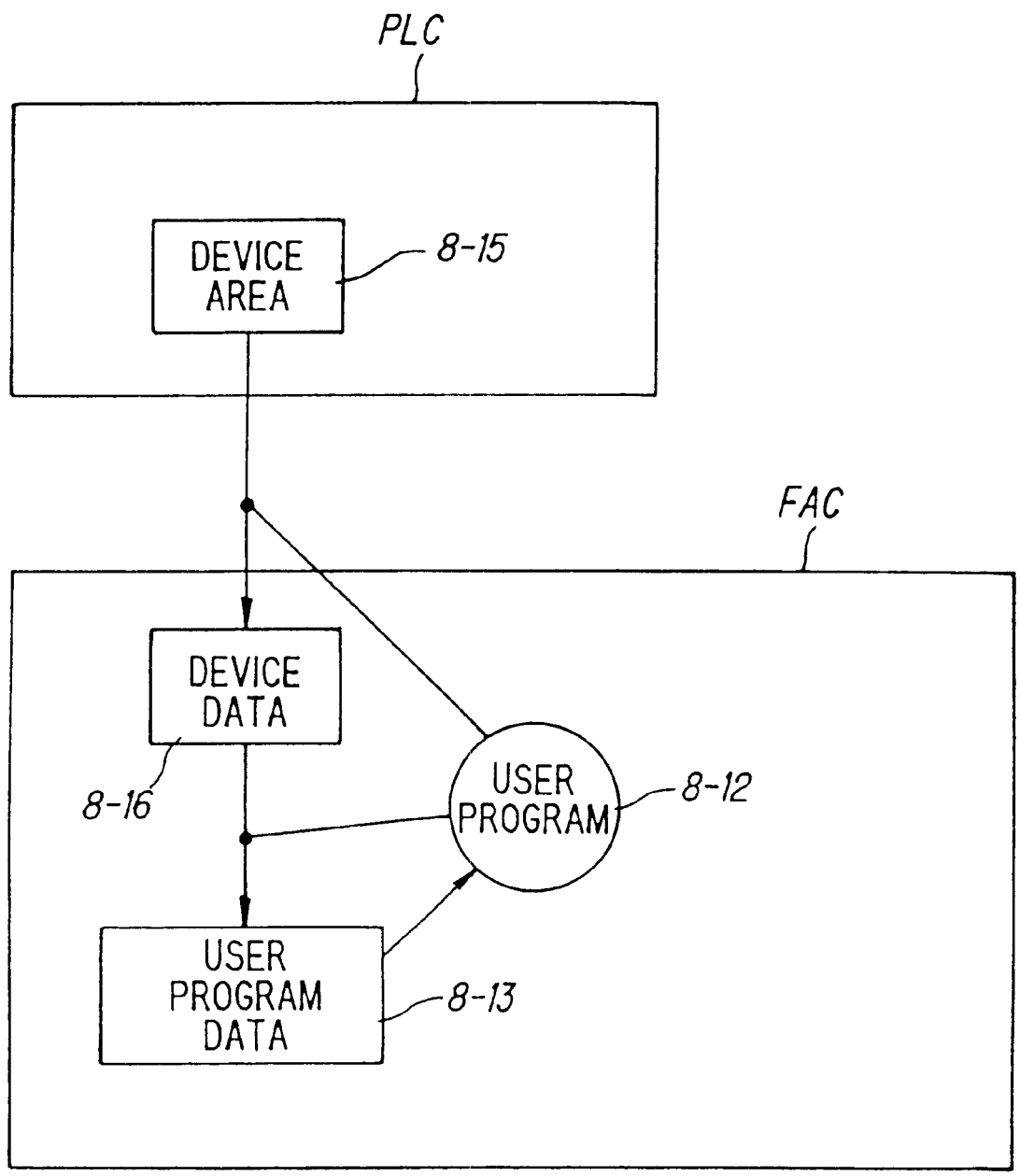
FIG. 66 is a functional diagram illustrating functions of a conventional type of data logging apparatus.
Figure 67:
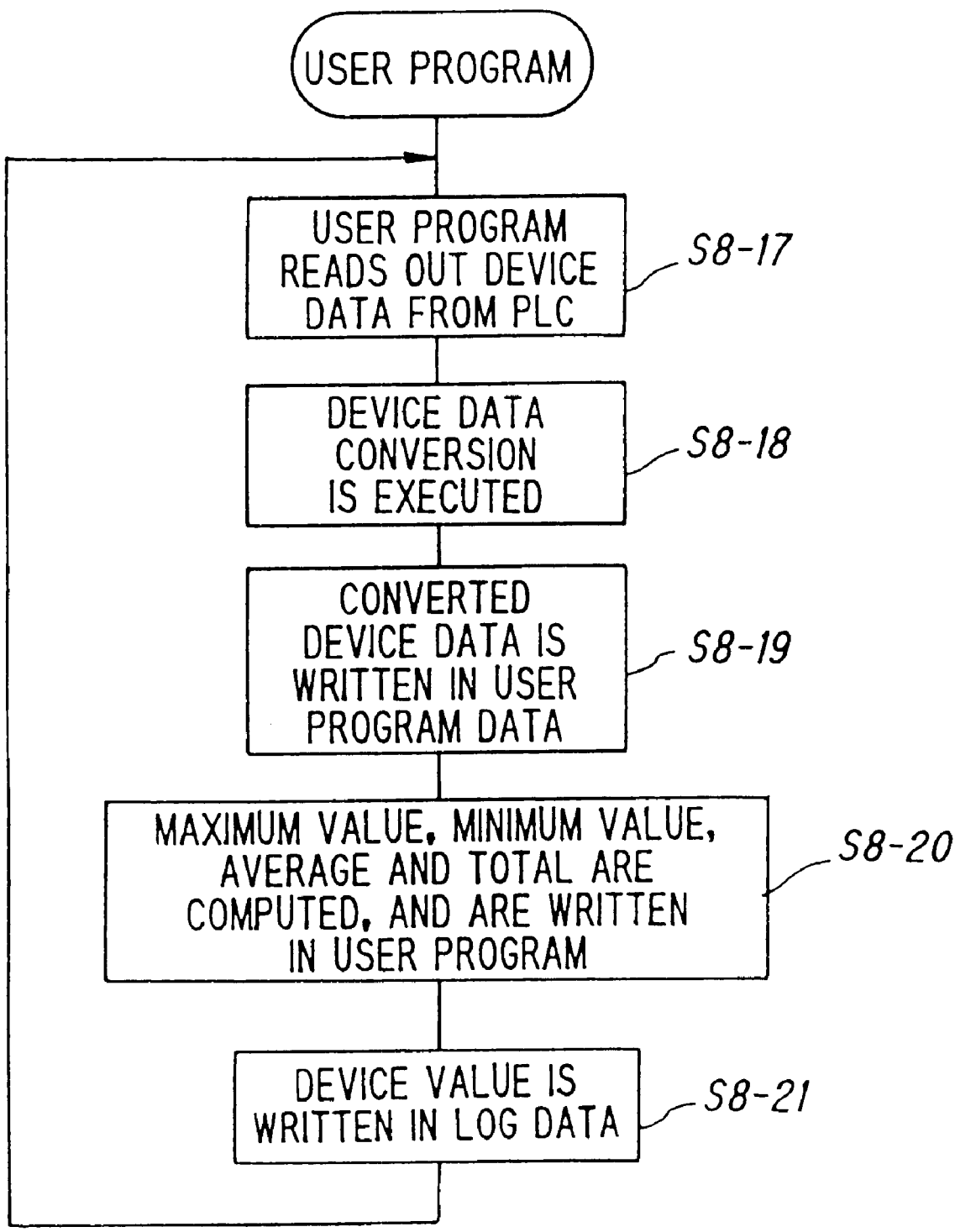
FIG. 67 is a flow chart illustrating operations of a conventional type of data logging apparatus.
Figure 68:
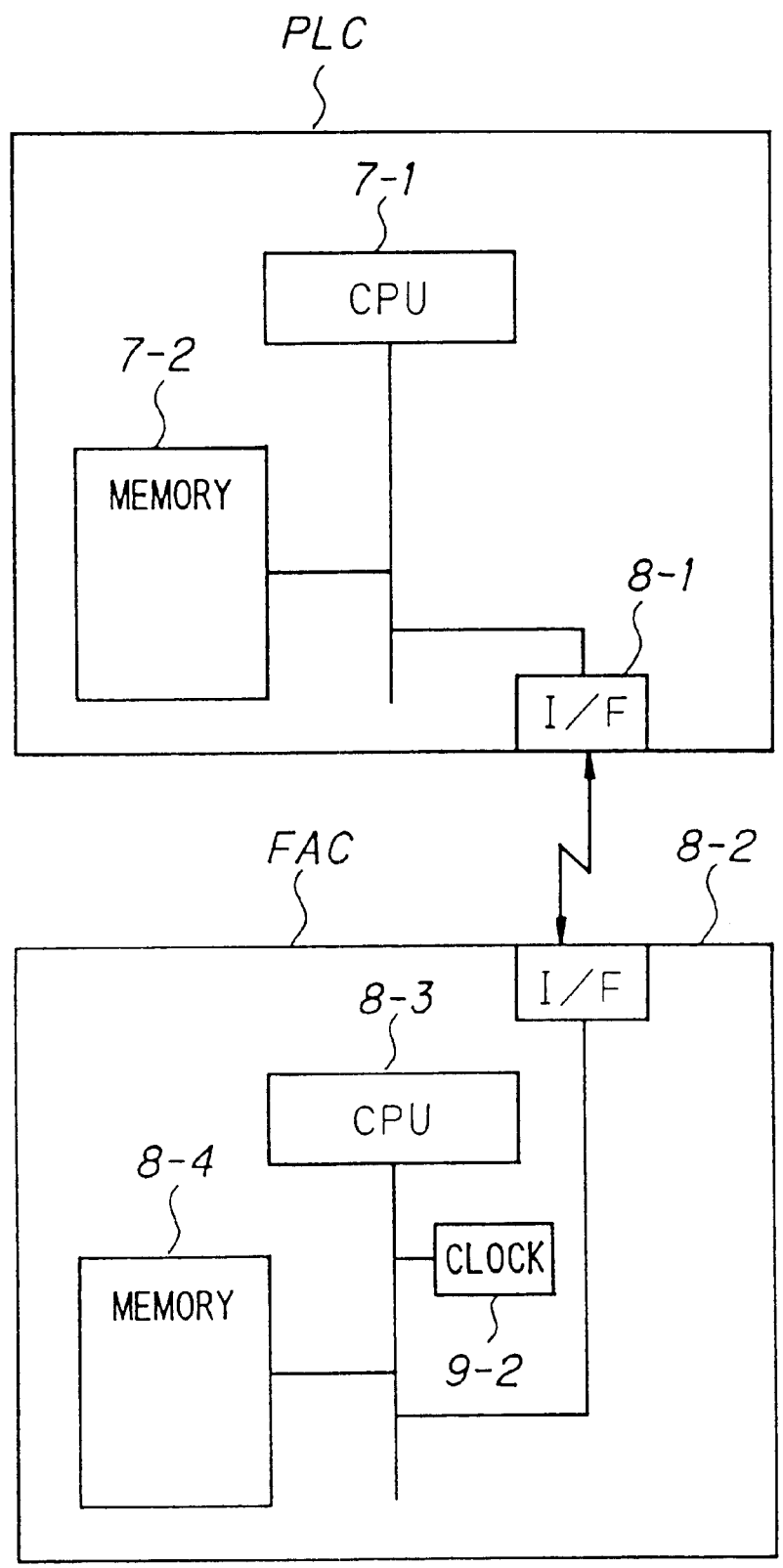
FIG. 68 is a block diagram illustrating general configuration of a conventional type of data logging apparatus.
Figure 69:
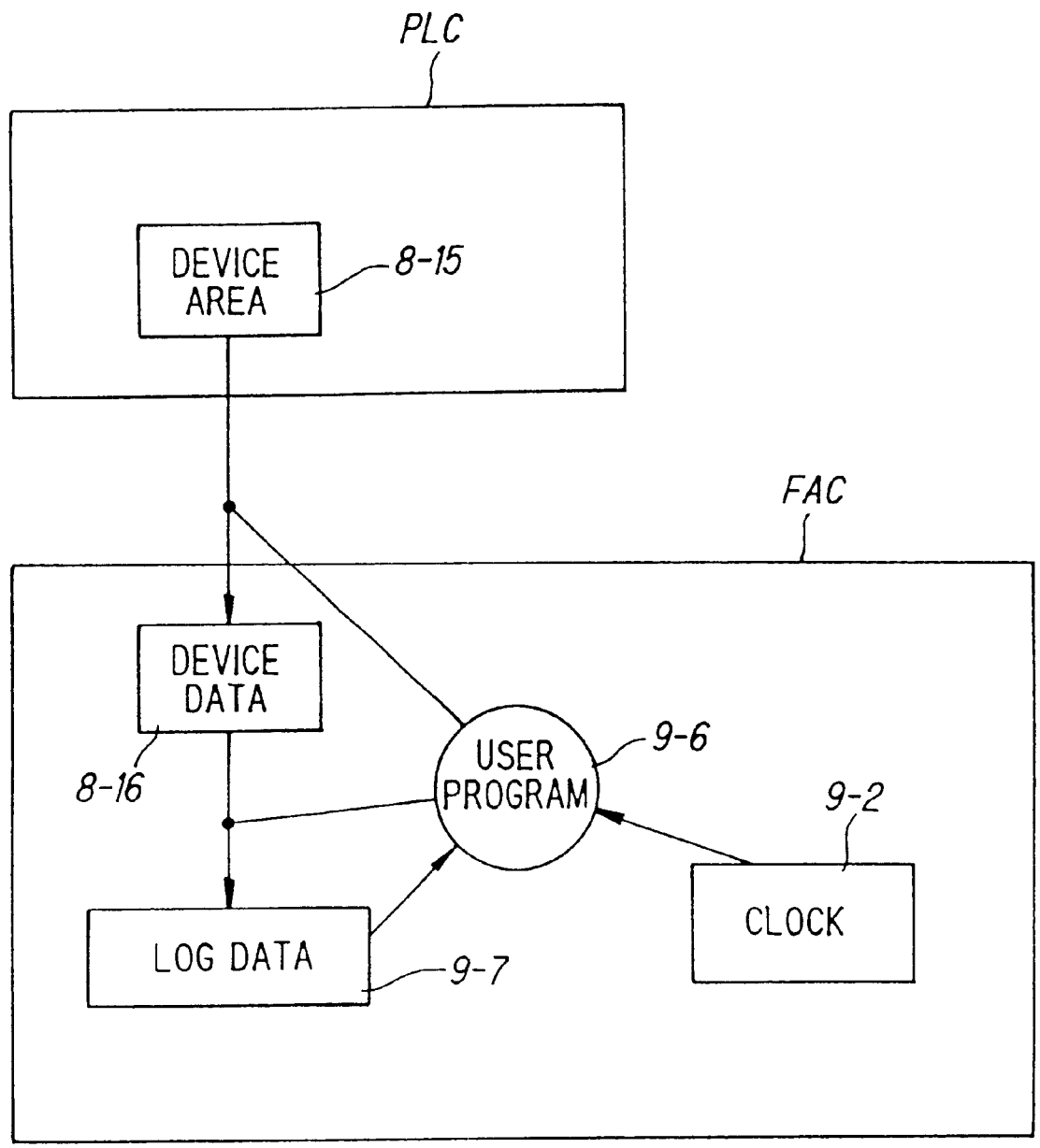
FIG. 69 is a functional diagram illustrating functions of a conventional type of data logging apparatus.
Figure 70:
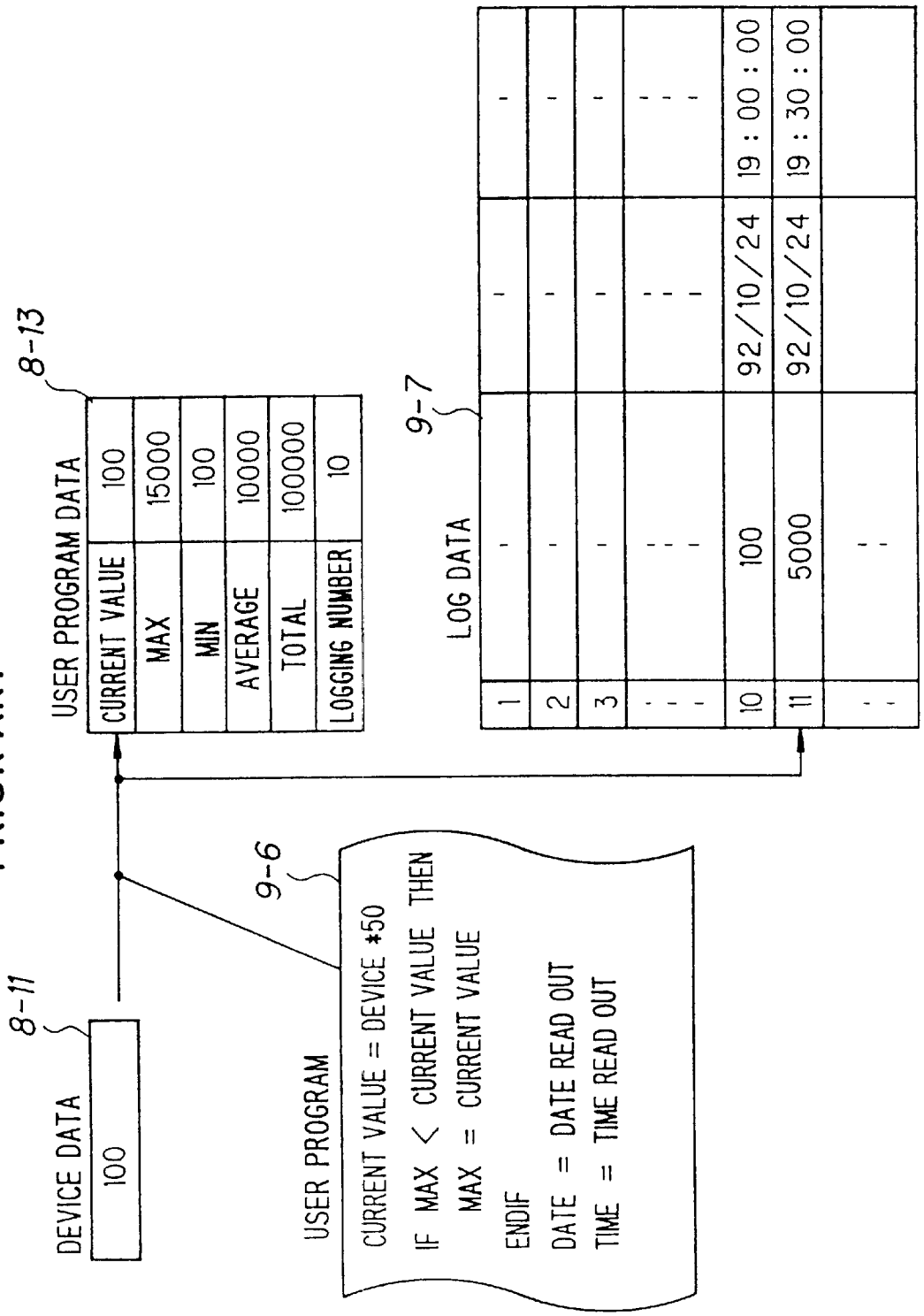
FIG. 70 is an explanatory view illustrating contents of a memory in a conventional type of FAC.
Figure 71:
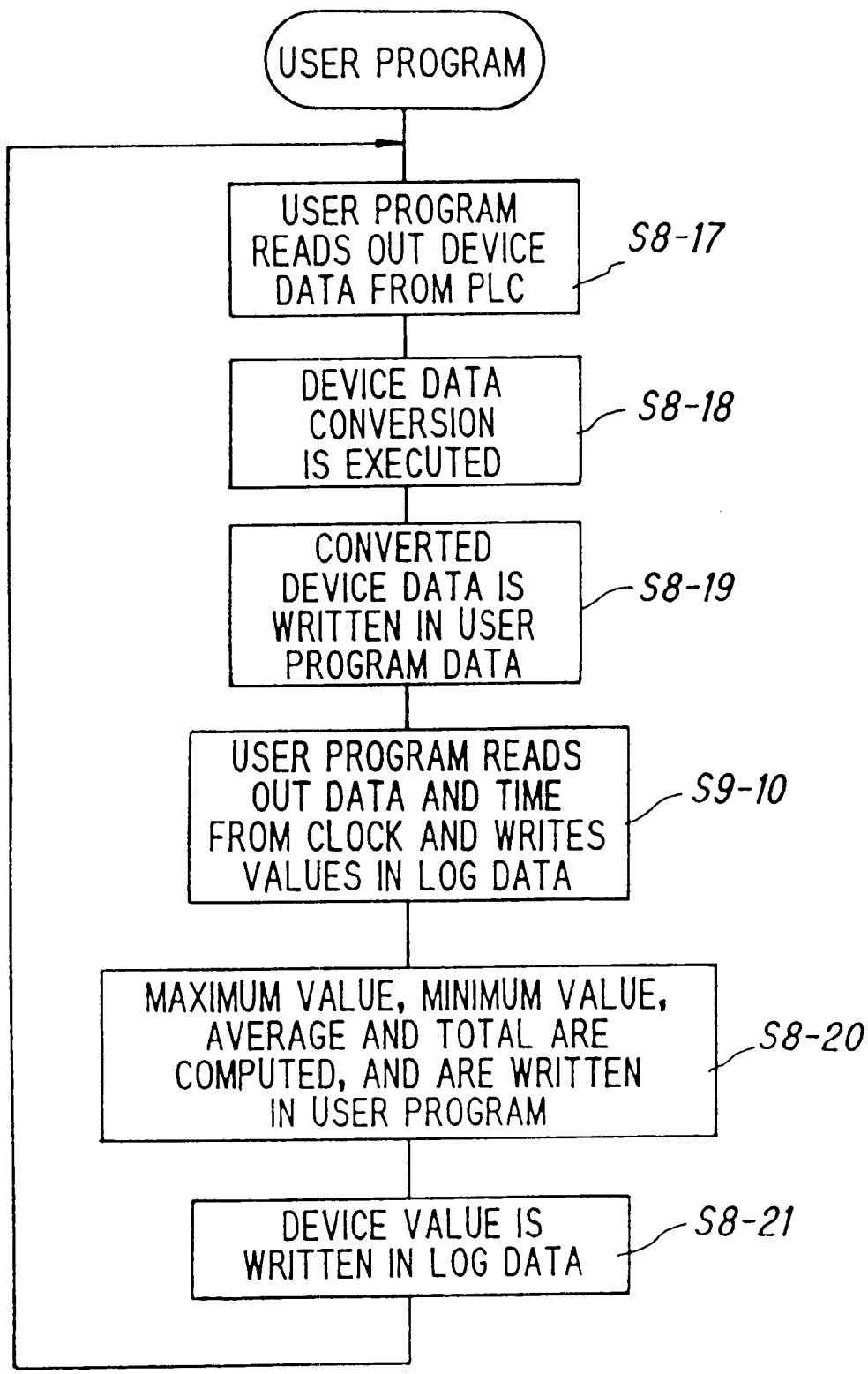
FIG. 71 is a flow chart illustrating operations of a conventional type of data logging apparatus.
Figure 72:
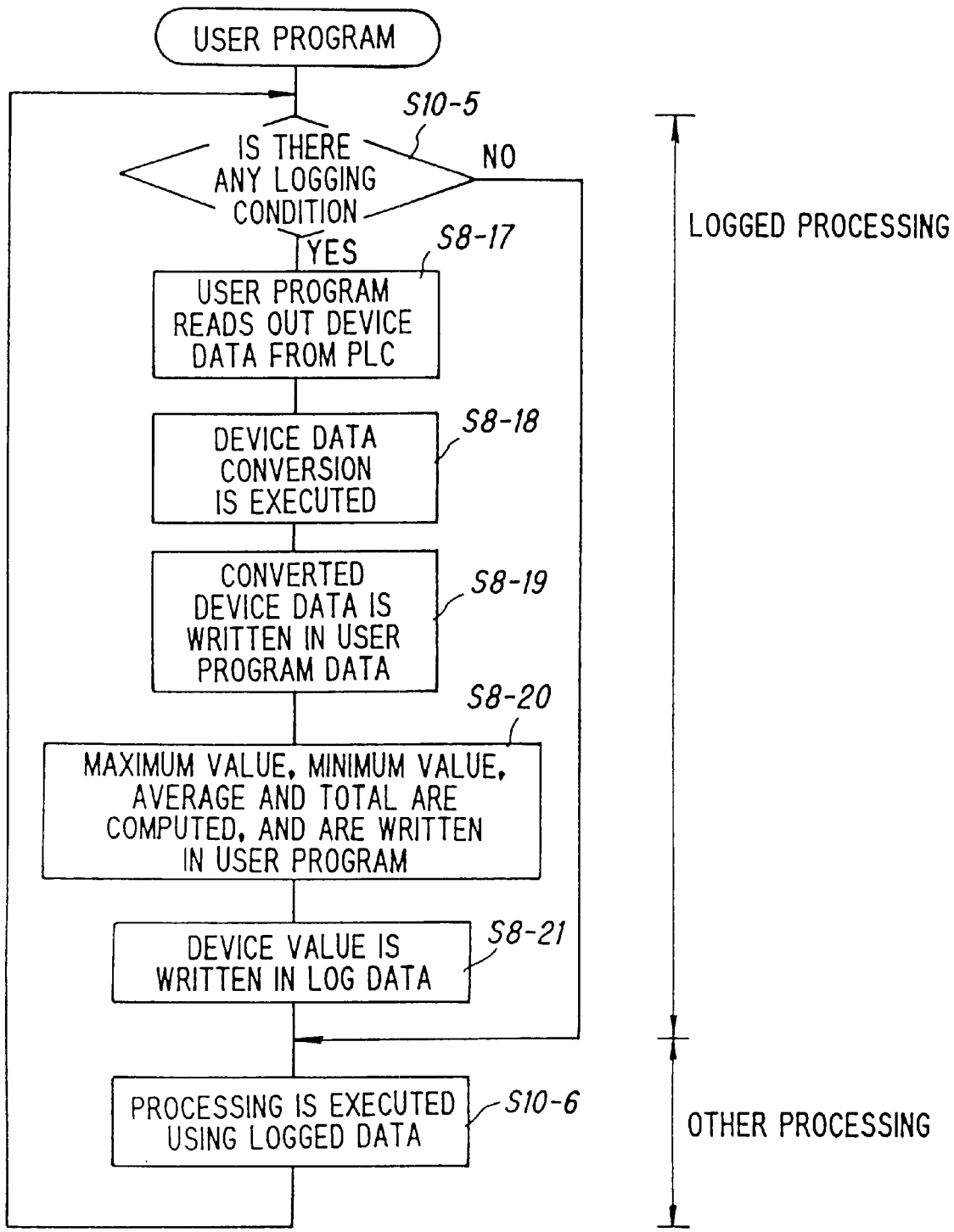
FIG. 72 is a flow chart illustrating operations of a conventional type of data logging apparatus.
Figure 74:
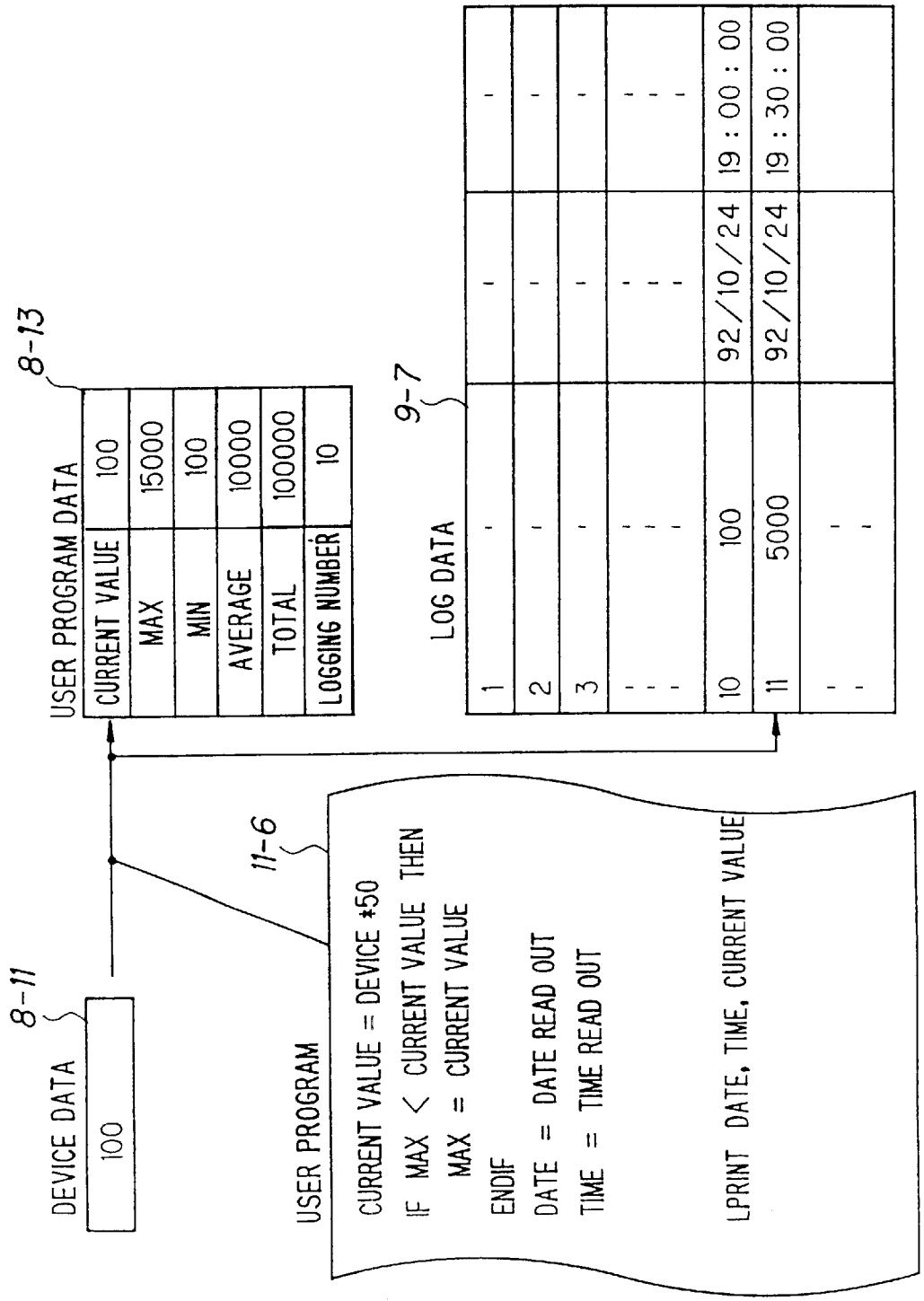
FIG. 74 is an explanatory view illustrating contents of a memory in a conventional type of FAC.
Figure 75:
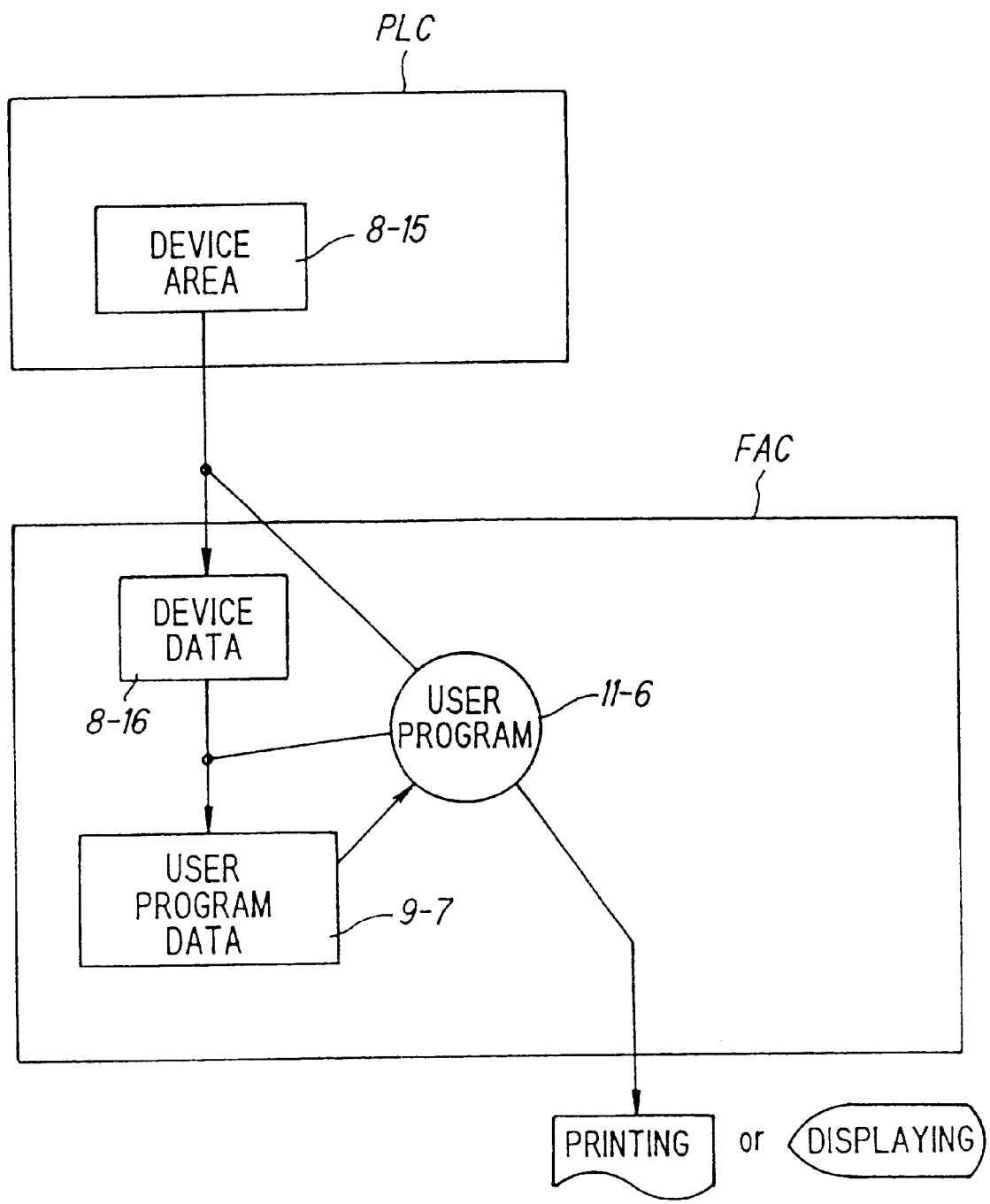
FIG. 75 is a functional view illustrating functions of a conventional type of data logging apparatus.
Figure 76:
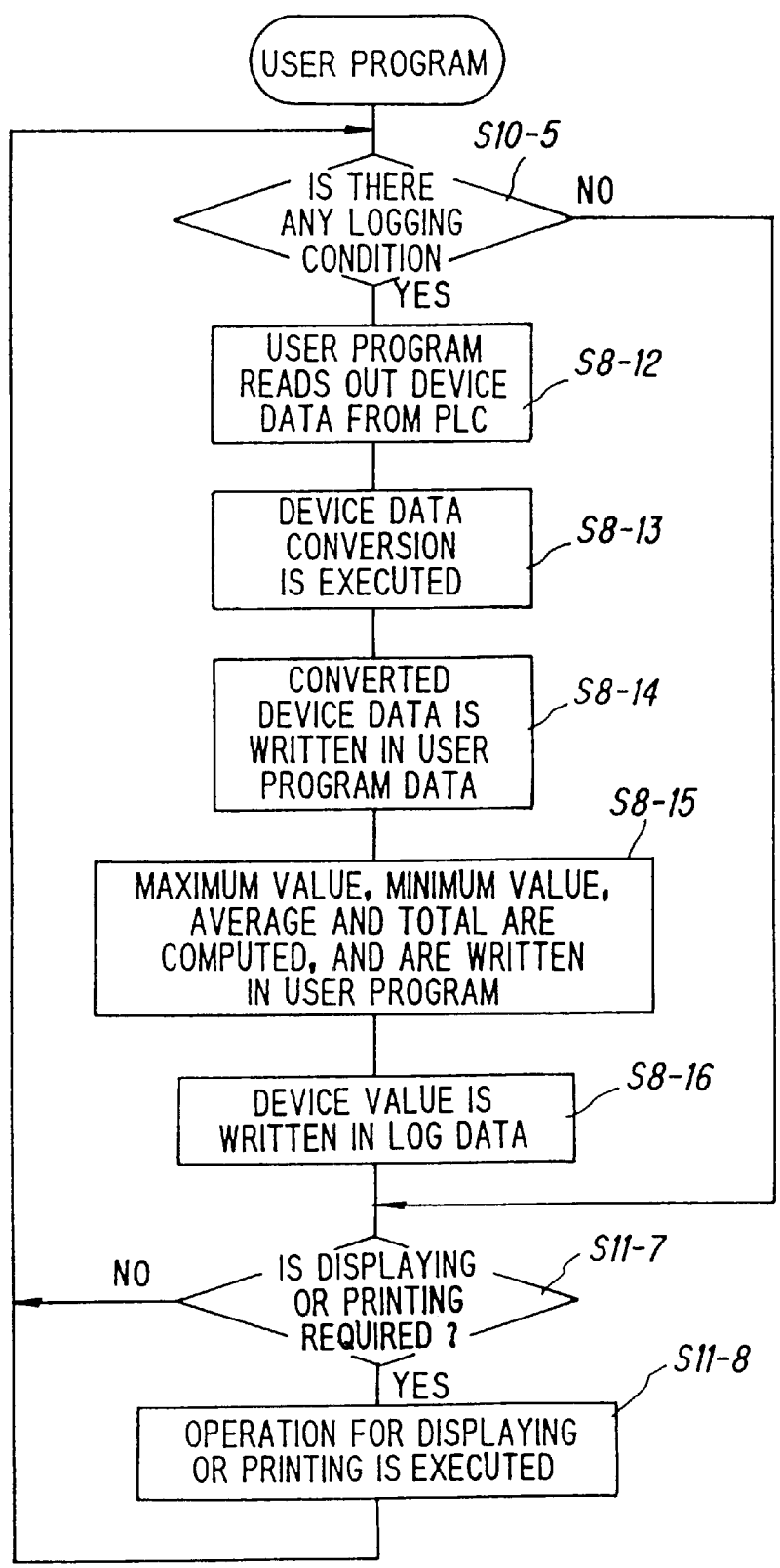
FIG. 76 is a flow chart illustrating operations of a conventional type of data logging apparatus.
Figure 77:
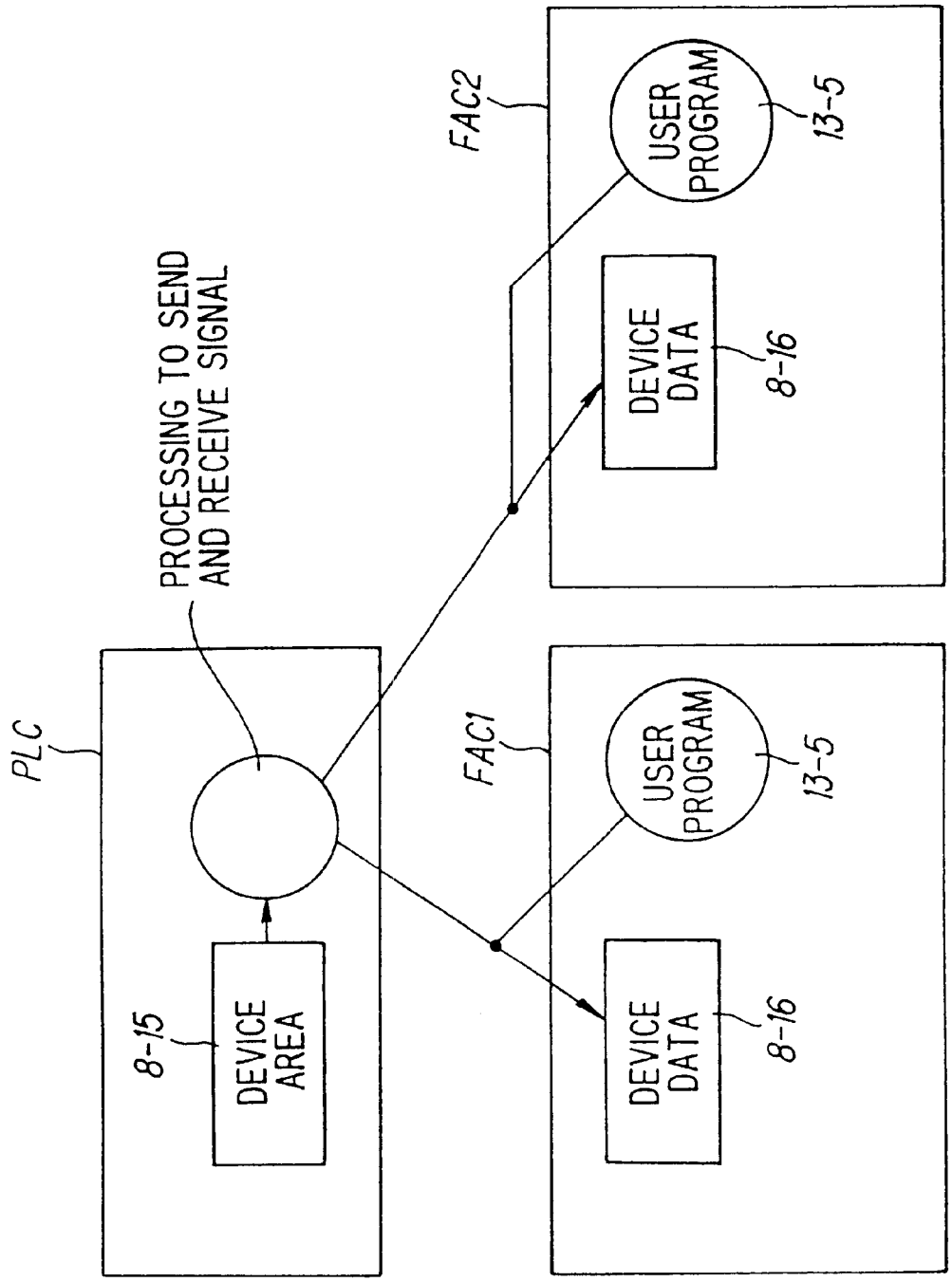
FIG. 77 is a functional diagram illustrating functions of a conventional type of data logging apparatus.
Figure 78:
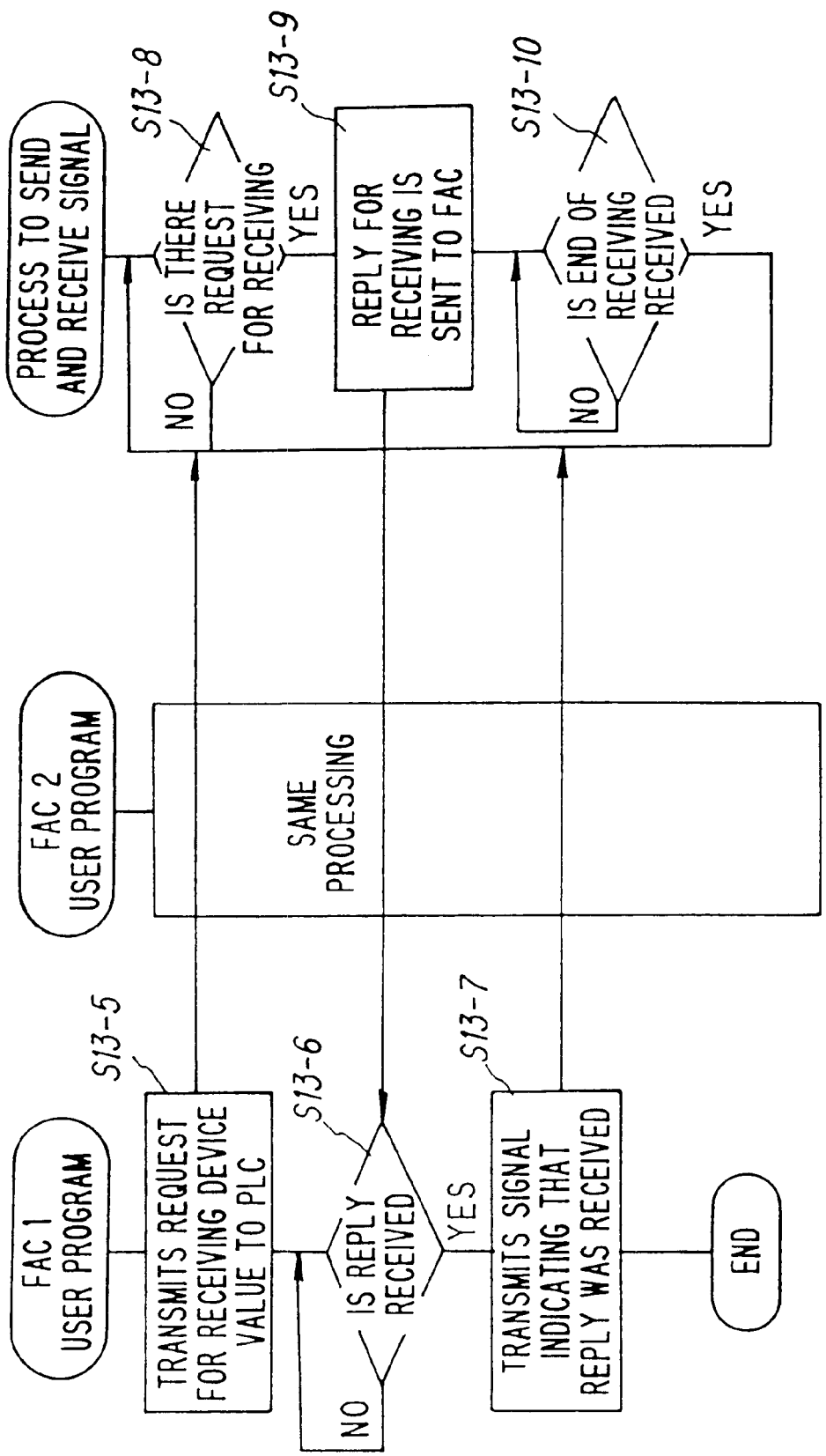
FIG. 78 is a flow chart illustrating operations of a conventional type of data logging apparatus.
Figure 79:
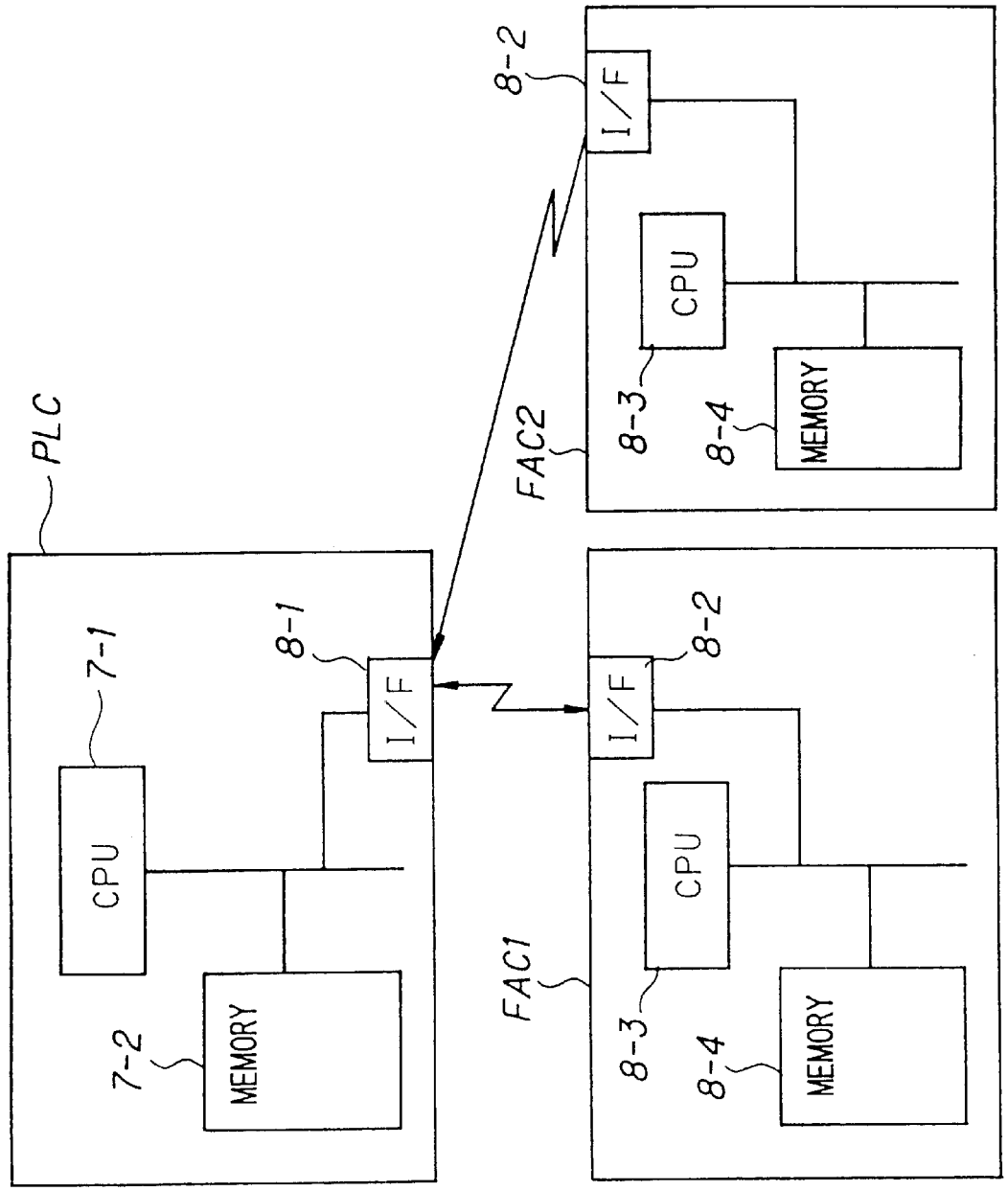
FIG. 79 is a block diagram illustrating general configuration of a conventional type of data logging apparatus.

Next, a seventh embodiment of the present invention will be described. FIG. 38 is an explanatory view illustrating contents of a PLC memory according to the present invention, and configuration of the PLC is the same as that shown in FIG. 60, so that the same numbers are used in the following description. In this figure, designated at the reference numeral 7-4 is a user program into which a switch ON/OFF state is inputted from an I/O device and which provides displays of LED or others, at 7-6 a data logging program for logging a switch state at a certain time interval, at 7-5 a device area in which data computed by the user program is stored, and at 7-7 a device area in which data logged by the data logging program is stored.

Figure 39:
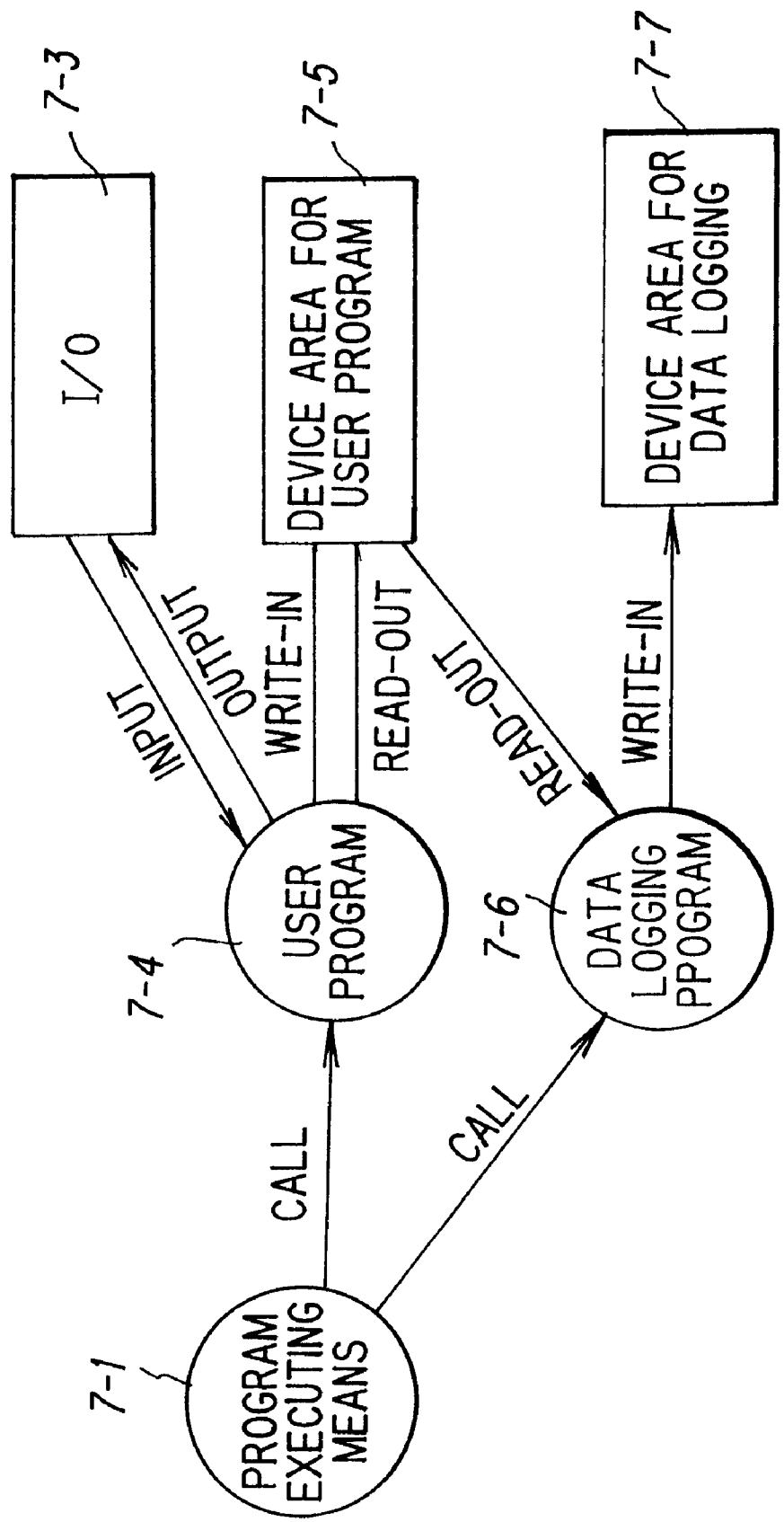
FIG. 39 is a functional diagram for explanation of functions of a data logging apparatus according to the invention.
Figure 40:
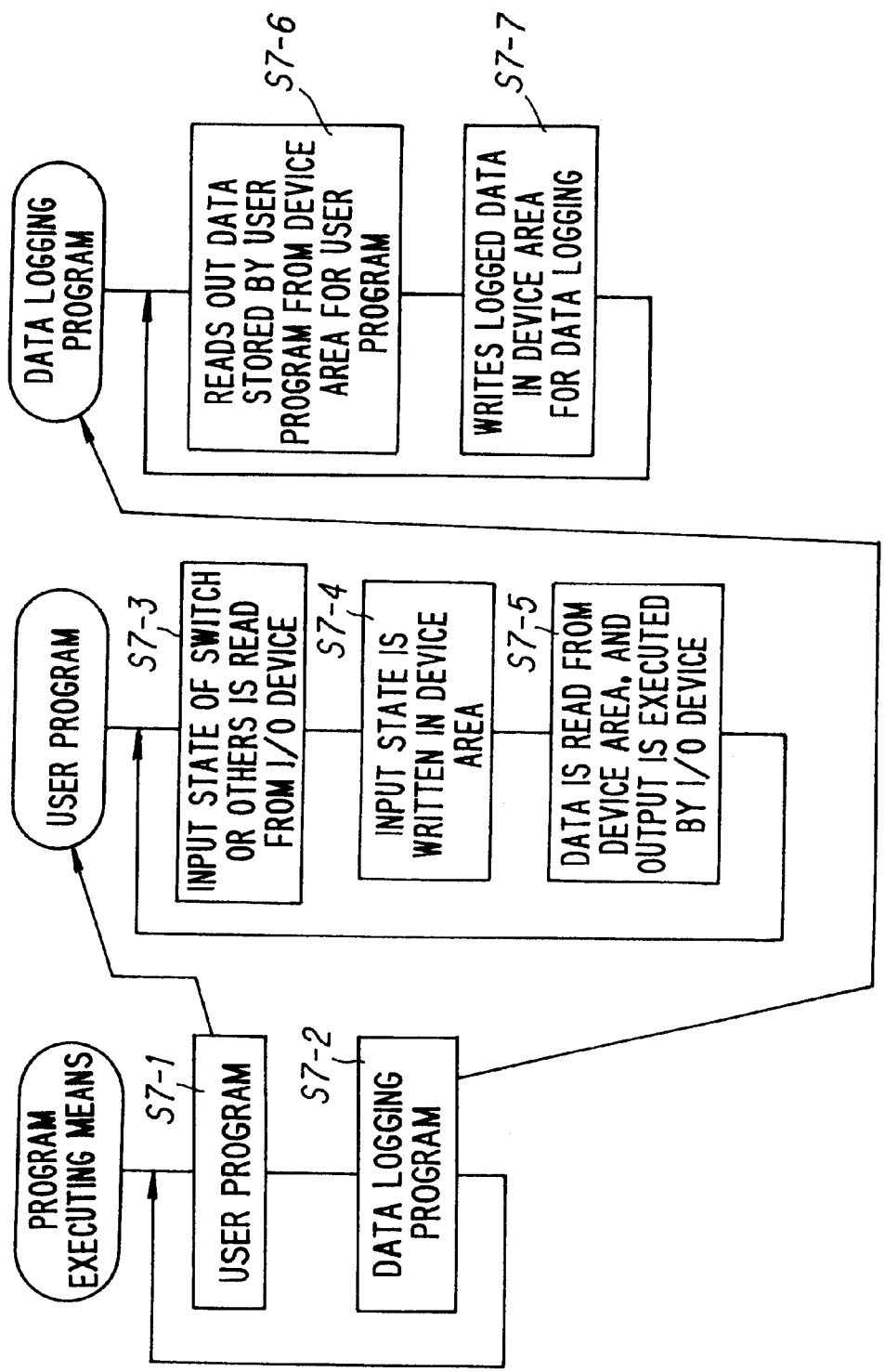
FIG. 40 is a flow chart illustrating operations of the data logging apparatus according to the invention.

FIG. 39 is a functional diagram illustrating functions of a data logging apparatus according to this embodiment, and in this figure, the reference numeral 7-1 indicates a CPU (program executing means), while the reference numeral 7-3 indicates an I/O device. FIG. 40 is a flow chart illustrating operations of the data logging apparatus according to the present invention. At first, the program executing means executes a user program (S 7-1), and then executes a data logging program (S 7-2). The user program executes processes like S 7-3 to S 7-5 in a conventional type of data logging apparatus. Furthermore the data logging program reads out data stored by the user program from the device area 7-5 for user program (S 7-6), executes a data logging process, and writes logged data in the device area 7-7 for data logging (S 7-7).

Figure 41:
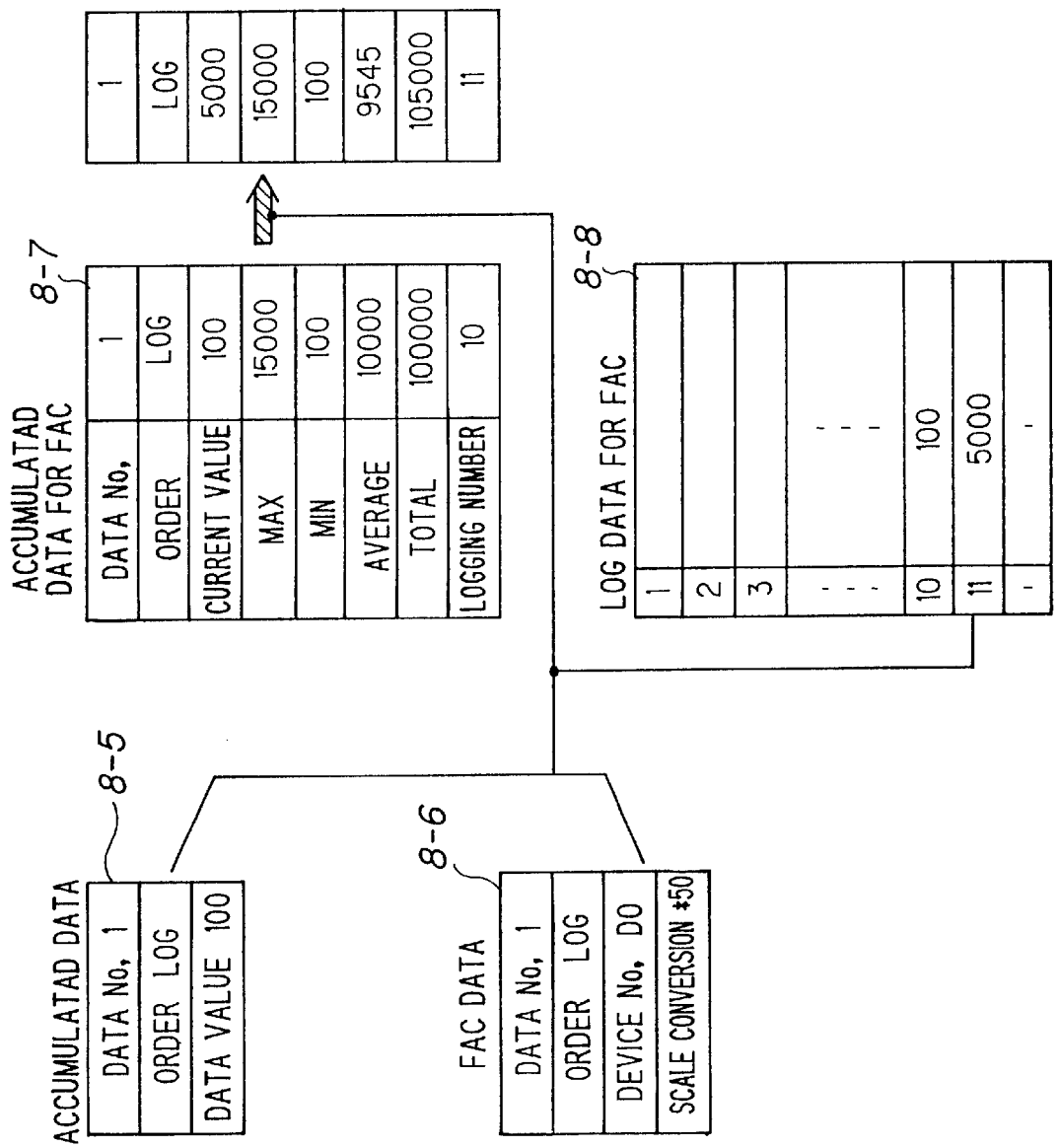
FIG. 41 is an explanatory view illustrating contents of a memory in an FAC according to the invention.

Now an eighth embodiment of the present invention will be described. FIG. 41 is an explanatory view illustrating contents of a PLC memory according to the present invention. Configuration of the PLC is the same as that shown in FIG. 64, so this description uses the same reference numbers. In this figure, the reference number 8-5 is accumulated data read out from the PLC, said accumulated data comprising data No., commands, and data values. The reference numeral 8-6 is data for FAC comprising scale conversion values indicative of a method of processing the data No., commands, device No., and data values. The reference numeral 8-7 indicates accumulated data for an FAC which is written by a computing means, while the reference numeral 8-8 indicates log data for an FAC which is written by the computing means.

Figure 42:
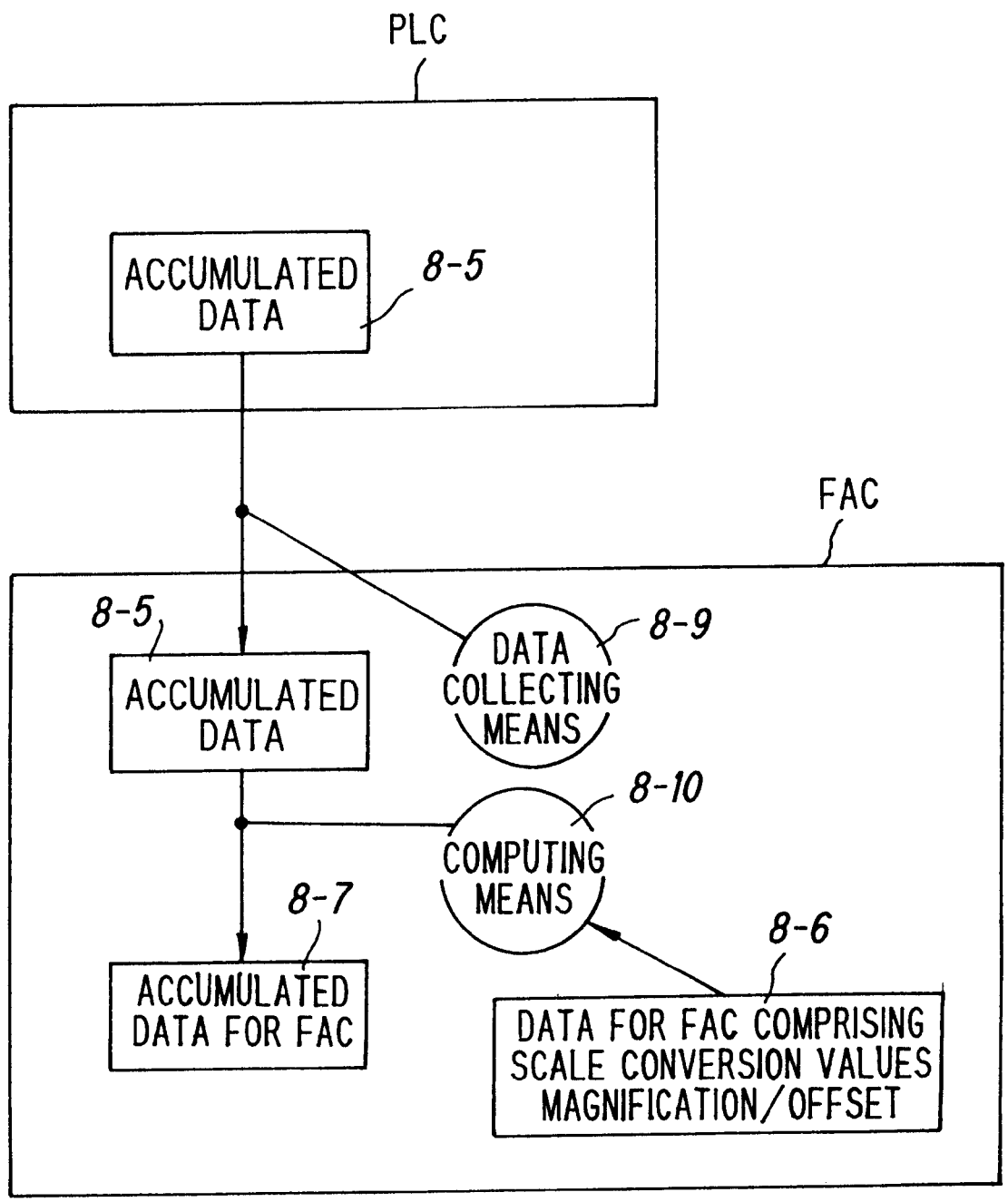
FIG. 42 is a functional diagram illustrating operations of a data logging apparatus according to the invention.
Figure 43A:
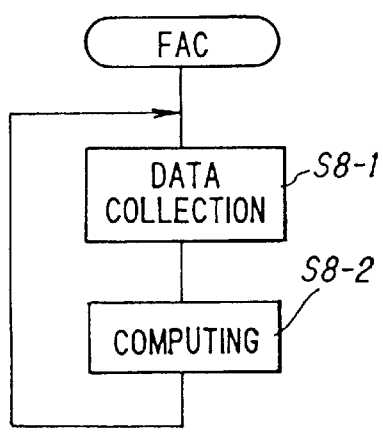
FIGS. 43A–C is a flow chart illustrating operations of the data logging apparatus according to the invention.
Figure 43B:
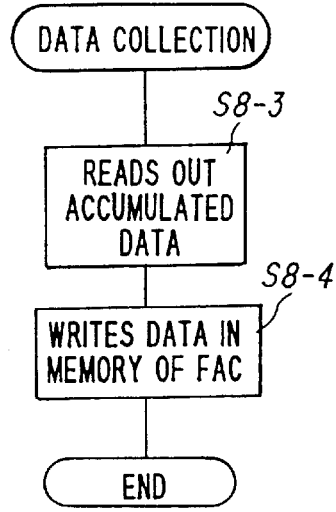
Figure 43C:
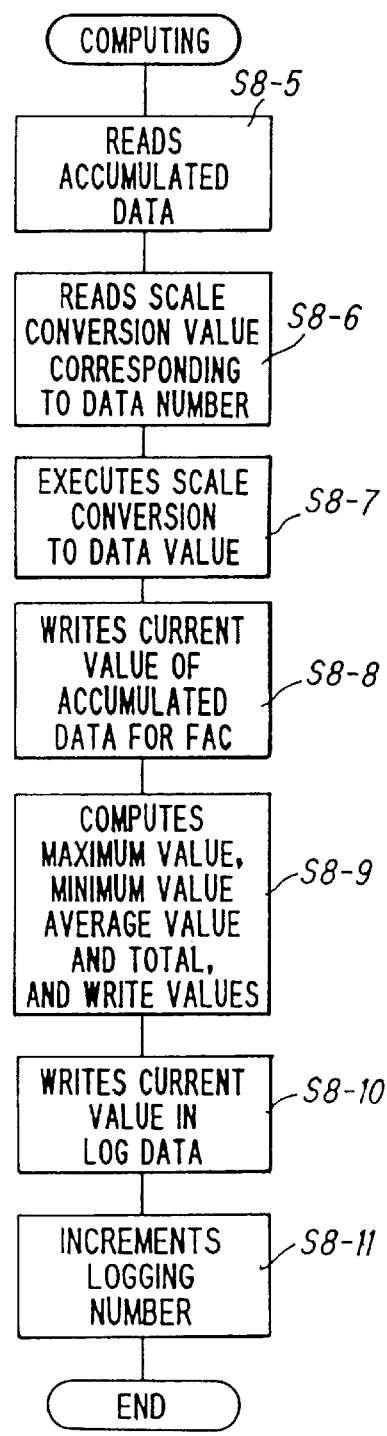

FIG. 42 is a functional diagram illustrating functions of a data logging apparatus according to this embodiment, and in this figure, designated at the reference numeral 8-9 is a data collecting means, and at 8-10 a computing means. FIGS. 43A–43C are flow charts illustrating operations of the data logging apparatus according to the present invention. The FAC executes data collection with the data collecting means 8-9 (S 8-1), and also executes a specific computing with the computing means 8-10 (s 8-2). Also the data collecting means 8-9 reads out accumulated data 8-5 from the PLC (S 8-3) and writes the data in the memory 8-4 of the FAC (S 8-4). The computing means 8-10 reads accumulated data 8-5 (S 8-5), reads a scale conversion value corresponding to a data number of the accumulated data 8-5 from the data for FAC 8-6 (S 8-6), and executes scale conversion to a data value of the accumulated data 8-5 (S 8-7). Also the data logging apparatus writes a current value of accumulated data 8-7 for FAC (S 8-8), computes a maximum value, a minimum value, an average value, and a total from the current values, and writes the values in the accumulated data 8-8 for FAC (S 8-9). Furthermore the data logging apparatus writes the current value in log data 8-8 for FAC (S 8-10), and increments the logging number (S 8-11).

Figure 44:
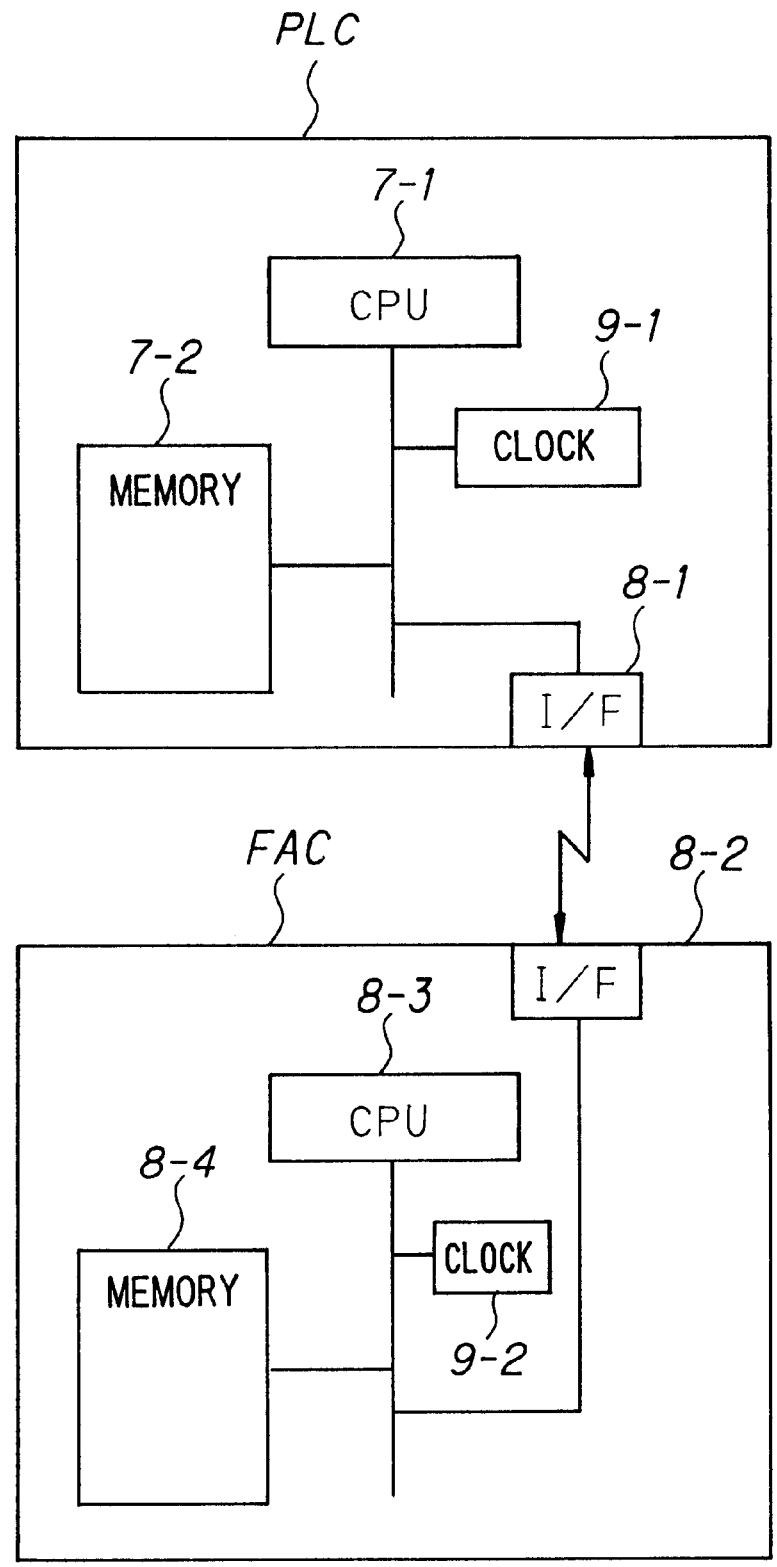
FIG. 44 is a block diagram illustrating general configuration of a data logging apparatus according to the invention.
Figure 45:
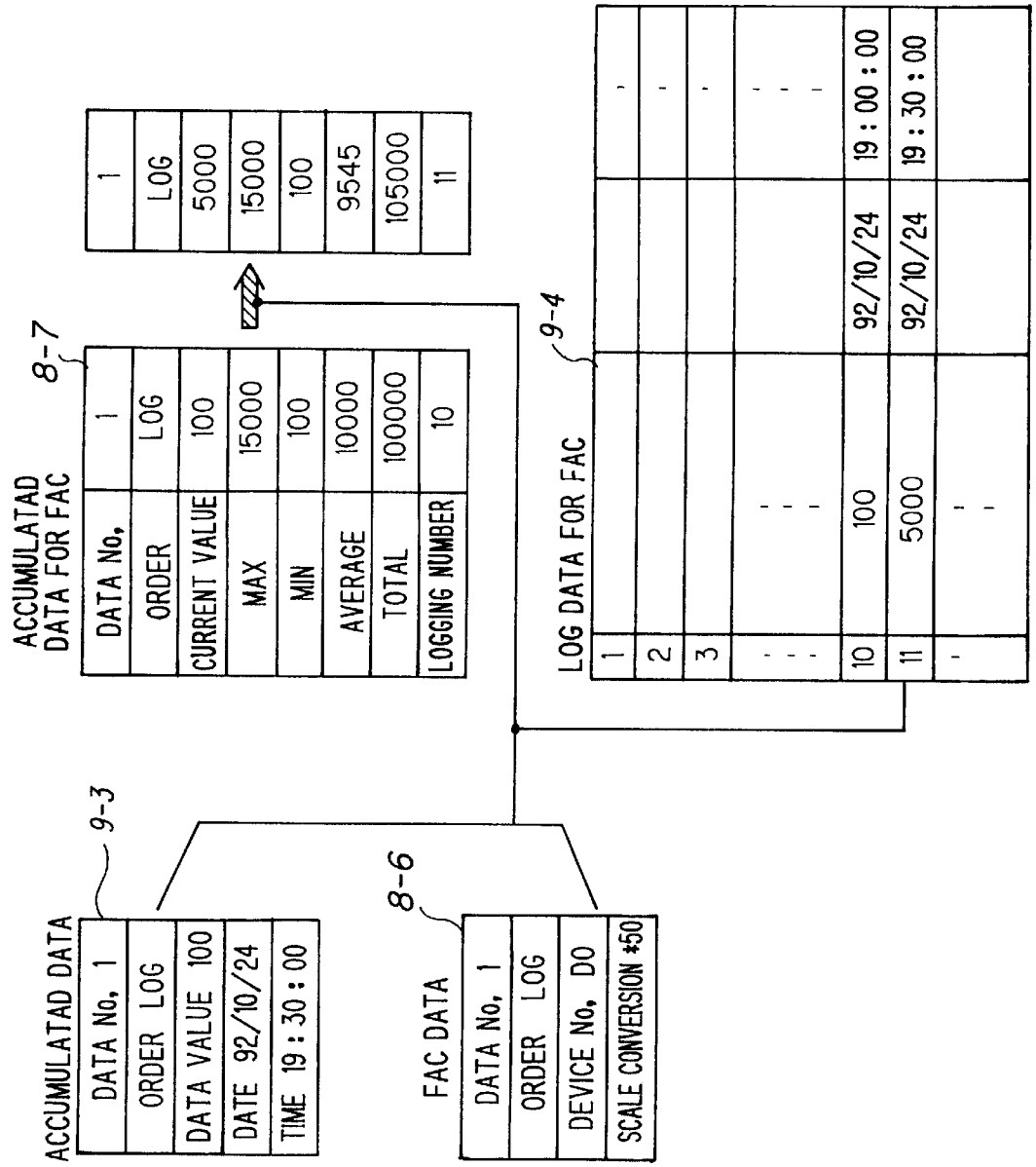
FIG. 45 is an explanatory view illustrating contents of a memory in an FAC according to the invention.

Next, a ninth embodiment of the present invention will be described. FIG. 44 is a block diagram illustrating general configuration of a data logging apparatus according to the present invention, and in this figure the reference numeral 9-1 indicates a clock to measure time in the PLC. FIG. 45 is an explanatory view illustrating the contents of a memory of an FAC, and in this figure the reference numeral 9-3 indicates accumulated data with a date and time set up therein, while the reference numeral 9-4 indicates log data in which a current value, date, and time are written.

Figure 46:
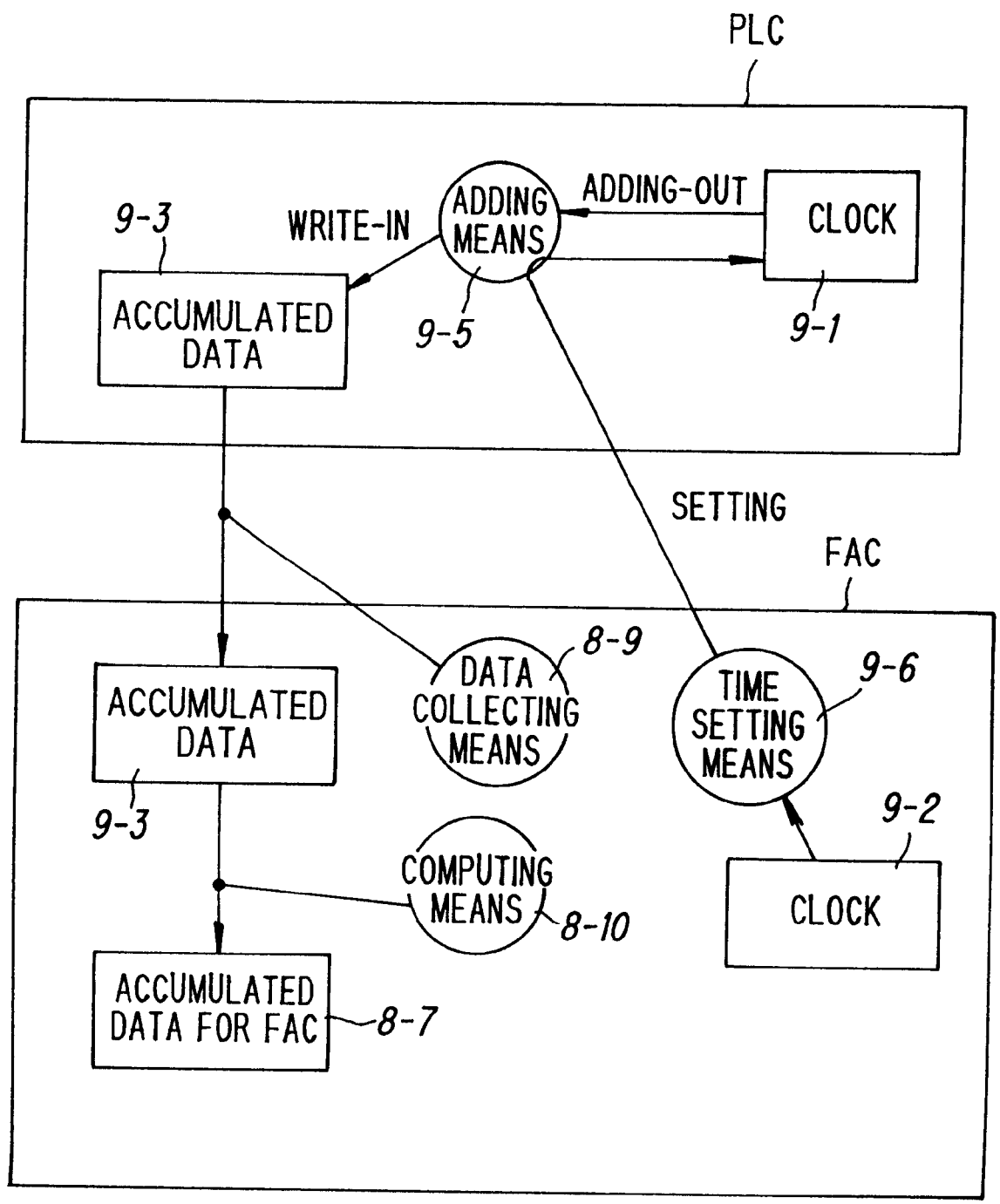
FIG. 46 is a functional diagram illustrating functions of a data logging apparatus according to the invention.
Figure 47:
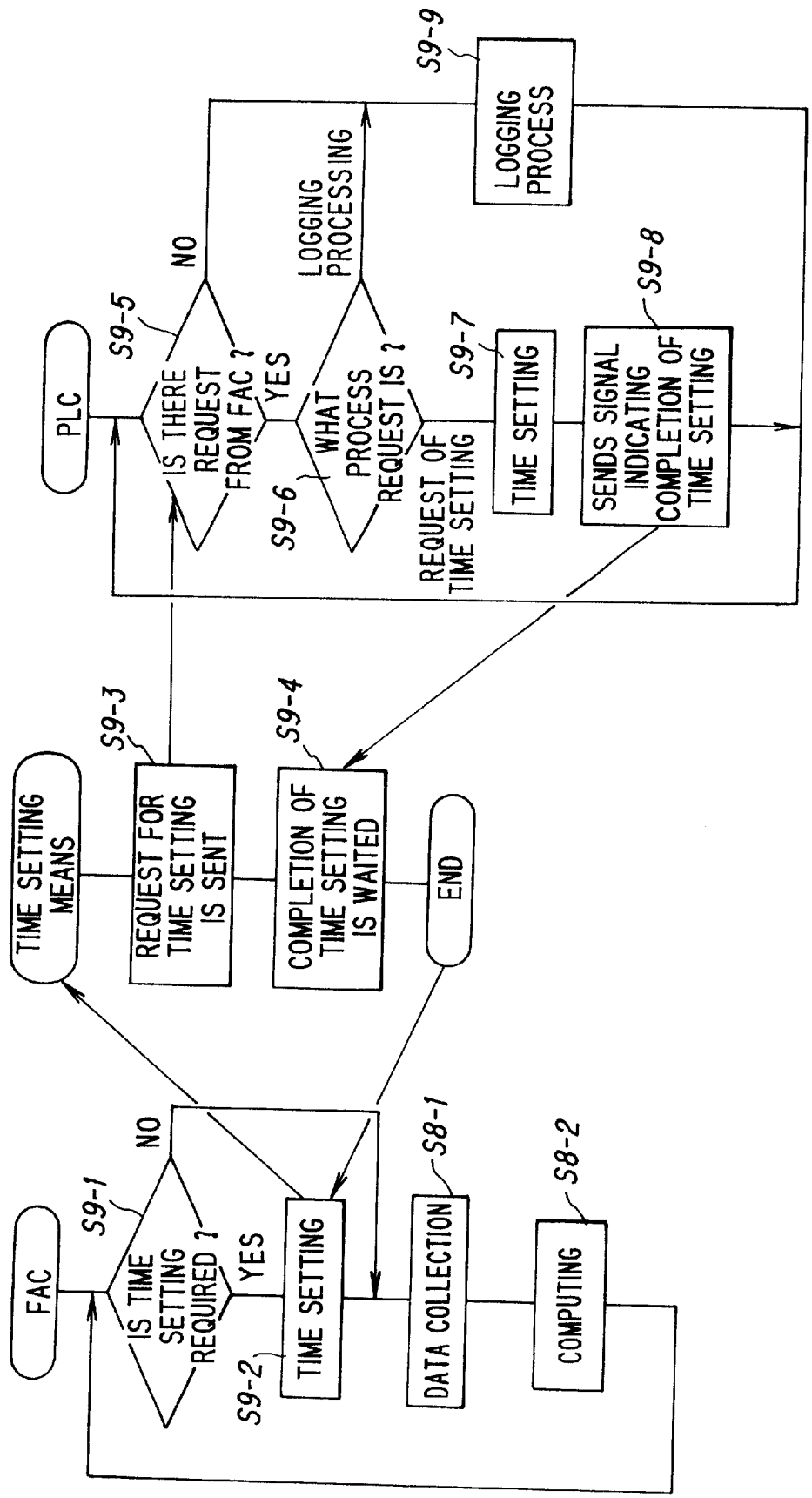
FIG. 47 is a flow chart illustrating operations of the data logging apparatus according to the invention.

FIG. 46 is a functional diagram illustrating functions of a data logging apparatus according to this embodiment, and in this figure the reference numeral 9-5 indicates an adding means, while the reference numeral 9-6 indicates a time setting means. FIG. 47 is a flow chart illustrating operations of the data logging apparatus according to the present invention. At first, the FAC makes a determination as to whether time setting is required or not (S 9-1), and when time setting is necessary, time setting is executed by the time setting means (S 9-2). Also, a request for time setting is sent to the PLC (S 9-3), and a signal indicating completion of time setting from the PLC is waited (S 9-4). Also the PLC makes a determination as to whether there is a request from the FAC or not (S 9-5), and also makes a determination as to for what process the request is (S 9-6). Then the data logging apparatus sets time according the data and time received from the FAC (S 9-7), and sends a signal indicating completion of time setting to the FAC (S 9-8). Also when it is determined that there is no request from the FAC, the logging process is executed (S 9-9).

Figure 48:
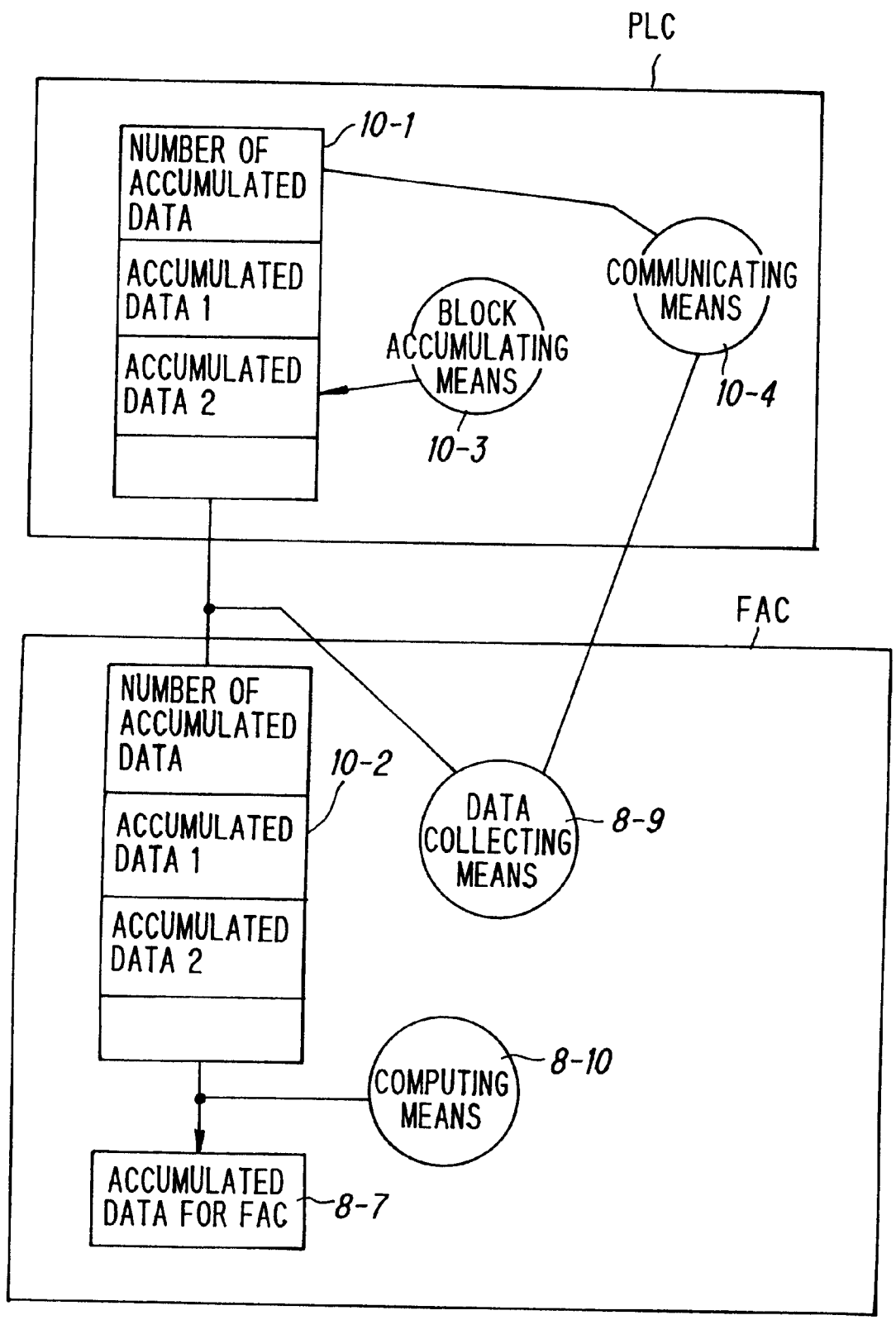
FIG. 48 is a functional diagram illustrating functions of a data logging apparatus according to the invention.
Figure 49:
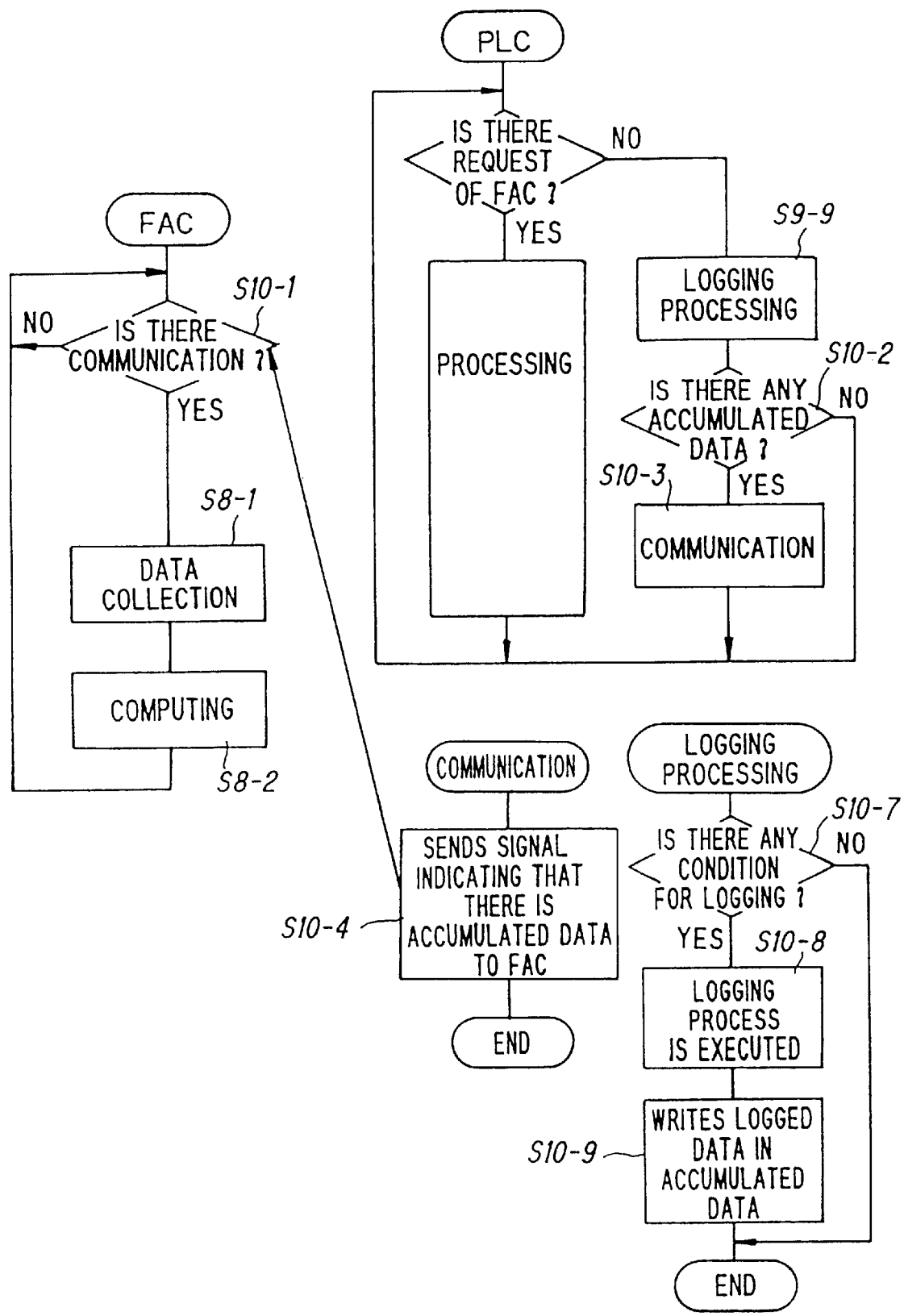
FIG. 49 is a flow chart illustrating operations of the data logging apparatus according to the invention.

Next, a tenth embodiment of the present invention. FIG. 48 is a functional diagram illustrating functions of a data logging apparatus according to the present invention, and in this figure, designated at the reference numeral 10-1 is accumulated data in a PLC, at 10-2 accumulated data in an FAC, at 10-3 a block accumulating means, and at 10-4 a communicating means. FIG. 49 is a flow chart illustrating processing operations of a data logging apparatus according to the present invention.

Next, operations of the data logging apparatus according to the present invention will be described. The FAC makes a determination as to whether there is a communication from the PLC or not (S 10-1), and if it is determined that there is a communication from the PLC, S 8-1 (data collection) and S 8-2 (computing) are executed. If the PLC determines that there is no request, the PLC executes a logging process (S 9-9), executes a determination as to whether there is any accumulated data (S 10-2), and executes a communicating process with a communicating means if there is any accumulated data. The communicating means sends a signal indicating that there is accumulated data to the FAC (S 10-4). A determination is made as to whether there is any condition for logging or not (S 10-7), and if it is determined that there is any condition for logging, the logging process is executed (S 10-8), the logged data is written in the accumulated data (S 10-9), and the number of accumulated is incremented data. When data collection is executed by the data collecting means 8-9, the number of accumulated data in the PLC is cleared.

Next, an eleventh embodiment of the present invention will be described. FIG. 50 is an explanatory view illustrating contents of data concerning a display/print format, and the data indicates a format of data to be printed, and also that data No.1 of accumulated data for FAC has been set as the data.

Figure 51:
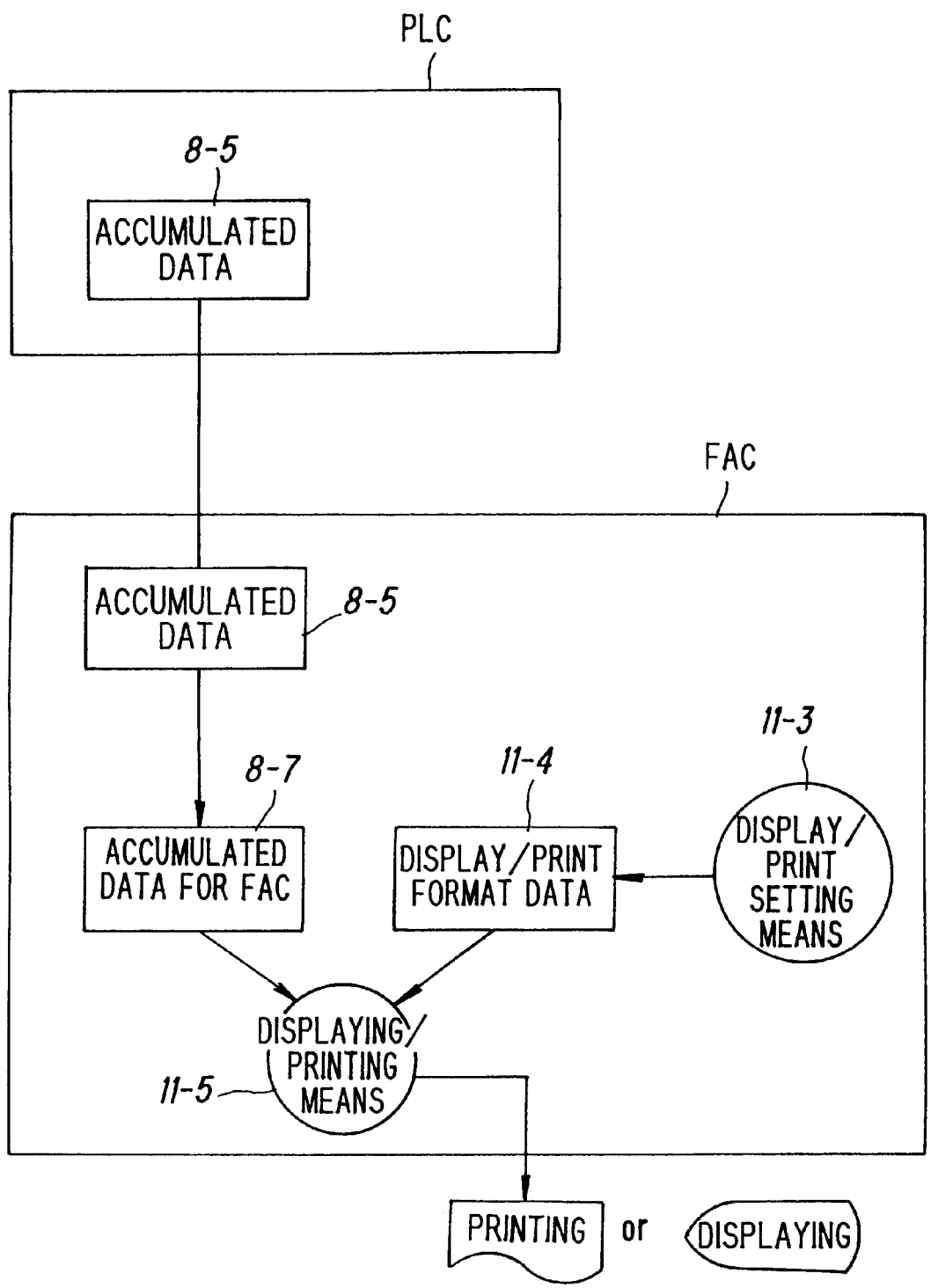
FIG. 51 is an explanatory diagram illustrating functions of a data logging apparatus according to the invention.
Figure 52:
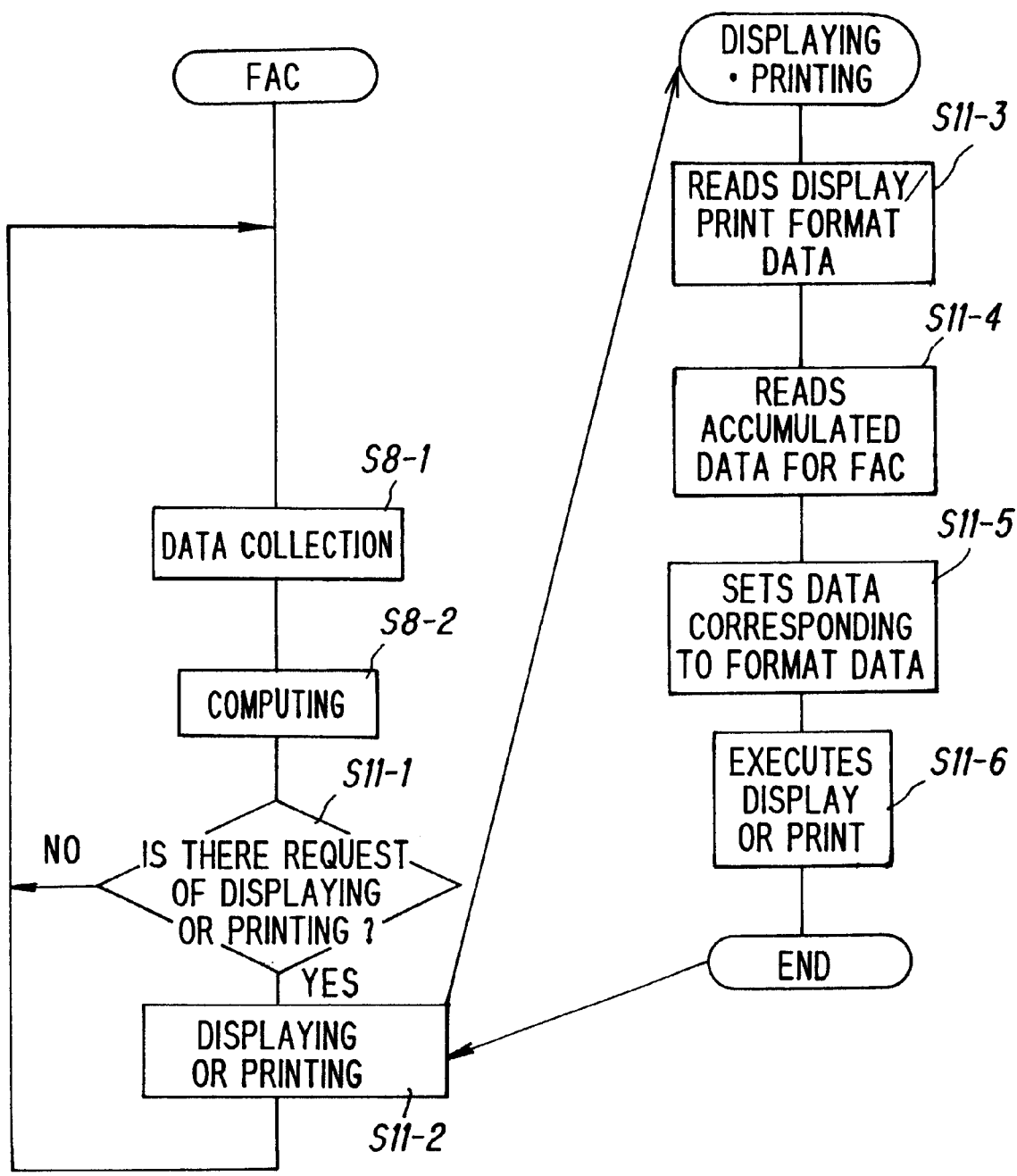
FIG. 52 is a flow chart illustrating operations of the data logging apparatus according to the invention.

FIG. 51 is a functional diagram illustrating functions of a data logging apparatus according to the present invention, and in this figure the reference numeral 11-3 indicates a display/print setting means, 11-4 indicates display/print format data, and 11-5 indicates a displaying/printing means. FIG. 52 is a flow chart illustrating operations of a data logging apparatus according to this embodiment.

Now, operations of the data logging apparatus according to this embodiment will be described. The FAC makes a determination as to the necessity of displaying or printing (S 11-1), and executes a displaying or printing process with the displaying/printing means 11-5 (S 11-2). Also the displaying/printing means 11-5 reads display/print format data (S 11-3), and reads accumulated data for FAC and log data (S 11-4). Furthermore, the displaying/printing means 11-5 sets data corresponding to the display/print format data (S 11-5), and then executes display or print (S 11-6).

Figure 53:
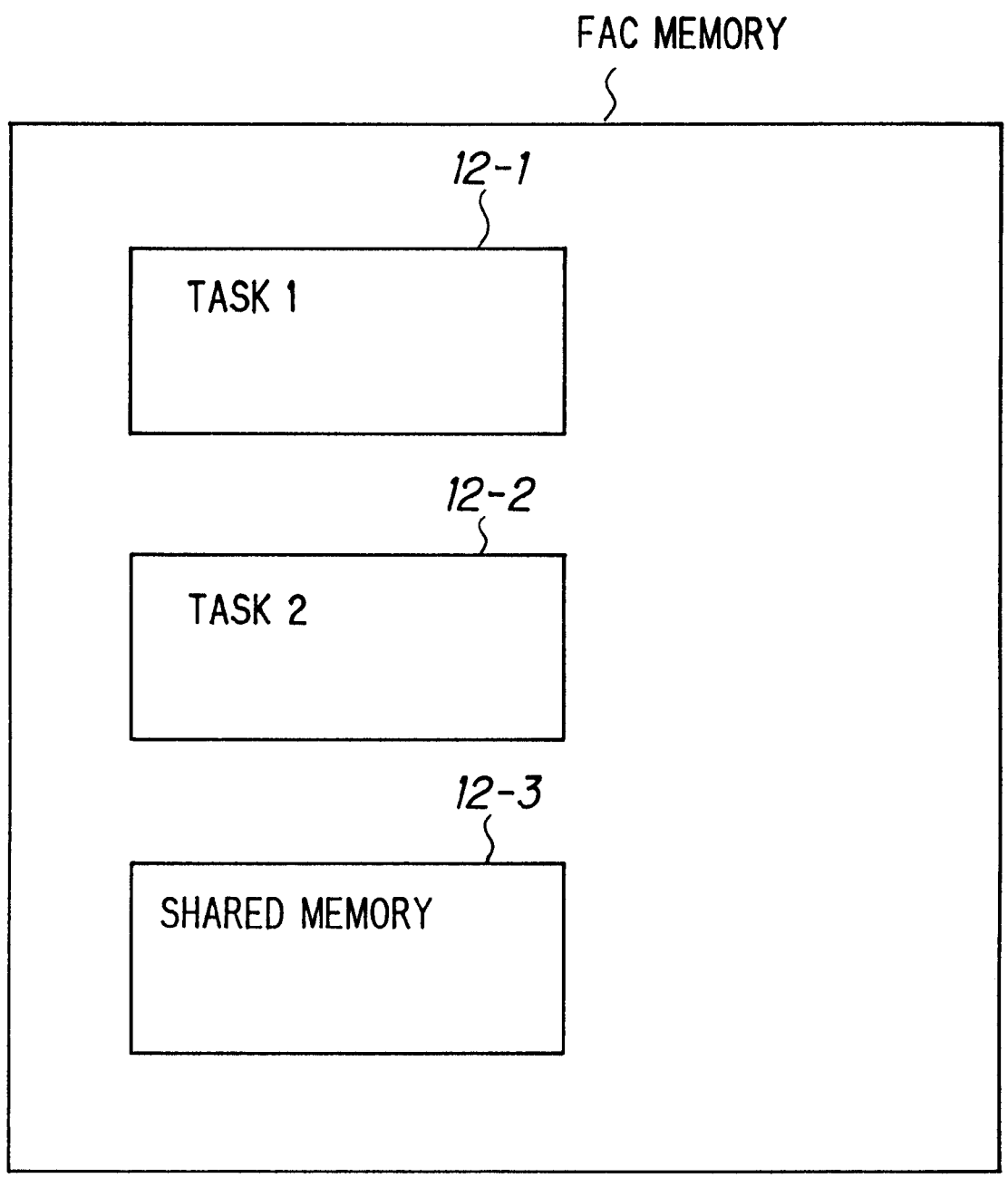
FIG. 53 is an explanatory view illustrating contents of a memory in an FAC according to the invention.

FIG. 53 is an explanatory view illustrating contents of an FAC memory according to this embodiment, and in this figure, designated at the reference numeral 12-2 is an area for task 1, at 12-2 an area for task 2, and at 12-3 a shared memory shared between task 1 and task 2.

Figure 54:
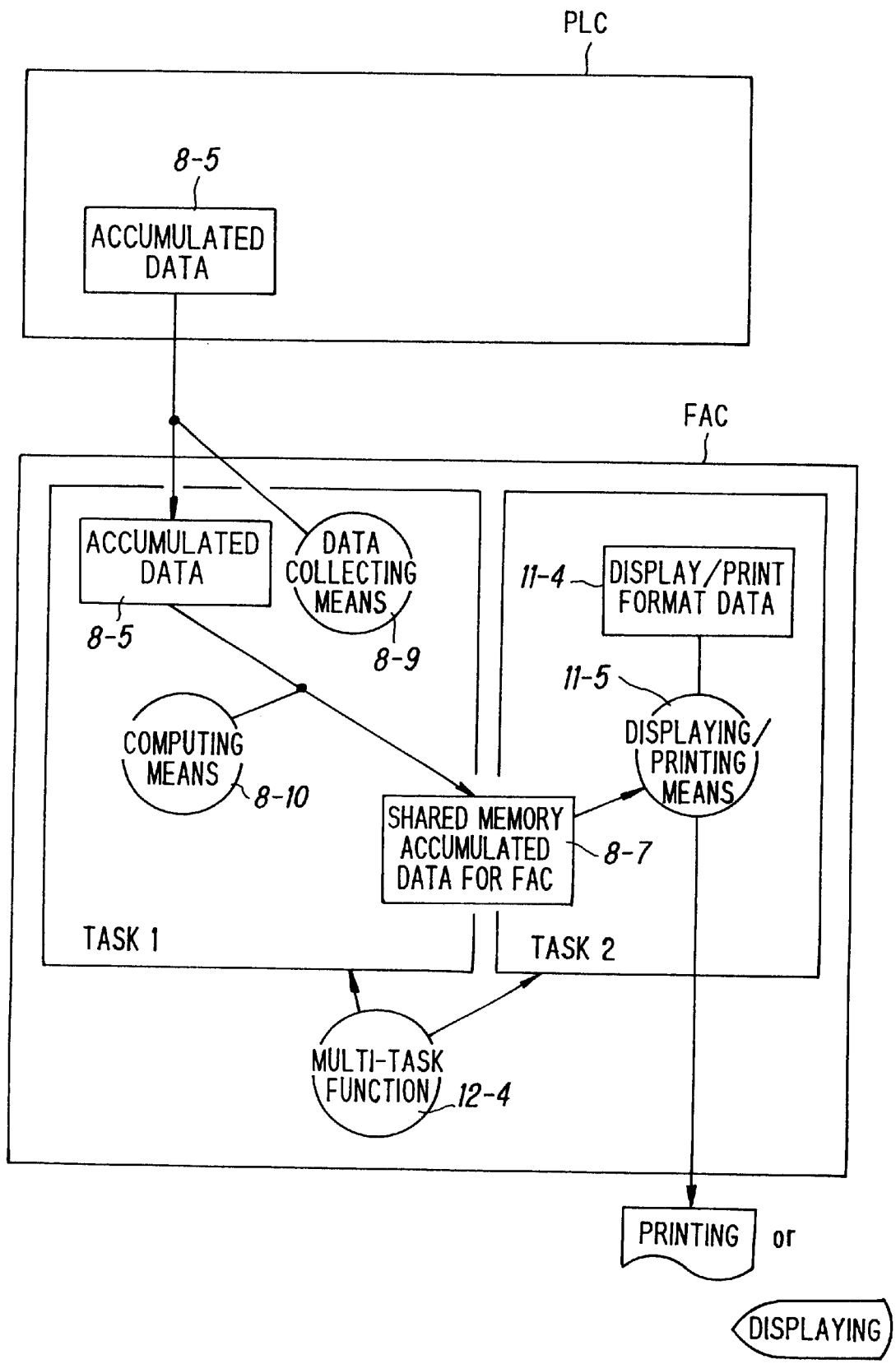
FIG. 54 is a functional diagram illustrating functions of a data logging apparatus according to the invention.

FIG. 54 is a functional diagram illustrating functions of a data logging apparatus according to this embodiment, and in this figure, the reference numeral 12-4 indicates a multi-task function. The task 1 executes data collection and computing with the data collecting means and the computing means respectively, and writes accumulated data for FAC on the shared memory 12-3. Also task 2 reads accumulated data 8-7 for FAC on the shared memory 12-3 with the displaying/printing means 11-5, and executes print or display.

Figure 55:
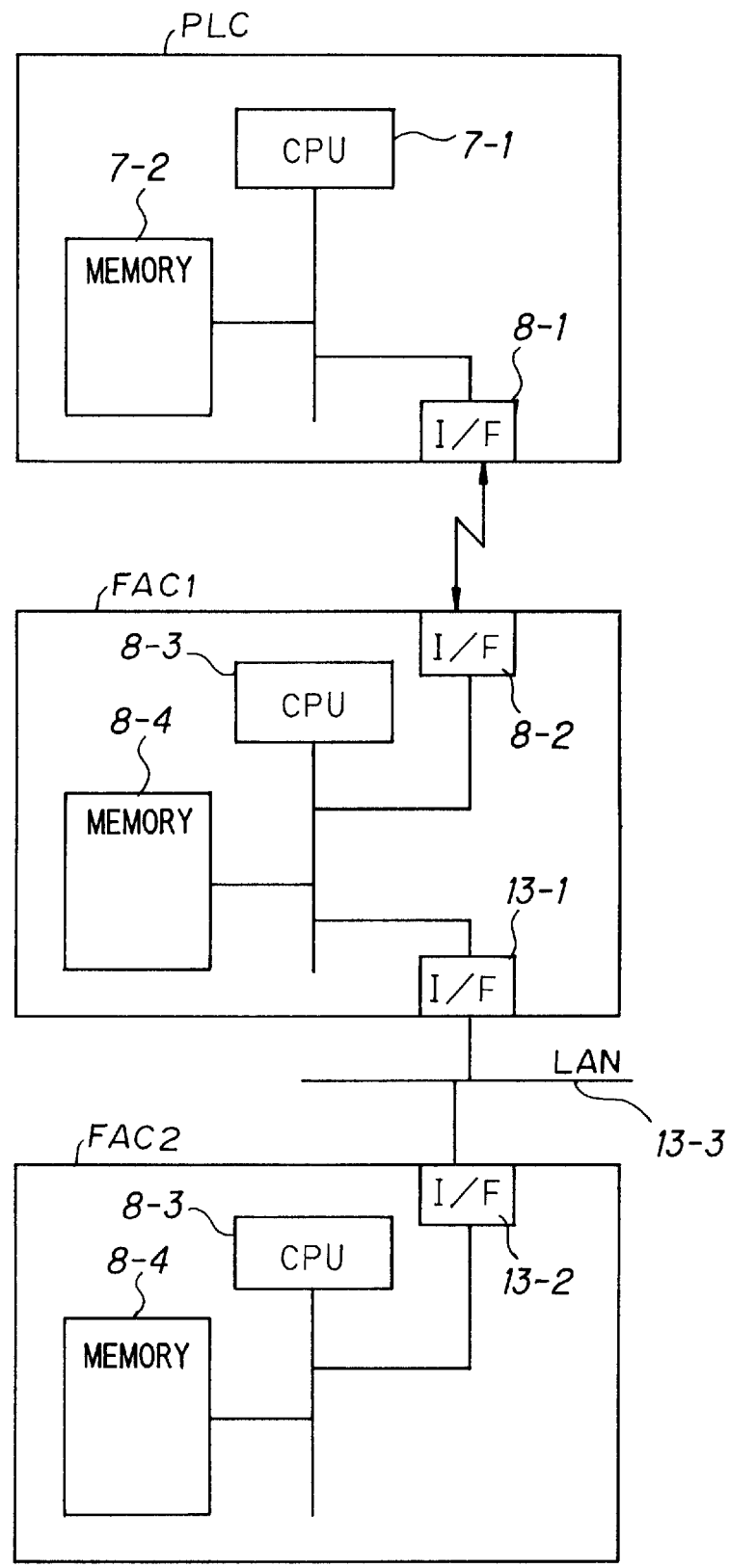
FIG. 55 is a block diagram illustrating general configuration of a data logging apparatus according to the invention.

FIG. 55 is a block diagram illustrating general configuration of a data logging apparatus according to this embodiment, and in this figure, designated at the reference numeral 13-3 is LAN (Local Area Network) connecting FAC 1 to FAC 2, at 13-1 a communication interface for the FAC 1, and at 13-2 a communication interface for the FAC 2.

Figure 56:
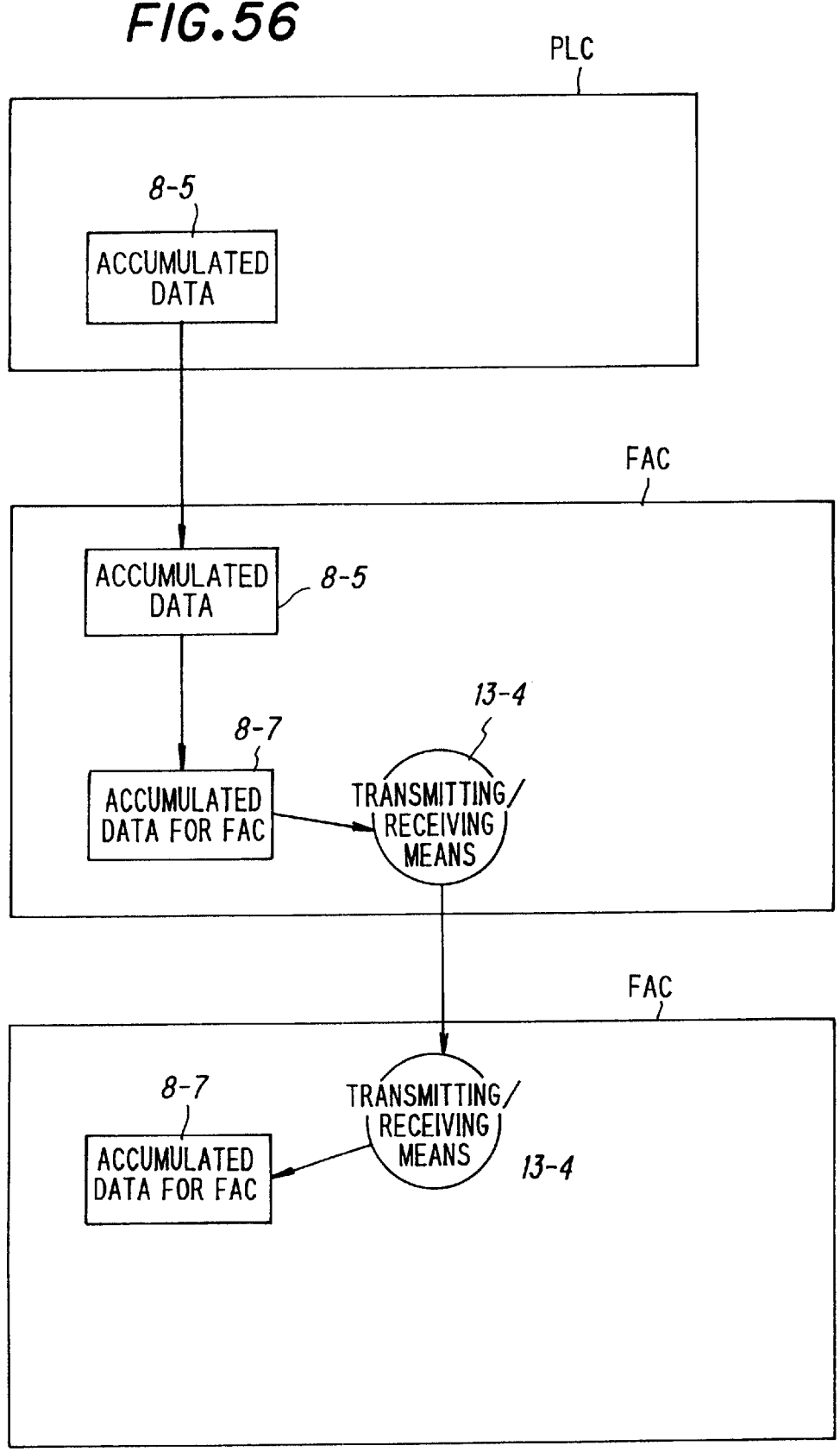
FIG. 56 is a functional diagram illustrating functions of the data logging apparatus according to the invention.
Figure 57:
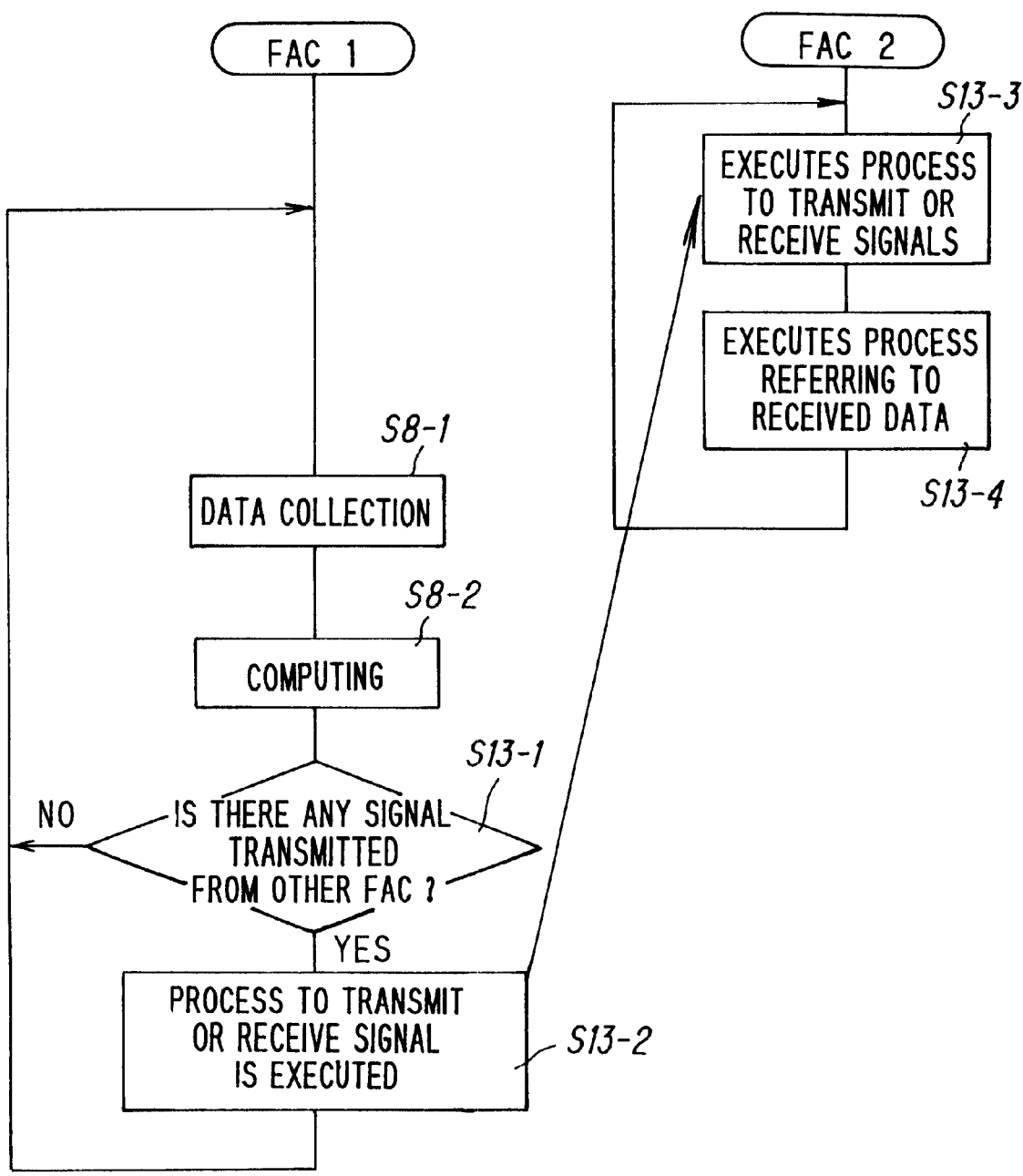
FIG. 57 is a flow chart illustrating operations of the data logging apparatus according to the invention.
Figure 58:
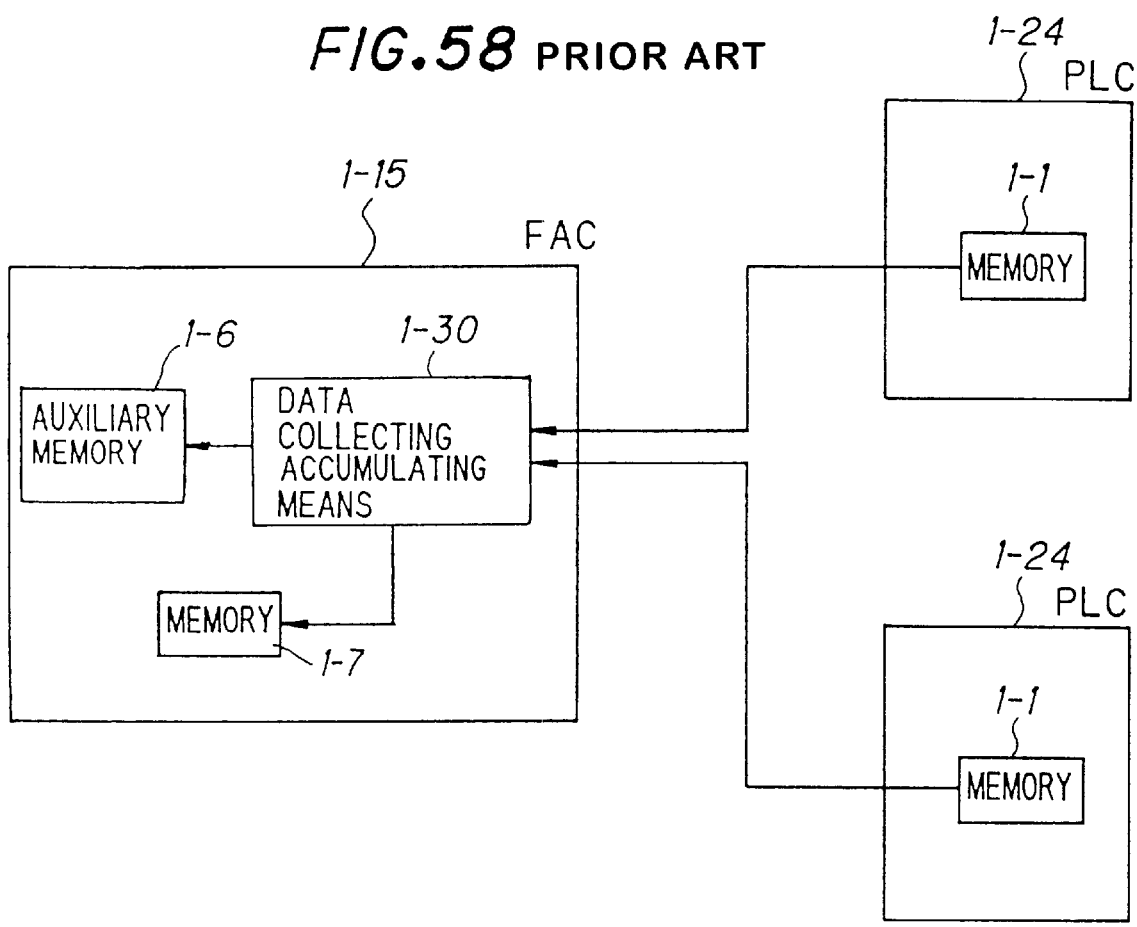
FIG. 58 is a block diagram illustrating general configuration of a conventional type of data logging apparatus.
Figure 59:
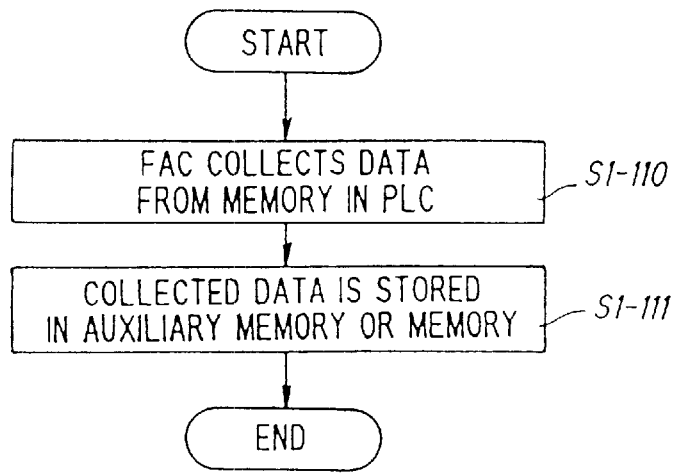
FIG. 59 is a flow chart illustrating operations of a conventional type of FAC.

FIG. 56 is a functional diagram illustrating functions of a data logging apparatus according to this embodiment, and in this figure, the reference numeral 13-4 indicating a transmitting/receiving means, and FIG. 57 is a flow chart illustrating operations thereof. The FAC 1 makes a determination as to whether there is any signal transmitted from another FAC (S 13-1). If it is determined that there is a signal transmitted from other FAC, a process to transmit or receive the signal is executed by the transmitting/receiving means 13-4 (S 13-2), and accumulated data 8-7 for FAC is transmitted to the FAC 2. The FAC 2 executes a process to transmit or receive signals with the transmitting/receiving means 13-4 (S 13-3), receives accumulated data 8-7 for FAC from the FAC 1 and executes the process referring to the received data (S 13-4).

Although the invention has been described with respect to specific embodiments for a complete and clear disclosure, the appended claims are not to be thus limited but are to be construed as embodying all modification and alternative constructions that may occur to one skilled in the art which fairly fall within the basis teaching herein set forth.

What is claimed is:

1. A data logging apparatus for use as control equipment in a facility or machine, comprising:

a plurality of programmable logic controllers connected to each other through communications links, one of said programmable logic controllers being an administrative programmable logic controller which includes a memory;

a factory automation (FA) controller connected to said administrative programmable logic controller through a communications link, said administrative programmable logic controller executing a data logging program which accumulates in said memory data generated by the administrative programmable logic controller and data generated by others of said programmable logic controllers, and which sends data accumulated in said memory to said FA controller, such that said administrative programmable logic controller acts as a buffer between said plurality of programmable logic controllers and said FA controller; and a program data preparing means provided in said FA controller, for preparing data for said data logging program running on said administrative programmable logic controller and for a data logging program running on said FA controller, wherein data accumulated by the administrative programmable logic controller according to said programs is successively processed by said FA controller according to data prepared by said program data preparing means.

2. A data logging apparatus according to claim 1, having a transfer means for down-loading the data logging program running on said administrative programmable logic controller from said controller for to said administrative programmable logic controller or up-loading said data logging program from said administrative programmable logic controller to the FA controller.

3. A data logging apparatus according to claim 1, having an analyzing means for reading out a main program of said administrative programmable logic controller, said main program not including a data logging program, and for analyzing a device being currently used when the data logging program running on said administrative programmable logic controller is prepared by said program data preparing means.

4. A data logging apparatus according to claim 1, further comprising a program area and a device area each dedicated to device logging, provided in said programmable logic controller, wherein the data logging program is run in said program area, and a program executing means using the device area dedicated to data logging is provided therein.

5. A data logging apparatus according to claim 1, having a computing means for setting a magnification/offset for scale conversion and for executing scale conversion of collected data.

6. A data logging apparatus according to claim 1, comprising an adding means for adding data concerning date and time to accumulated data, and a time setting means for setting time in the programmable logic controller to that in the FA controller.

7. A data logging apparatus according to claim 1, comprising a block accumulating means for successively accumulating accumulated data as a plurality of blocks and a communicating means for indicating whether there is any accumulated data or not.

8. A data logging apparatus according to claim 1, further comprising:
- a display/print format setting means for setting a format to display accumulated data for the FA controller in a display means or to print the data in a printing means;
- and a displaying/printing means for displaying or printing accumulated data for the FA controller according to the display/print format data set up by said display/print format setting means.

9. A data logging apparatus according to claim 8, wherein a collecting means and a computing means are provided in a given task by incorporating a multi-task function in the FA controller, accumulated data for the controller for FA is stored in a shared memory, and a displaying/printing means is provided in another task.

10. A data logging apparatus According to claim 2, further comprising a communicating means for transmitting and receiving accumulated data for the FA controller to and from equipment connected thereto through communication.

11. A data logging apparatus for use as control equipment in a facility or machine, comprising:
- a plurality of programmable logic controllers connected to each other through communications links, one of said programmable logic controllers being an administrative programmable logic controller which includes a memory;
- a factory automation (FA) controller connected to said administrative programmable logic controller through a communications link, said administrative programmable logic controller executing a data logging program which accumulates in said memory data generated by the administrative programmable logic controller and data generated by others of said programmable logic controllers, and which sends data accumulated in said memory to said FA controller, such that said administrative programmable logic controller acts as a buffer between said plurality of programmable logic controllers and said FA controller; and
- a logging setting means for setting a trigger condition section and a processing section in the FA controller, wherein said logging setting means is set in a ladder format.

* * * * *